(12) United States Patent
Rubin et al.

(10) Patent No.: US 11,247,905 B2
(45) Date of Patent: Feb. 15, 2022

(54) SYNTHESIS OF GRAPHENE NANORIBBONS FROM MONOMERIC MOLECULAR PRECURSORS BEARING REACTIVE ALKYNE MOIETIES

(71) Applicant: THE REGENTS OF THE UNIVERSITY OF CALIFORNIA, Oakland, CA (US)

(72) Inventors: Yves Rubin, Los Angeles, CA (US); Robert S. Jordan, Los Angeles, CA (US); Yolanda L. Li, Los Angeles, CA (US); Ryan D. McCurdy, Los Angeles, CA (US); Simon Kervyn De Meerendré, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 336 days.

(21) Appl. No.: 16/461,335

(22) PCT Filed: Nov. 17, 2017

(86) PCT No.: PCT/US2017/062341
§ 371 (c)(1),
(2) Date: May 15, 2019

(87) PCT Pub. No.: WO2018/094234
PCT Pub. Date: May 24, 2018

(65) Prior Publication Data
US 2020/0055735 A1    Feb. 20, 2020

Related U.S. Application Data

(60) Provisional application No. 62/424,345, filed on Nov. 18, 2016, provisional application No. 62/572,387, filed on Oct. 13, 2017.

(51) Int. Cl.
*C01B 32/184* (2017.01)
*C08F 38/02* (2006.01)
(Continued)

(52) U.S. Cl.
CPC ............ *C01B 32/184* (2017.08); *C08F 38/02* (2013.01); *B82Y 30/00* (2013.01); *B82Y 40/00* (2013.01);
(Continued)

(58) Field of Classification Search
CPC .............. C01B 32/184; C01B 2204/06; C01B 2204/22; C01B 32/182; C01B 32/198;
(Continued)

(56) References Cited

U.S. PATENT DOCUMENTS

2014/0212668 A1\* 7/2014 Dichtel .................... C07C 2/84
428/402
2014/0353554 A1   12/2014 Schwab et al.

FOREIGN PATENT DOCUMENTS

WO    WO-2016/109830 A2    7/2016
WO    WO-2016/110767 A1    7/2016

OTHER PUBLICATIONS

Jordan, et al., Synthesis of Graphene Nanoribbons via the Topochemical Polymerization and Subsequent Aromatization of a Diacetylene Precursor, Chem 2016; 1: 78-90, with Supplementary Information (Jul. 7, 2016) (Year: 2016).\*
(Continued)

*Primary Examiner* — Daniel C. McCracken
(74) *Attorney, Agent, or Firm* — Foley & Lardner LLP

(57) ABSTRACT

A method of forming a graphene nanoribbon includes: 1) providing monomeric precursors each including an alkyne moiety and at least one aromatic moiety bonded to the
(Continued)

alkyne moiety; 2) polymerizing the monomeric precursors to form a polymer; and 3) converting the polymer to a graphene nanoribbon.

19 Claims, 61 Drawing Sheets

(51) Int. Cl.
  *B82Y 30/00* (2011.01)
  *B82Y 40/00* (2011.01)
(52) U.S. Cl.
  CPC ...... *C01B 2204/06* (2013.01); *C01B 2204/22* (2013.01); *C01P 2002/72* (2013.01); *C01P 2002/82* (2013.01); *C01P 2002/84* (2013.01); *C01P 2002/85* (2013.01); *C01P 2002/86* (2013.01); *C01P 2002/89* (2013.01); *C01P 2002/90* (2013.01); *C01P 2004/02* (2013.01); *C01P 2004/03* (2013.01); *C01P 2004/04* (2013.01)
(58) Field of Classification Search
  CPC ............ C01B 2204/00; C01B 2204/02; C01B 2204/04; C01B 2204/065; C01B 2204/20; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C08F 38/02; B82Y 30/00; B82Y 40/00; C01P 2002/72; C01P 2002/82; C01P 2002/84; C01P 2002/85; C01P 2002/86; C01P 2002/89; C01P 2002/90; C01P 2004/02; C01P 2004/03; C01P 2004/04; Y02P 20/582
  See application file for complete search history.

(56) References Cited

OTHER PUBLICATIONS

Yang, et al., Bottum-Up Synthesis of Soluble and Narrow Graphene Nanoribbons Using Alkyne Benzannulations, JACS 2016; 138: 9137-9144 (Jun. 29, 2016) (Year: 2016).*

Basagni et al., "Molecules-Oligomers-Nanowires-Graphene Nanoribbons: A Bottom-Up Stepwise On-Surface Covalent Synthesis Preserving Long-Range Order", Journal of the American Chemical Society, 2015, 137, pp. 1802-1808.

Cai et al., "Atomically precise bottom-up fabrication of graphene nanoribbons", Nature, vol. 466, Jul. 22, 2010, pp. 470-473.

Chen et al., "From Nanographene and Graphene Nanoribbons to Graphene Sheets: Chemical Synthesis", Angew. Chem. Int. Ed. 2012, 51, pp. 7640-7654.

Gao et al., "Ambipolar Transport in Solution-Synthesized Graphene Nanoribbons", American Chemical Society, Nano, 2016, 10, pp. 4847-4856.

Jordan et al., "Synthesis of N=8 Armchair Graphene Nanoribbons from Four Distinct Polydiacetylenes", Journal of the American Chemical Society, Soc. 2017, 139, pp. 15878-15890.

Kawai et al., "Atomically controlled substitutional boron-doping of graphene nanoribbons", Nature Communications, 2015, pp. 1-6.

Li et al., "Efficient Bottom-Up Preparation of Graphene Nanoribbons by Mild Suzuki-Miyaura Polymerization of Simple Triaryl Monomers", Chemistry A European Journal Communication, Nanotechnology, 2016, 22, pp. 9116-9120.

Liu et al., "Toward Cove-Edged Low Band Gap Graphene Nanoribbons", Journal of the American Chemical Society, 2015, 137, pp. 6097-6103.

Narita et al., "Bottom-Up Synthesis of Liquid-Phase-Processable Graphene Nanoribbons with Near-Infrared Absorption", ACS Nano, vol. 8, No. 11, 2014, pp. 11622-11630.

Narita et al., "Synthesis of structurally well-defined and liquid-phase-processable graphene nanoribbons", Nature Chemistry, vol. 6, Feb. 2014, pp. 126-132.

Nguyen et al., "Bottom-Up Synthesis of N=13 Sulfur-Doped Graphene Nanoribbons", The Journal of Physical Chemistry, 2016, 120, pp. 2684-2687.

Ruffieux et al., "On-surface synthesis of graphene nanoribbons with zigzag edge topology", Nature, vol. 531, Mar. 24, 2016, pp. 489-493.

Sakagushi et al., "Width-Controlled Sub-Nanometer Graphene Nanoribbon Films Synthesized by Radical-Polymerized Chemical Vapor Deposition", Adv. Mater. 2014, 26, pp. 4134-4138.

Schwab et al., "Bottom-Up Synthesis of Necklace-Like Graphene Nanoribbons", Chemistry an Asian Journal, 2015, 10, pp. 2134-2138.

Vo et al., "Large-scale solution synthesis of narrow graphene nanoribbons", Nature Communications, 2014, pp. 1-8.

Yang et al., "Bottom-Up Synthesis of Soluble and Narrow Graphene Nanoribbons Using Alkyne Benzannulations", Jounral of the American Chemical Society, 2016, 138, pp. 9137-9144.

Yang et al., "Two-Dimensional Graphene Nanoribbons", J. Am. Chem., 2008, 130, pp. 4216-4217.

International Search Report and Written Opinion, issued in Int'l. Appln. No. PCT/US2017/062341, 8 pages (dated Feb. 6, 2018).

Jordan, et al., "Synthesis of Graphene Nanoribbons via the Topochemical Polymerization and Subsequent Aromatization of Diacetylene Precursor", Chem 1: 78-90 (Jul. 7, 2016).

* cited by examiner

Scheme 1

Scheme 2

Scheme 3

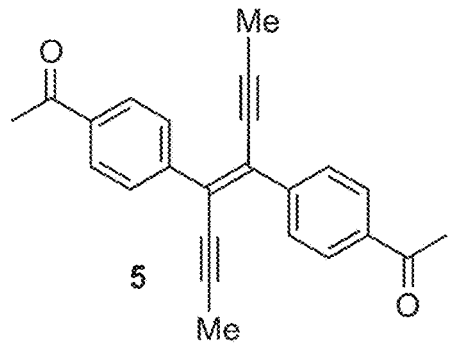
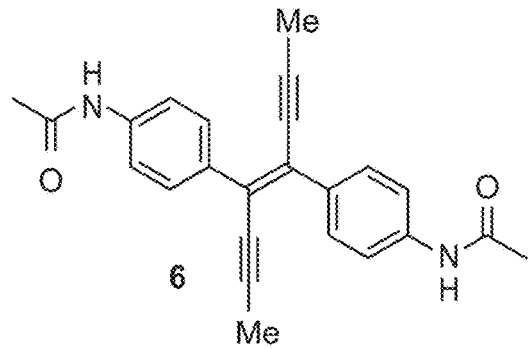
FIG. 16A
FIG. 16B
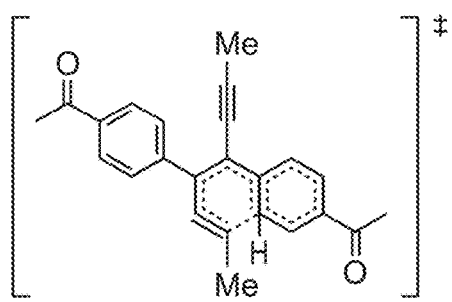
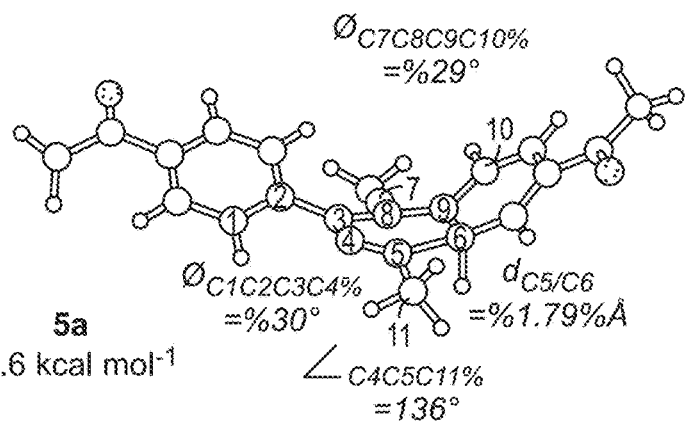
FIG. 16C
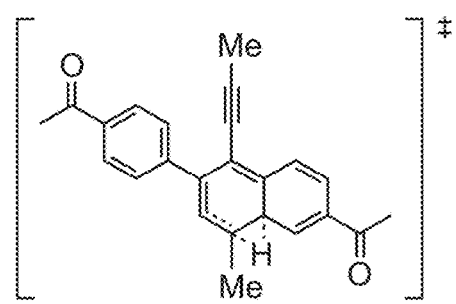
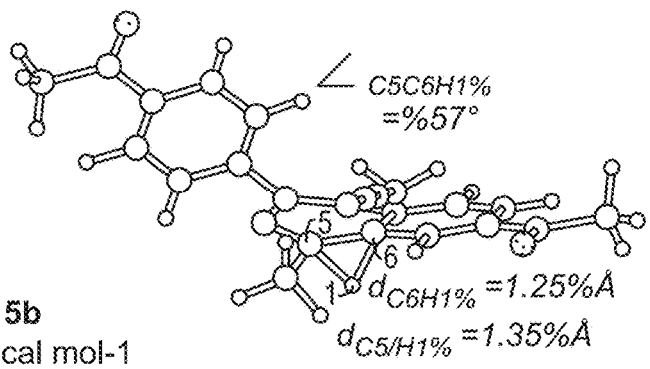
FIG. 16D 4c
C1-C4' = 3.39 Å
C1-C1' = 4.87 Å
CO...HN = 2.03 Å

4b
C1-C4' = 3.50 Å
C1-C1' = 4.79 Å
CO...HN = 2.03 Å

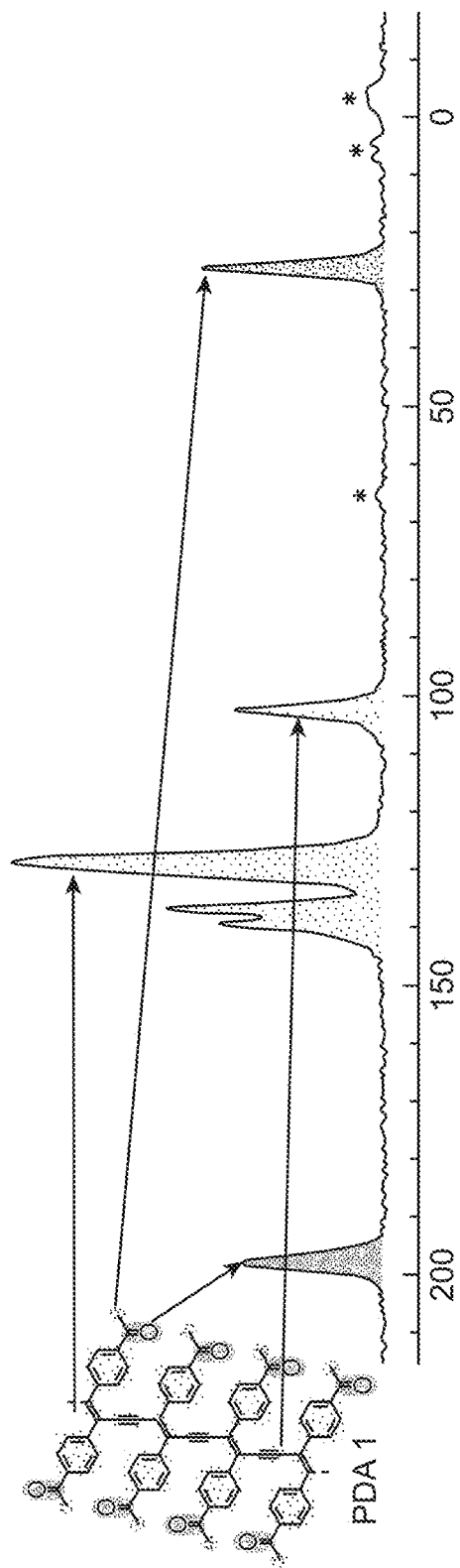
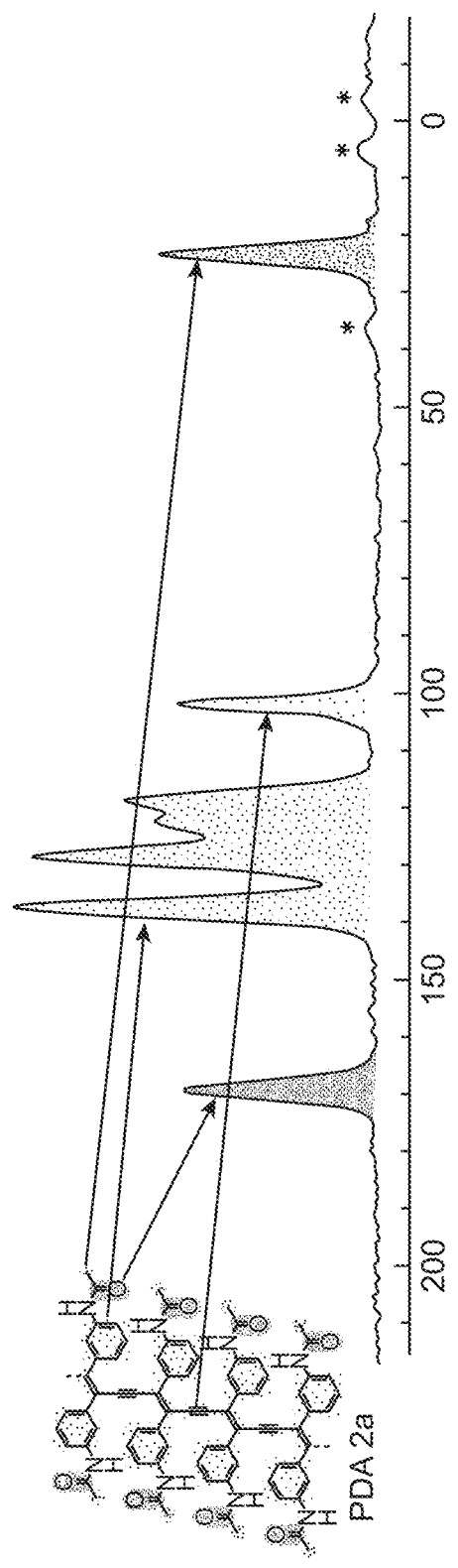
FIG. 19A
FIG. 19B

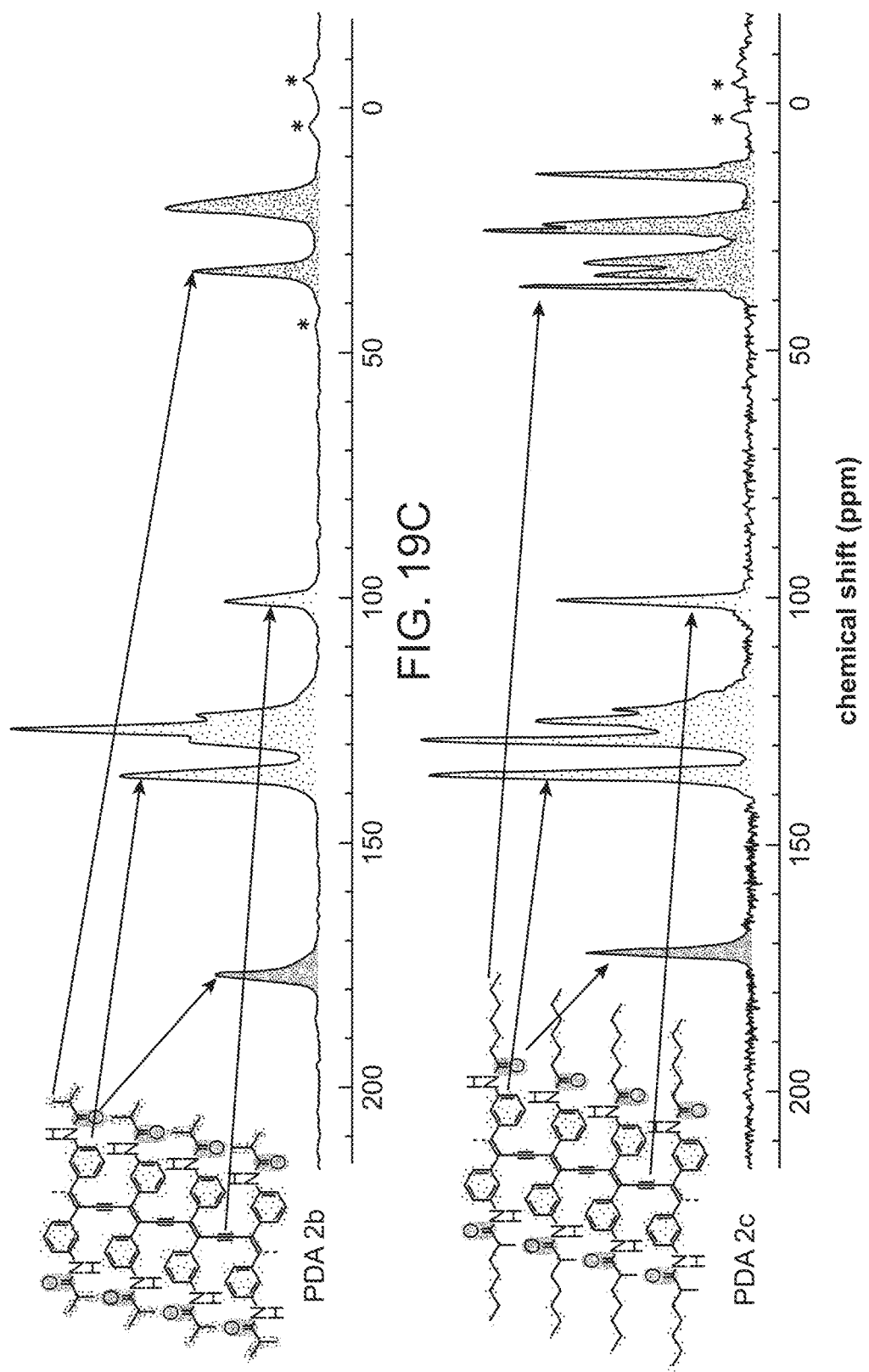

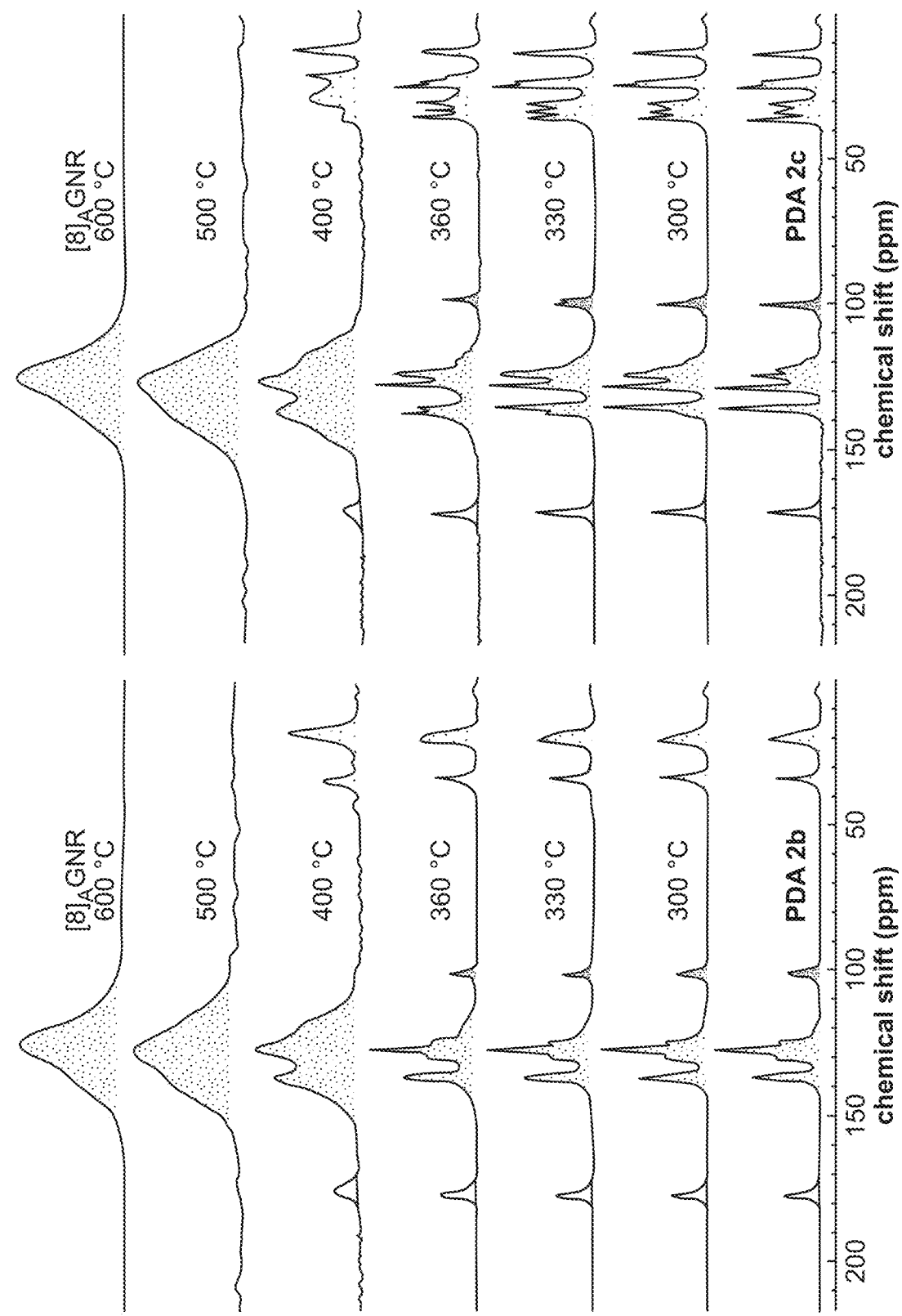

| Carbon row | 2 | 3 | 4 | 1 |
|---|---|---|---|---|
| Deconvoluted δ (ppm) (PDA 1) | 136.3 | 128.9 | 124.9 | 119.5 |
| Deconvoluted δ (ppm) (PDA 2a) | 137.6 | 129.8 | 126.4 | 121.8 |
| Calculated δ (B3LYP) Structure a) | 129.8[a] | 125.1[a] | 124.7[a] | 123.1[a] |

[a] Average from all chemical shifts for non-symmetrically related carbons in each of the rows in structure a).

| Temperature (°C) | Amount (mg) at: | 1 | 2a | 2b | 2c |
|---|---|---|---|---|---|
| 25 | starting mass | 62 | 52 | 66 | 53 |
| 300 | final mass | 60 | 50 | 66 | 52 |
| | mass % remaining[1] | 97% | 96% | 100% | 98% |
| 25 | starting mass | 57 | 37 | 78 | 59 |
| 330 | final mass | 56 | 37 | 76 | 58 |
| | mass % remaining[1] | 98% | 100% | 97% | 98% |
| 25 | starting mass | 71 | 35 | 59 | 66 |
| 360 | final mass | 70 | 31 | 58 | 53 |
| | mass % remaining[1] | 99% | 89% | 98% | 80% |
| 25 | starting mass | 76 | 93 | 76 | 71 |
| 400 | final mass | 69 | 76 | 64 | 54 |
| | mass % remaining[1] | 91% | 82% | 84% | 76% |
| 25 | starting mass | 80 | 143 | 134 | 135 |
| 500 | final mass | 69 | 90 | 840 | 66 |
| | mass % remaining[1] | 86% | 63% | 63% | 49% |
| 25 | starting mass | 318 | 148 | 76 | 141 |
| 600 | final mass | 212 | 92 | 40 | 61 |
| | mass % remaining[1] | 67% | 62% | 53% | 43% |
| | theoretical mass% remaining[2] | 68% | 62% | 53% | 43% |
| | $[8]_A$ GNR yield[3] | 99% | 100% | 100% | 100% |

[1] The mass percent remaining was calculated by dividing material mass before and after a heating experiment.

[2] The theoretical mass percent remaining was calculated by comparing the molecular weight of a pristine PDA monomer unit to that of $[8]_A$GNR (after undergoing side-chain loss and exhaustive cyclodehydrogenation).

[3] The overall yield for the PDA to $[8]_A$GNR process was determined by dividing the experimental and theoretical mass percentages for product remaining after heating to 600 °c.

FIG. 25 (Cont.)

Chemical Formula: $C_{182}H_{52}$

1st row (edge): 121.6 - 123.4 ppm (avg. 123.1)  2nd row: 129.5 - 130.4 ppm (avg. 129.8)
3rd row: 124.3 - 125.7 ppm (avg.125.1)  4th row: 123.4 - 125.3 ppm (avg. 124.7)

Table 3

| PDA | No heating (# of scans) | 300 °C, 1h (# of scans) | 330 °C, 1h (# of scans) | 360 °C, 1h (# of scans) | 400 °C, 1h (# of scans) | 500 °C, 1h (# of scans) | 600 °C, 1h (# of scans) |
|---|---|---|---|---|---|---|---|
| 1 | 2048 | 2048 | 2048 | 2048 | 19456 | 12288 | 12288 |
| 2a | 2048 | 2048 | 2048 | 2048 | 24576 | 24576 | 24576 |
| 2b | 2048 | 2048 | 2048 | 2048 | 24576 | 24576 | 24576 |
| 2c | 2048 | 2048 | 2048 | 2048 | 17408 | 40960 | 32768 |

SYNTHESIS OF GRAPHENE NANORIBBONS FROM MONOMERIC MOLECULAR PRECURSORS BEARING REACTIVE ALKYNE MOIETIES

CROSS-REFERENCE TO RELATED APPLICATIONS

This application is a national stage of International Application No. PCT/US2017/062341, filed on Nov. 17, 2017, which claims the benefit of U.S. Provisional Application No. 62/424,345, filed on Nov. 18, 2016, and the benefit of U.S. Provisional Application No. 62/572,387, filed on Oct. 13, 2017, the contents of which are incorporated herein by reference in their entireties.

STATEMENT REGARDING FEDERALLY SPONSORED RESEARCH OR DEVELOPMENT

This invention was made with Government support under grant numbers 1125054 and 1608957, awarded by the National Science Foundation. The Government has certain rights in the invention.

TECHNICAL FIELD

This disclosure generally relates to graphene nanoribbons.

BACKGROUND

Although graphene is characterized by an exceptionally high carrier mobility (>about 200,000 $cm^2$ $V^{-1}$ $s^{-1}$), its zero bandgap has impeded application in logic devices such as field-effect transistors (FETs), the main devices behind modern electronics. Graphene nanoribbons (GNRs), which are narrow ribbons (e.g., width≤about 10 nm) of graphene, allow bandgap tuning through their edge structure and ribbon width, providing the prospect of workable molecular electronics. GNRs have swiftly gained prominence as a result of the development of a number of synthetic approaches and chemical modifications. These synthetic approaches fall into either top-down or bottom-up strategies. Top-down approaches include the chemical unzipping of carbon nanotubes and cutting of single sheets of graphene with an electron beam. These methods demonstrate high material throughput but often produce mixtures of different GNRs and struggle to achieve ribbon widths below about 10 nm. In contrast, bottom-up strategies allow the construction of ribbons from small molecular precursors by taking advantage of the precise control that synthetic chemistry can afford.

Two variations of bottom-up approaches to GNR synthesis have been developed: (1) on-surface aryl radical generation and coupling to form oligoarene backbone polymers, which are subsequently cyclodehydrogenated to produce GNRs, and (2) in-solution synthesis of oligoarene backbone polymers, which are then oxidized to GNRs using chemical oxidants. On-surface synthesis provides good control over nanoribbon structure, giving access to a range of widths and edge functionalizations. These approaches display good synthetic control but can typically produce tiny amounts of materials on very specific substrates, involving high-cost equipment and conditions such as ultra-high-vacuum scanning probe microscopy. In contrast, solution-phase synthesis can produce large amounts (e.g., up to grams) of GNRs but typically involves the use of transition metal catalysts and in-solution oxidation using chemical oxidants.

It is against this background that a need arose to develop the embodiments described herein.

SUMMARY

In some embodiments, a method of forming a graphene nanoribbon includes: 1) providing monomeric precursors each including an alkyne moiety and at least one aromatic moiety bonded to the alkyne moiety; 2) polymerizing the monomeric precursors to form a polymer; and 3) converting the polymer to a graphene nanoribbon.

In additional embodiments, a method of forming a graphene nanoribbon includes: 1) providing a polymer including a backbone including repeating enyne units, and aromatic moieties as side groups bonded to the backbone; and 2) converting the polymer to a graphene nanoribbon.

In further embodiments, a method of forming an electronic device includes: 1) providing a polymer including a backbone including repeating enyne units, and aromatic moieties as side groups bonded to the backbone; 2) disposing the polymer over a substrate; and 3) converting the polymer to a graphene nanoribbon.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawing.

FIG. 19. Cross polarization magic angle spinning (CP/MAS) solid state $^{13}$C NMR spectra of PDAs 1 and 2a-c. Characteristic regions are shaded. Asterisks denote spinning sidebands (about 10 kHz).

FIG. 48. Plot profile analysis (along inserted line) of HRTEM image of [8]$_4$GNR produced from thermal graphitization of PDA 2b. The width of an individual [8]$_4$GNR ribbon was calculated using the geometry of the model segment described in FIG. 47. Distance from the center of an edge hydrogen to the center of the edge hydrogen horizontally across the ribbon was measured using GaussView as about 10.47 Å. To account for the Van der Waals radii of the edge hydrogen (about 1.2 Å), about 2.4 Å was added to the measured width to produce the calculated ribbon width of about 12.9 Å (about 1.3 nm).

DETAILED DESCRIPTION

Figure 1:
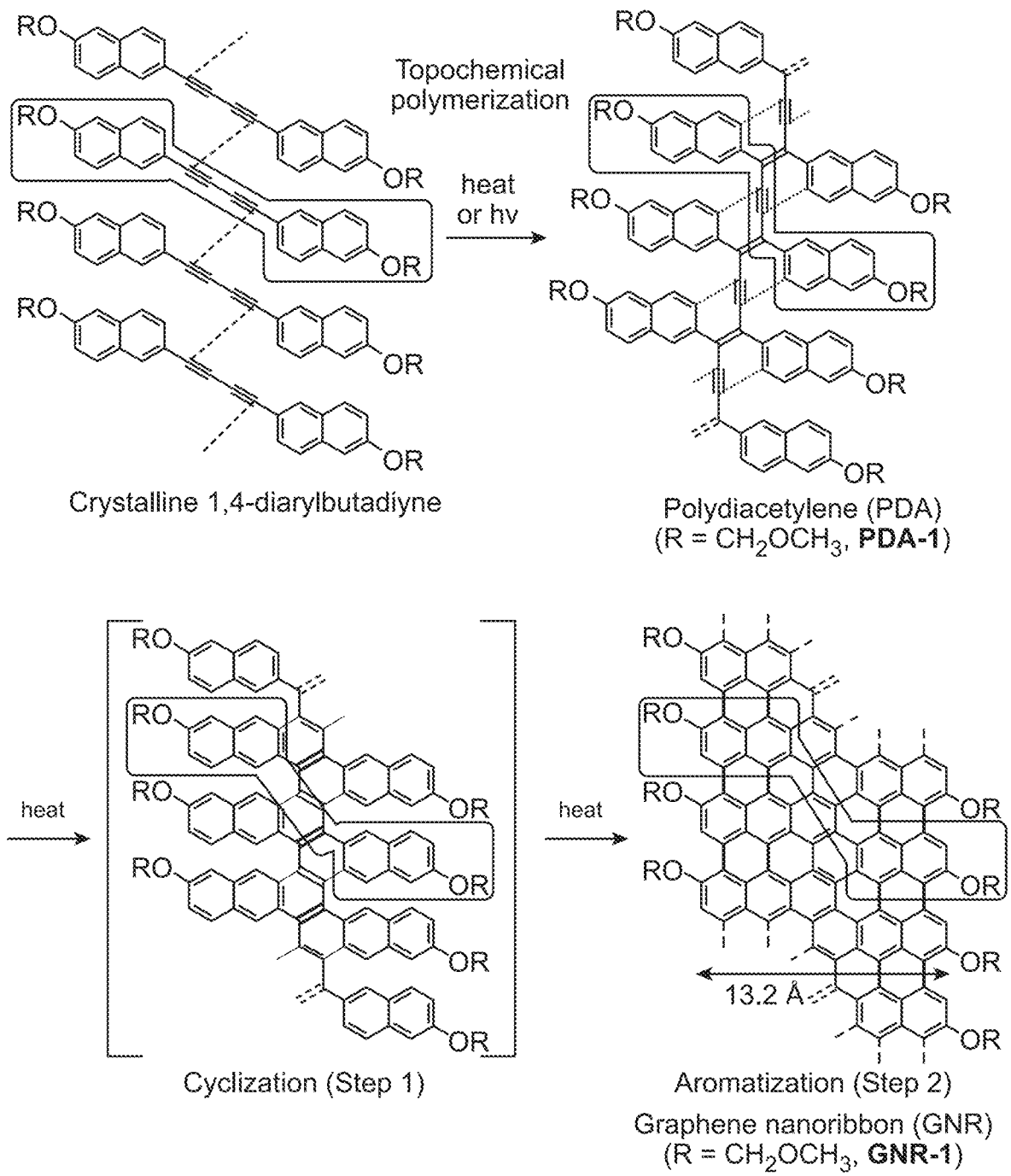
FIG. 1. Scheme 1—Synthetic Approach to GNRs via Topochemical Polymerization of Polyacetylenes (PDAs). The approach is a three-stage process including (1) crystallization of suitable monomers into a solid-state structure suitable for topochemical polymerization, (2) initiation of polymerization using heat or ultraviolet (UV) light, and (3) subsequent heating to promote cyclization of the polydiacetylene backbone and cyclodehydrogenation to produce GNRs.

In an aspect according to some embodiments, a method of forming a graphene nanoribbon includes: 1) providing monomeric precursors each including an alkyne moiety and at least one aromatic moiety bonded to the alkyne moiety; 2) polymerizing the monomeric precursors to form a polymer; and 3) converting the polymer to a graphene nanoribbon.

In some embodiments, the monomeric precursors are represented by a chemical formula:

$R_1$-A-$R_2$, wherein

A is the alkyne moiety, which includes at least one carbon-carbon triple bond (—C≡C—), such as two or more, or three or more triple bonds, and which includes two or more, four or more, or six or more carbon atoms, $R_1$ and $R_2$, in general, can be the same or different, and are (independently) selected from aromatic moieties, which can be monocyclic with a single aromatic ring structure or can be polycyclic with two or more ring structures which may be fused, which can be heteroaromatic including one or more heteroatoms, which can be unsubstituted or can be substituted with one or more substituent groups (e.g., selected from alkyl groups, alkenyl groups, alkynyl groups, aryl groups, alkoxy groups, carbonyl groups, aminocarbonyl groups, amide groups, carbamate groups, urea groups, and so forth), and examples of $R_1$ and $R_2$ include phenyl, naphthyl, and hetero or substituted forms thereof. A carbonyl group refers to —(C=O)R, where R is a hydride group or a hydrocarbon group, such as an alkyl group, an alkenyl group, an alkynyl group, or an aryl group. An aminocarbonyl group refers to —(C=O)NRR', where R and R' are independently selected from hydride groups and hydrocarbon groups. An amide group refers to —NR(C=O)R', where R and R' are independently selected from hydride groups and hydrocarbon groups. A carbamate group refers to —O—(C=O)—NRR', where R and R' are independently selected from hydride groups and hydrocarbon groups. A urea group refers to —NR—(C=O)—NR'R", where R, R', and R" are independently selected from hydride groups and hydrocarbon groups.

In some embodiments, $R_1$ and $R_2$ are the same, and each includes a para-substituent group. In other embodiments, $R_1$ and $R_2$ include substituent groups according to any other substitution patterns, such as ortho or meta-substituent groups.

In some embodiments, the monomeric precursors are, or include, diaryl-substituted polyynes, such as diaryl-substituted diacetylenes, diaryl-substituted triacetylenes, and higher order polyynes that are diaryl-substituted.

In some embodiments, providing the monomeric precursors includes providing the monomeric precursors in a solid state, such as by crystallizing the monomeric precursors into a crystalline form. In other embodiments, the monomeric precursors are provided in another state, such as a liquid state or a gas state.

In some embodiments, polymerizing the monomeric precursors is performed in a solid state, such as where the monomeric precursors are polymerized in a crystalline form. In other embodiments, polymerizing the monomeric precursors is performed in another state, such as a liquid state or a gas state.

In some embodiments, polymerizing the monomeric precursors includes applying energy, such as in the form of heat or electromagnetic radiation (e.g., ultraviolet radiation). In other embodiments, polymerizing the monomeric precursors includes solution synthesis using one or more catalysts, or other reagents used in organic coupling or polymerization reactions.

In some embodiments, polymerizing the monomeric precursors includes heating at a temperature above room temperature and below a melting temperature of the polymer, such as above about 40° C. and up to about 135° C., up to about 130° C., up to about 125° C., up to about 120° C., or up to about 115° C.

In some embodiments, the polymer includes a backbone including repeating enyne units.

In some embodiments, the polymer is represented by a chemical formula:

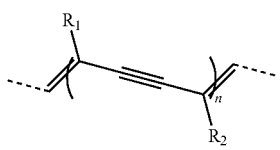

wherein n is an integer that is greater than 1, such as 2 or greater, 5 or greater, 10 or greater, 15 or greater, or 20 or greater, $R_1$ and $R_2$ are side groups of the polymer, $R_1$ and $R_2$, in general, can be the same or different, and are (independently) selected from aromatic moieties, which can be monocyclic with a single aromatic ring structure or can be polycyclic with two or more ring structures which may be fused, which can be heteroaromatic including one or more heteroatoms, which can be unsubstituted or can be substituted with one or more substituent groups (e.g., selected from alkyl groups, alkenyl groups, alkynyl groups, aryl groups, alkoxy groups, carbonyl groups, aminocarbonyl groups, amide groups, carbamate groups, urea groups, and so forth), and examples of $R_1$ and $R_2$ include phenyl, naphthyl, and hetero or substituted forms thereof.

In some embodiments, the polymer is a polydiacetylene. In other embodiments, the polymer is a polytriacetylene or a higher order oligoyne.

In some embodiments, converting the polymer to the graphene nanoribbon is performed in a solid state, such as where the polymer is converted in a crystalline form. In other embodiments, the polymer is in another form when converted, such as a suspension in a liquid, a fibrous solid, and so forth.

In some embodiments, converting the polymer to the graphene nanoribbon includes applying energy, such as in the form of heat, ultraviolet radiation, or flashes of radiation such as from a disk drive reader (e.g., a CD reader) or Xenon lamp.

In some embodiments, converting the polymer to the graphene nanoribbon includes heating at a temperature above room temperature and up to about 700° C., such as up to about 650° C., up to about 600° C., up to about 550° C., or up to about 500° C. In other embodiments, converting the polymer to the graphene nanoribbon includes heating at a temperature above room temperature and up to about 350° C., such as about 150° C. or above, and up to about 300° C., up to about 280° C., up to about 250° C., up to about 230° C., or up to about 200° C. In some embodiments, heating is performed for a time duration of about 2 hr to about 48 hr, about 4 hr to about 36 hr, or about 8 hr to about 24 hr.

In some embodiments, the graphene nanoribbon has a width no greater than about 10 nm, no greater than about 8 nm, no greater than about 6 nm, no greater than about 4 nm, or no greater than about 2 nm, and down to about 1.3 nm or less, or down to about 1.2 nm or less. In some embodiments, the graphene nanoribbon is an armchair nanoribbon including (up to), or consisting of, 3p, 3p+1, or 3p+2 carbon atoms within its width, where p is in an integer, such as 1, 2, 3, 4, 5, and so forth. In some embodiments, the graphene nanoribbon is an armchair nanoribbon including (up to), or consisting of, 3p+2 carbon atoms within its width, where p is in an integer, such as 1, 2, 3, 4, 5, and so forth. In some embodiments, the graphene nanoribbon is an armchair nanoribbon including (up to), or consisting of, 8 carbon atoms within its width.

In another aspect according to additional embodiments, a method of forming an electronic device includes: 1) providing a polymer including a backbone including repeating enyne units, and aromatic moieties as side groups bonded to the backbone; 2) disposing the polymer over a substrate; and 3) converting the polymer to a graphene nanoribbon.

In some embodiments, the polymer is represented by a chemical formula:

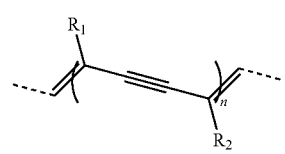

wherein n is an integer that is greater than 1, such as 2 or greater, 5 or greater, 10 or greater, 15 or greater, or 20 or greater, $R_1$ and $R_2$ are the side groups of the polymer, $R_1$ and $R_2$, in general, can be the same or different, and are (independently) selected from aromatic moieties, which can be monocyclic with a single aromatic ring structure or can be polycyclic with two or more ring structures which may be fused, which can be heteroaromatic including one or more heteroatoms, which can be unsubstituted or can be substituted with one or more substituent groups (e.g., selected from alkyl groups, alkenyl groups, alkynyl groups, aryl groups, alkoxy groups, carbonyl groups, aminocarbonyl groups, amide groups, carbamate groups, urea groups, and so forth), and examples of $R_1$ and $R_2$ include phenyl, naphthyl, and hetero or substituted forms thereof.

In some embodiments, the polymer is a polydiacetylene.

In some embodiments, converting the polymer to the graphene nanoribbon is performed in a solid state, such as where the polymer is converted in a crystalline form.

In some embodiments, converting the polymer to the graphene nanoribbon includes applying energy, such as in the form of heat, ultraviolet radiation, or flashes of radiation such as from a disk drive reader (e.g., a CD reader) or Xenon lamp.

In some embodiments, converting the polymer to the graphene nanoribbon includes heating at a temperature above room temperature and up to about 700° C., such as up to about 650° C., up to about 600° C., up to about 550° C., or up to about 500° C. In other embodiments, converting the polymer to the graphene nanoribbon includes heating at a temperature above room temperature and up to about 350° C., such as about 150° C. or above, and up to about 300° C., up to about 280° C., up to about 250° C., up to about 230° C., or up to about 200° C. In some embodiments, heating is performed for a time duration of about 2 hr to about 48 hr, about 4 hr to about 36 hr, or about 8 hr to about 24 hr.

In some embodiments, the graphene nanoribbon has a width no greater than about 10 nm, no greater than about 8 nm, no greater than about 6 nm, no greater than about 4 nm, or no greater than about 2 nm, and down to about 1.3 nm or less, or down to about 1.2 nm or less. In some embodiments, the graphene nanoribbon is an armchair nanoribbon including (up to), or consisting of, 3p, 3p+1, or 3p+2 carbon atoms within its width, where p is in an integer, such as 1, 2, 3, 4, 5, and so forth. In some embodiments, the graphene nanoribbon is an armchair nanoribbon including (up to), or consisting of, 3p+2 carbon atoms within its width, where p is in an integer, such as 1, 2, 3, 4, 5, and so forth. In some embodiments, the graphene nanoribbon is an armchair nanoribbon including (up to), or consisting of, 8 carbon atoms within its width.

In some embodiments, the electronic device is a transistor, and the graphene nanoribbon is a semiconducting channel of the transistor.

In some embodiments, the method further includes forming one or more electrodes electrically connected to the graphene nanoribbon.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Synthesis of Graphene Nanoribbons Via Topochemical Polymerization and Subsequent Aromatization of a Diacetylene Precursor Overview The development of powerful, compact, and inexpensive electronic devices has resulted in a dramatic change in society over the last few decades. GNRs are promising materials for the replacement of silicon in field-effect transistors. The use of GNRs has been impeded by the lack of controlled, scalable synthetic methods. Here, this example is directed to a bottom-up approach to synthesizing GNRs from a monomeric precursor by utilizing two solid-state transformations. The resulting GNRs have a well-defined width and bandgap and are electrically conductive. This versatile method can be expanded into a general, controllable route for producing a large variety of GNRs with controllable sizes and electrical properties, which should have a great impact on field-effect transistors, solar cells, and energy-storage devices.

In this example, a synthetic approach to GNRs uses butadiyne-containing monomers that are initially converted to polydiacetylenes via topochemical polymerization in a crystal. Subsequent aromatization of isolated polydiacetylenes at surprisingly mild temperatures affords graphene nanoribbons of about 1.36 nm in width with about 1.4 eV bandgap. These transformations take place in the solid state, in contrast to on-surface or in-solution methods. This synthetic approach is well suited for electronic device fabrication processes because it involves just ultraviolet (UV) light or heating and no external chemical reagents. The synthetic approach method is extendable to a large array of aromatic acetylene derivatives, including diacetylenes (or butadiyne), triacetylenes, and higher order polyynes substituted with aromatic moieties, including heteroaromatic moieties. The mechanism for aromatization from polydiacetylene to GNR can be understood with aromatic moieties having an ortho, metal, or para-substituent group, which proceeds as a series of dienyne cyclization reactions (Hopf cyclization) followed by dehydrogenation reactions.

A process allows the bottom-up synthesis of GNRs in three stages: (1) synthesis and crystallization of monomeric precursors to achieve tight intermolecular distances between terminal butadiyne carbons in the crystal (C1-C4 distance of about 3.6 Å or less), (2) in-crystal topochemical polymerization to polydiacetylene molecules, and (3) exhaustive cyclization and aromatization to graphene nanoribbons (Scheme 1 in FIG. 1). Specifically, 1,4-bis(6-methoxymethyloxynaphthalen-2-yl)butadiyne (1) undergoes topochemical polymerization to the corresponding polydiacetylene (PDA-1). Heating of PDA-1 under an inert atmosphere at unusually mild temperatures (about 150° C.-300° C.) provides graphene nanoribbons with an average width of about 1.36 nm and an optical band gap of about 1.4 eV. The chemical and morphological properties of these GNRs are confirmed by Raman spectroscopy, UV-visible-near-infrared (UV-vis-NIR) spectroscopy, X-ray photoelectron spectroscopy (XPS), electron diffraction, scanning electron microscopy (SEM), and transmission electron microscopy (TEM). As opposed to other bottom-up synthetic approaches to GNRs, both the monomer-to-PDA and PDA-to-GNR conversion processes occur in the solid state without the need for any additional reagents. Such features are desirable for ultimate device applications because they can be more readily incorporated into the fabrication of electronics.

Proof-of-concept patterning of microscopic features of GNRs is demonstrated via selective adsorption. Finally, preliminary electrical property measurements of these GNRs indicate that they are indeed conductive.

Monomer Design and Synthesis

An aspect of the process is the design of a monomer suitable for (1) undergoing topochemical polymerization to the corresponding PDA polymer and (2) facilitating complete cyclization of the PDA backbone and aromatic substituents to a GNR. From an initial hypothesis, it is rationalized that aryl substituents on the PDA backbone can undergo aromatization via a series of intramolecular dienyne electrocyclizations (Scheme 1). Since naphthalene is less stabilized by aromaticity than benzene, and therefore more reactive, a selection was made to synthesize dinaphthylbutadiyne-based monomers, which should have a higher propensity for graphitization reactions. For the topochemical polymerization of butadiynes to be feasible under mild conditions, several factors should be satisfied in the crystalline state. First among these is achieving a tight (≤about 3.6 Å) C1-C4 packing distance between adjacent butadiyne moieties. Accordingly, several diarylbutadiynes (1-4) are synthesized, and their solid-state packing is investigated by single-crystal X-ray diffraction (FIG. 2)

Figure 2B:
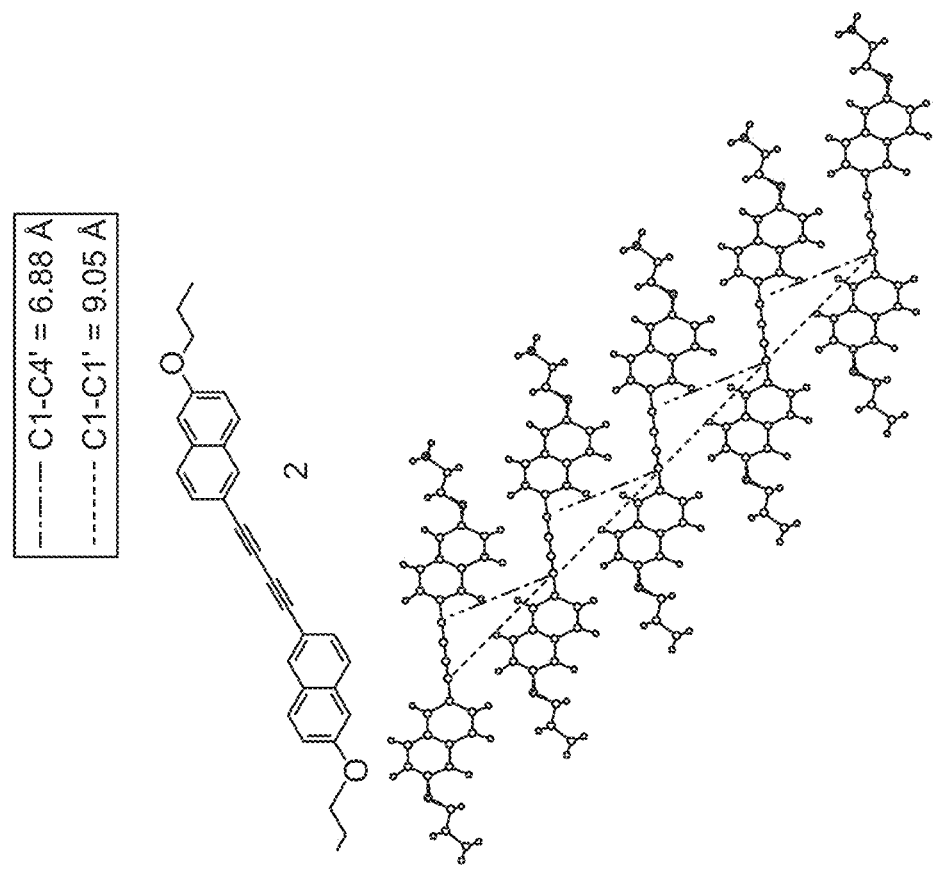
FIG. 2. Solid-State Packing Parameters for Synthesized Diarylbutadiynes. (A-C) C1-C4 and C1-C1 distances are displayed for compounds 1 (A), 2 (B), and 3 (C). (D) Compound 4 displays two repeating C1-C4 distances as highlighted, and its C1-C4 and C1-C1 distances are shown.
Figure 2A:
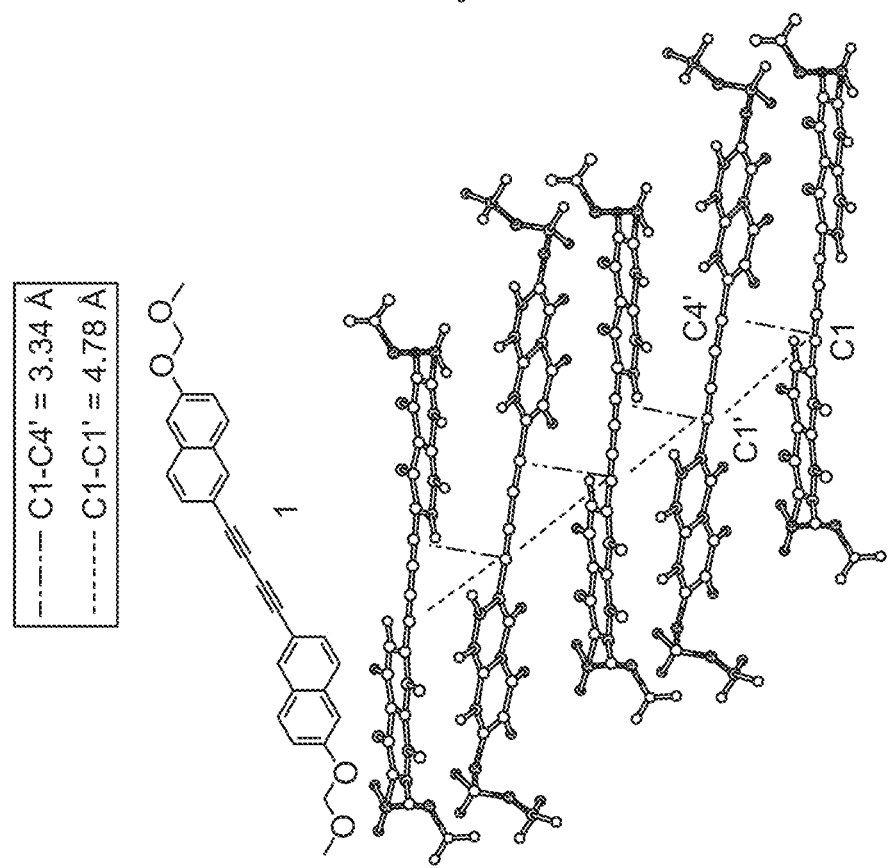
Figure 2D:
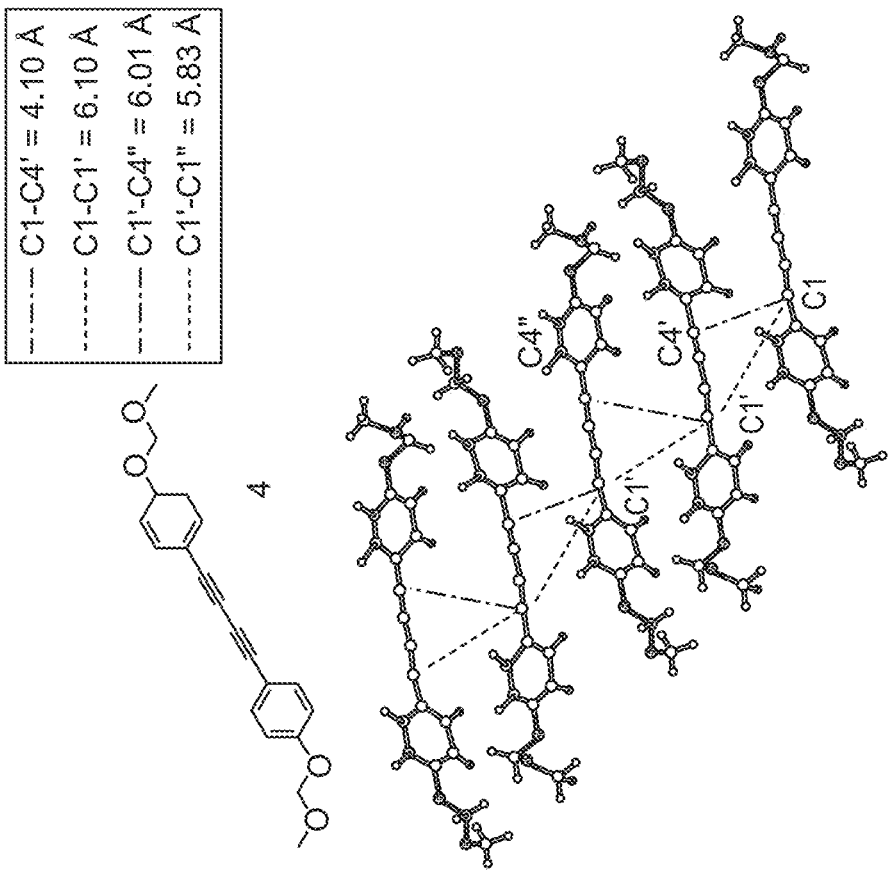
Figure 2C:
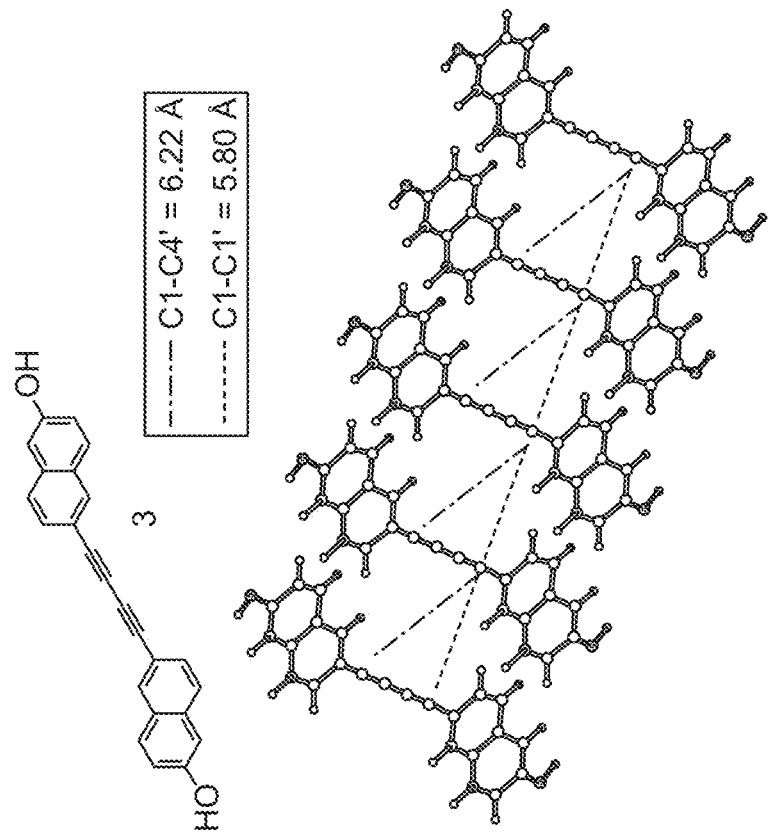
Figure 8:
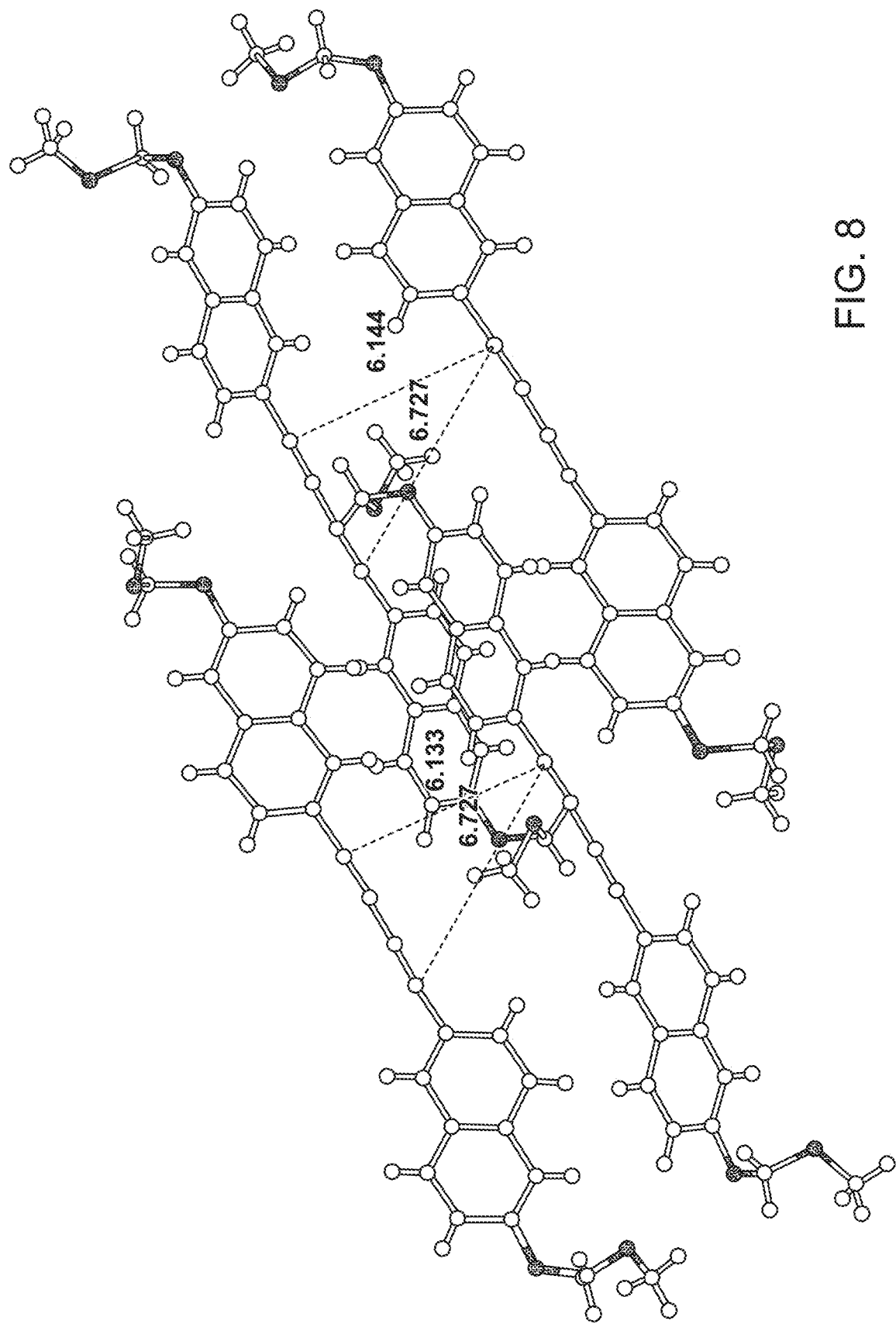
FIG. 8. X-ray crystal structure of an unreactive polymorph of monomer 1. C1-C4' distance of about 6.727 Å and C1-C1' distance of about 6.133 Å highlighted on structure. Crystals of this polymorph do not undergo topochemical polymerization even when treated with UV light.

As can be seen from the X-ray crystallographic data, compound 1 organizes its butadiyne moieties within one parameter for a topochemical polymerization to occur, namely the close C1-C4 carbon distance (FIG. 2A). Compound 1 has substantially perfect inversion symmetry with respect to the center of the butadiyne moiety and has a tight C1-C4 distance of about 3.34 Å. However, it also has an unusual zigzag relationship between molecules along the stacking axis, with the angle between the two mean planes specified by the two different pairs of symmetrically related diyne moieties being about 63.8°. To investigate how the methoxymethyl (MOM) group affects this organization, diynes 2 and 3 were also synthesized. Interestingly, replacement of the MOM group with the isosteric propyl group dramatically changed the packing structure to a herringbone arrangement, which more than doubled the C1-C4 distance to about 6.9 Å (FIG. 2B). The efficient packing of diyne 1 in the crystal is attributed to the bent shape of its MOM side chain, due to the anomeric effect between the two oxygen atoms, which allows for tighter packing of the monomer units overall. Removal of the MOM groups to give the corresponding dinaphthol 3 also dramatically changed the stacking pattern and increased the C1-C4 distance to about 6.2 Å (FIG. 2C). Thus, both compounds 2 and 3 highlight the desirable presence of the MOM group on the butadiyne organization of the dinaphthyl system 1 within crystals. Synthesis is also made of the diphenyl butadiyne 4 containing two MOM groups for comparison. While diyne 4 contains an aryl-MOM motif similar to that of diyne 1, it does not result in a solid-state packing structure amenable to topochemical polymerization (FIG. 2D). Furthermore, isolation is made of another polymorph of diyne 1 that does not contain ideal packing parameters, and topochemical polymerization did not occur (FIG. 8). These results highlight the sensitivity of the crystalline state organization to small structural perturbations.

Figure 3:
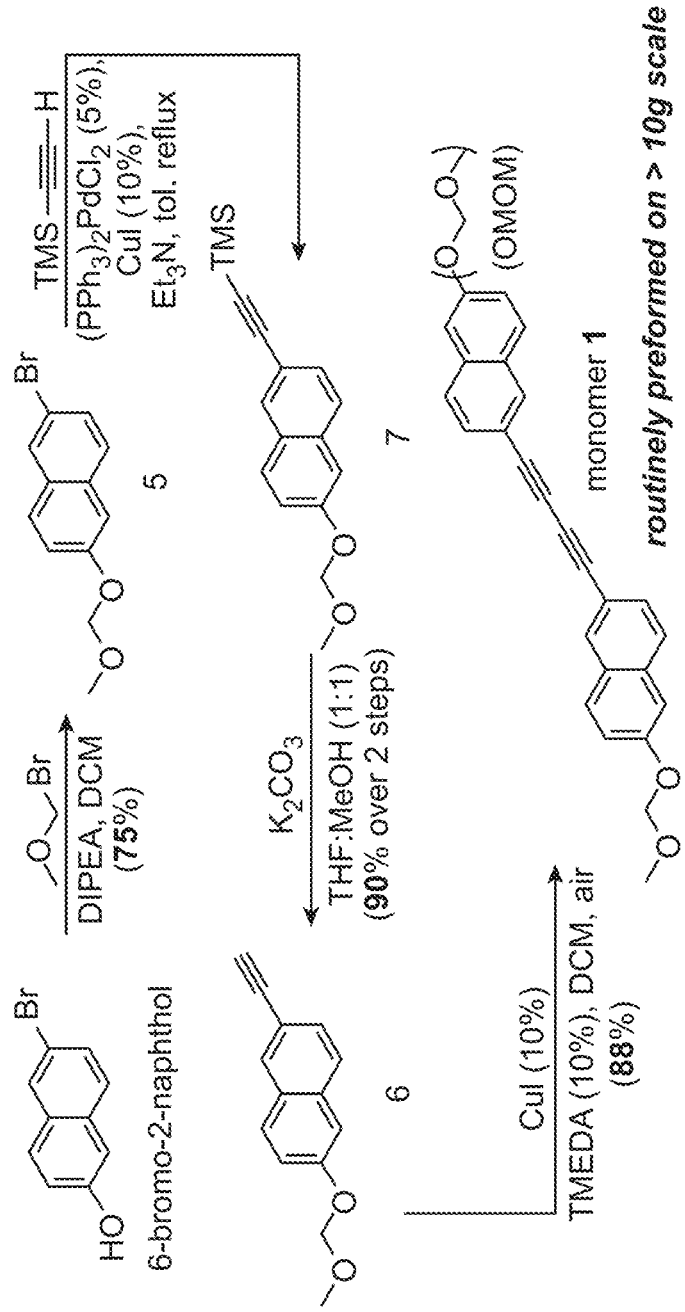
FIG. 3. Scheme 2—Synthesis of Monomer 1. Monomer 1 is prepared in four stages in about 60% overall yield from commercially available 6-bromo-2-naphthol.

The synthesis of diyne monomer 1 is concise and can be readily applied to a large scale. This compound was synthesized in four stages with about 60% overall yield from commercially available 6-bromo-2-naphthol (Scheme 2 in FIG. 3). Some features of the synthesis are that a single column chromatography separation stage was involved, and the final product can be obtained as a bulk crystalline solid after recrystallization from acetonitrile/water. Importantly, the bulk crystals contain substantially the same crystalline state packing motif as the single crystal and are suitable for topochemical polymerization by either UV irradiation or thermal energy.

Topochemical Polymerization of Monomer 1

Figures 4A, 4B:
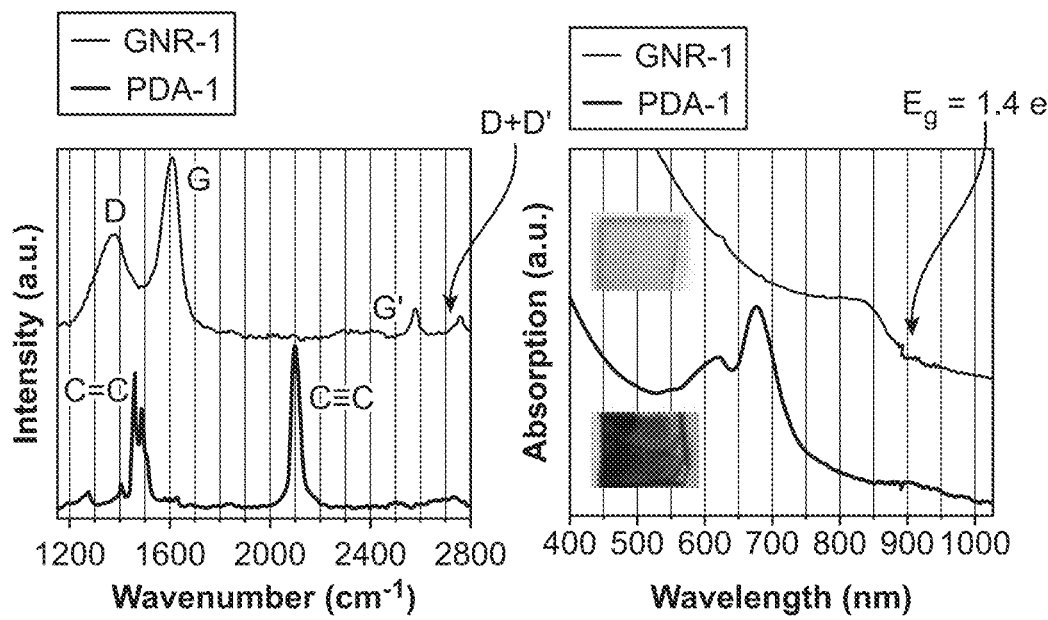
FIG. 4. Chemical and Crystallographic Characterization of PDA-1 and GNR-1. (A and B) Raman (A) and UV-visible-near-infrared (UV-vis-NIR) (B) spectra of PDA-1 and GNR-1. Pictures in (B) illustrate the color change upon the conversion from PDA-1 (bottom blue film) to GNR-1 (top brownish black film). (C and D) Selected-area electron diffraction (SAED) patterns of PDA-1 (C) and GNR-1 (D). Insets are the transmission electron microscopy (TEM) images of the areas where diffraction patterns were collected.
Figure 9A:
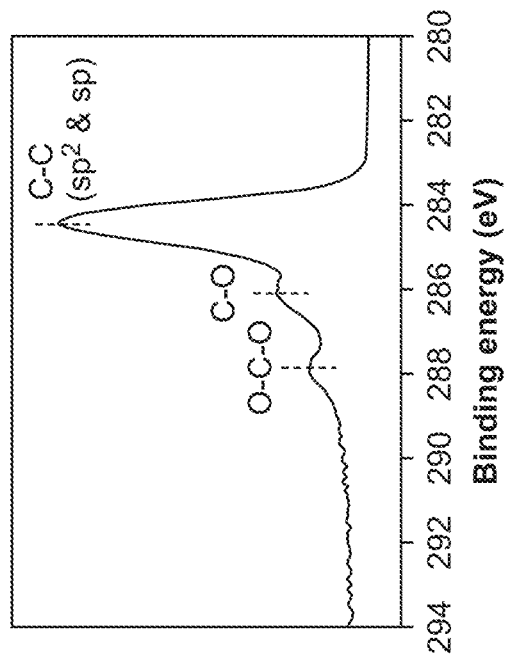
FIG. 9. X-ray photoelectron spectroscopy (XPS) C1s spectra of (a) PDA-1, (b) GNR-1, and (c) PDA-1 and GNR-1 spectra overlapped for comparison.
Figure 9C:
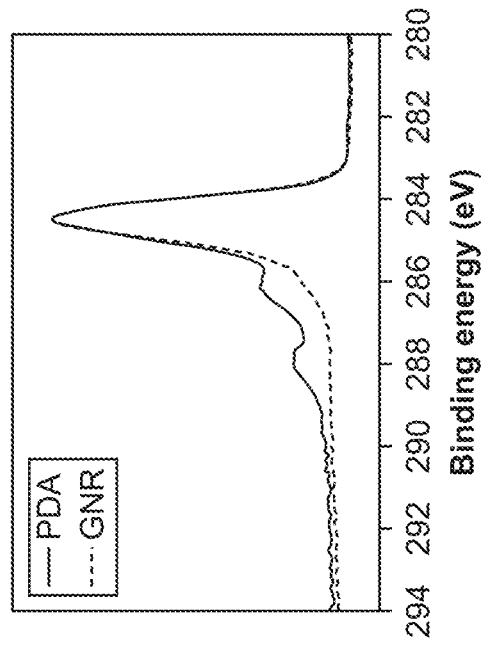
Figure 9B:
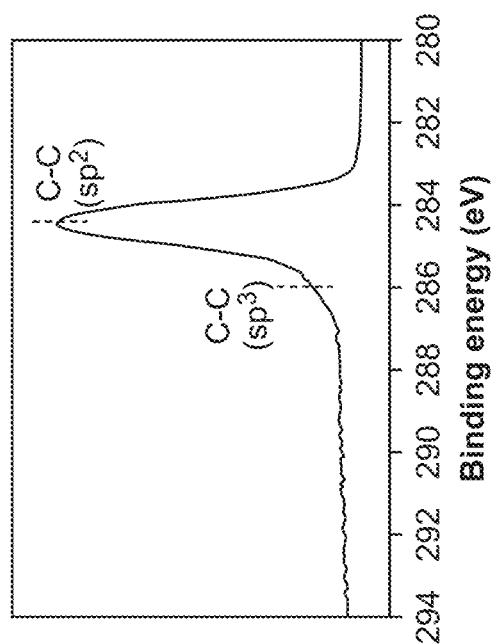

Crystals of 1 polymerize spontaneously at room temperature upon exposure to UV light. The polymerization proceeds slowly at room temperature but can be accelerated via thermal annealing at about 115° C. (below the melting temperature of 1 at about 137-138° C.) or irradiation with about 254 nm light, which imparts a dark green color to the crystals. Upon dissolution in chloroform to wash away unreacted monomer, PDA-1 is recovered. The PDA-1 appears in the forms of fibers, or paper-like sheets composed of aggregated fibers if collected on a filter, and displays a deep blue color characteristic of the PDA backbone, with broad absorption peaks at about 620 and about 670 nm (FIG. 4A). The polymer formed stable blue dispersions upon sonication in chloroform and can be processed onto virtually any substrate. The structure of the polymer was also characterized using Raman spectroscopy (FIG. 4B). The Raman spectrum of PDA-1 displayed two characteristic stretches at about 1,450 and about 2,100 $cm^{-1}$, corresponding to the internal alkene and alkyne stretching modes of the PDA polymer backbone, respectively. The chemical structure was further confirmed by XPS. The high-resolution C1 s spectrum for PDA-1 showed prominent peaks at about 284.5, about 286.3, and about 288.0 eV, which represent C—C, C—O, and O—C—O bonded carbons, respectively (FIG. 9). Note that since the alkyne and alkene carbons are very close in binding energy, they appear as one peak centered about 284.5 eV.

GNR Formation and Characterization

Heating polymer PDA-1 at relatively moderate temperatures (e.g., about 300° C. for about 8 hr) under inert atmosphere, such as argon or a vacuum, led to the loss of the characteristic blue color, and the material took on a deep brown to black color. Raman spectroscopy of this material shows it to be graphitic in nature and consistent with bottom-up-synthesized GNRs (FIG. 4B). The backbone alkene and alkyne stretches at about 1,450 and about 2,100 $cm^{-1}$ corresponding to PDA-1 were absent after heating and were replaced by the characteristic G and D peaks of graphene-based materials. Compared with large-area graphene, the G peak was upshifted to about 1,610 $cm^{-1}$ and had a larger full width at half peak height as a result of quantum confinement effects that relax the Raman selection rules. The D peak at about 1,380 $cm^{-1}$ arose as a result of the confinement of π-electronics into a finite domain. The breadth of the G and D peaks could also indicate the presence of non-$sp^2$ carbon species, given the small amount of defects formed during the aromatization process.

XPS analysis allowed confirmation of the presence of a small amount of defects in the GNR (FIG. 9). First, the C1s spectrum for GNR-1 was devoid of the oxygen-bound components, as evidenced by the disappearance of the C—O and O—C—O peaks at about 286.3 and about 288.0 eV, respectively. This indicates that the MOM substituents on PDA-1 are removed in the aromatization process to GNR-1. In addition, aside from the $sp^2$ C peak at about 284.5 eV, a small shoulder was seen at about 286 eV, which can be attributed to amorphous $sp^3$ carbon. This may be due to the creation of a small amount of defect sites in the formed GNRs, and explains the breadth of the D and G bands seen in the Raman spectra (FIG. 4B).

UV-vis-NIR spectroscopy also confirmed the PDA-to-GNR conversion (FIG. 4A). Absorption peaks at about 620 and about 675 nm characteristic of PDA-1 were replaced with a peak at about 840 nm after the heating stage. An optical band gap of about 1.4 eV can be calculated from the absorption edge at about 890 nm for the GNR.

Figures 4C, 4D:
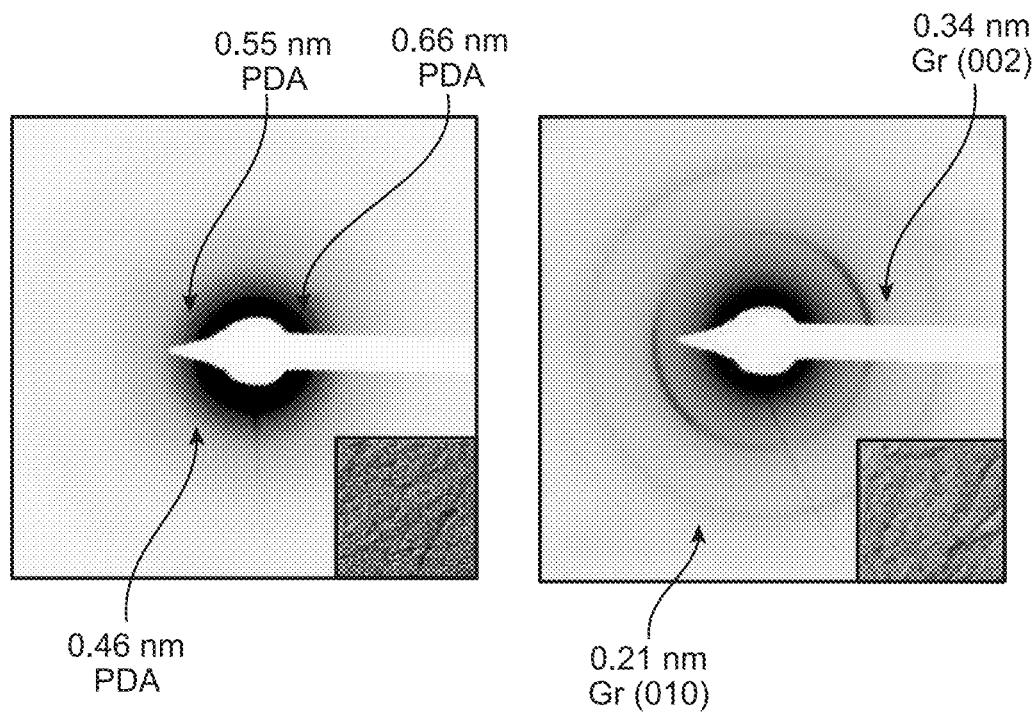
Figure 10A:
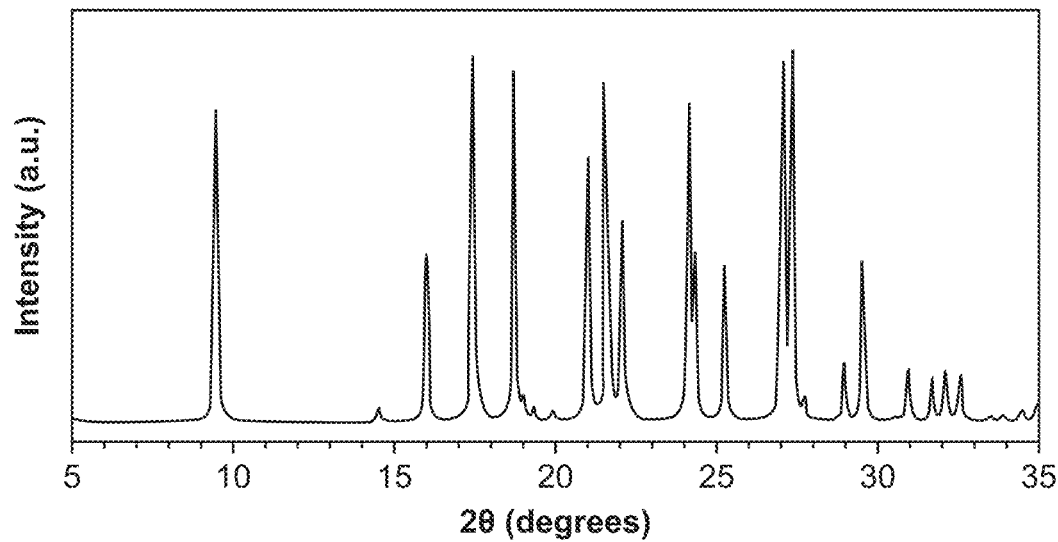
FIG. 10. Powder X-ray diffraction (XRD) pattern simulated from single crystal XRD data of the monomer-1 plotted in (a) reciprocal spacing and (b) d-spacing. None of the SAED diffraction spacing values obtained for PDA-1 (about 0.46, about 0.55, about 0.66 nm, see FIG. 4C) matches with any of the monomer peaks, indicating its substantially full topological conversion to PDA-1.
Figure 10B:
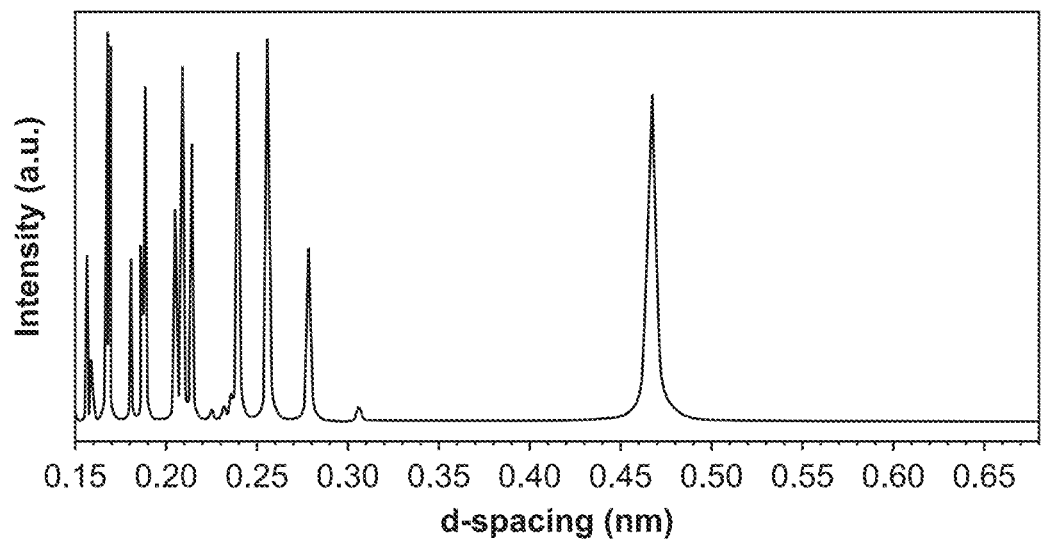

The GNR formation was further verified via selected-area electron diffraction (SAED) Because of the small size of the PDA-1 or GNR-1 fibers, and their susceptibility to electron beam damage, it can be challenging to collect diffraction patterns on individual ribbons. Hence, areas containing clusters of PDA-1 fibers or GNRs were chosen (insets to FIGS. 4C and 4D), which yielded ring-like patterns as a result of the combination of diffraction spots in all orientations. SAED patterns of PDA-1 showed three diffraction rings with d spacings of about 0.66, about 0.55, and about 0.46 nm (FIG. 4C) and did not correspond to any diffraction peak from the monomer (see FIG. 10 for comparison), demonstrating the formation of a different compound. The SAED patterns of clusters of GNR-1 showed two sharp rings at about 0.34 and about 0.21 nm that were characteristic of the graphene (002) and (010) spacings, which crystallographically confirm the graphitic nature of GNR-1.

Although the PDA-to-GNR aromatization process was carried out at about 300° C., it can also proceed at lower temperatures (e.g., <about 200° C.), but at a slower rate. FIG. 11A shows the UV-vis-NIR spectra of films of monomer 1, PDA-1, and GNR-1 after about 8 hr of annealing under argon at various temperatures. The absorption peaks characteristic of PDA-1 (about 620 and about 675 nm) started to diminish in intensity at temperatures as low as about 200° C. The absorption associated with GNR-1 at about 840 nm started to appear after annealing at about 250° C., indicating full aromatization of the polymer. The peak grew further in intensity when the thermal treatment was carried out at about 300° C.

Figure 11B:
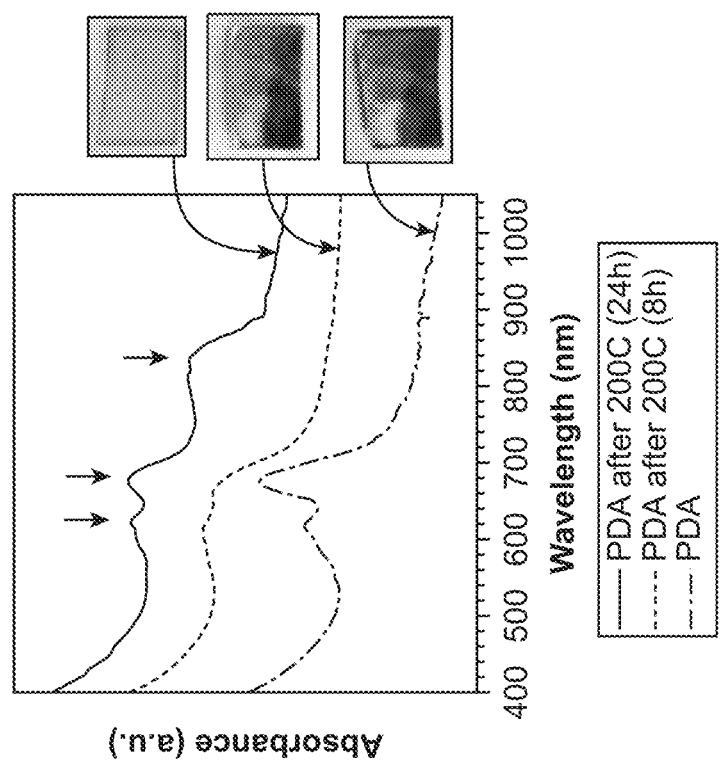
FIG. 11. UV-vis-NIR spectra monitoring the PDA-1 to GNR-1 aromatization process (a) under about 8 hr of annealing at different temperatures and (b) at about 200° C. over various durations.
Figure 11A:
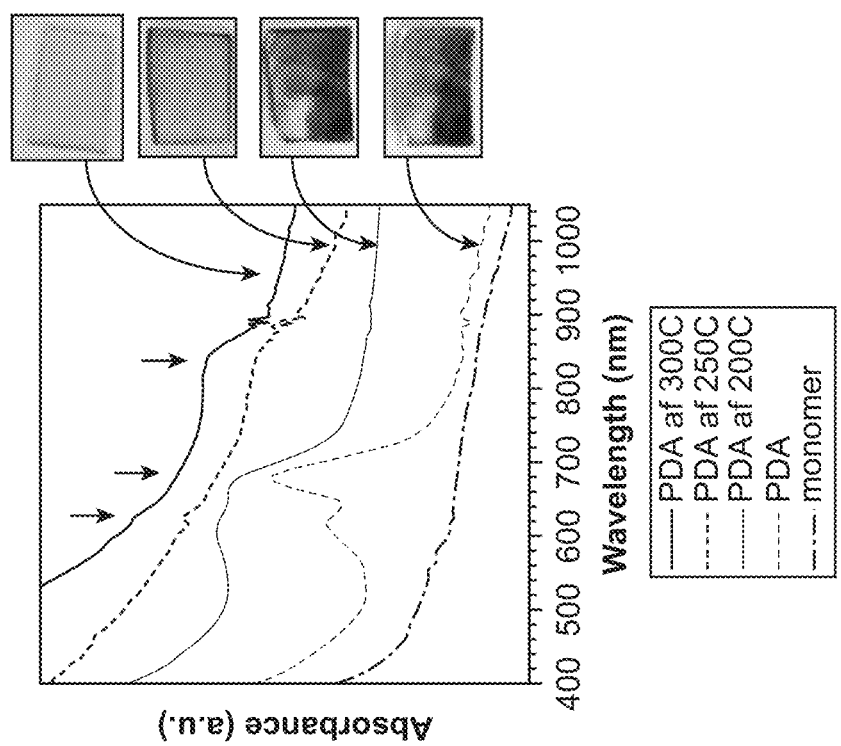

In order to monitor the PDA-to-GNR conversion, a film of PDA-1 was annealed at about 200° C. for various durations of time, and its absorption was monitored by UV-vis-NIR spectroscopy (FIG. 11B). The PDA absorption peaks were still present (albeit lower in intensity) after about 8 hr of heating in argon at about 200° C. However, after the annealing time was increased to about 24 hr, the about 840 nm peak associated with GNR formation coexisted with the PDA-1 absorptions. This provides evidence that the backbone of the polydiacetylene is aromatized under prolonged heating even at relatively mild temperatures.

Note that since the topochemical polymerization and aromatization processes are activated by UV or thermal energy, both the monomer-to-PDA and the PDA-to-GNR processes proceed in the solid state. This feature provides a significant advantage over other bottom-up GNR-synthesis approaches that are solution based as a result of the elimination of reagents and its compatibility with electronic device fabrication processes. This process also can be evaluated for self-assembled monolayers of diyne 1 or similarly substituted congeners.

Microscopic Analysis of GNRs

Figures 5A, 5B:
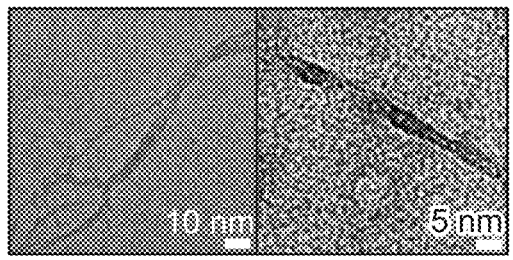
FIG. 5. TEM Characterization of GNR-1. (A and B) TEM images of a bundle of GNRs (A) and two adjacent individual GNRs (B). (C) High-resolution TEM image of a GNR stack shows the characteristic (002) graphene interlayer spacing. Inset is the FFT pattern of the lattice fringes. (D) High-resolution TEM image reveals the well-ordered basal plane of the GNR. The corresponding fast Fourier transform (FFT) pattern along the index is shown in the inset. The dash lines border the edge of the GNR.
Figure 12A:
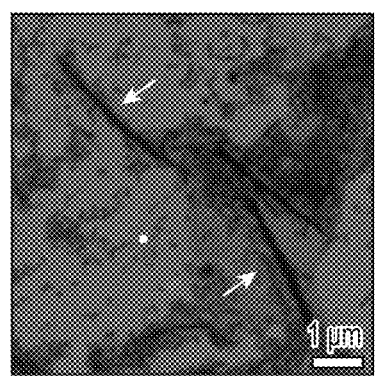
FIG. 12. Scanning electron microscopy (SEM) and TEM characterization of GNR-1. (a) and (b) are SEM images showing the aggregated fibers of GNR-1. Scarce amount of large fibers such as the ones indicated by white arrows in (a) are present on the substrates, but can be disassembled into smaller entities by extensive sonication. TEM images in (c)-(f) show GNR-1 under different magnifications. (c) shows a thin bundle of GNR-1. Larger sheets can also be observed (d and e), which show fiber-like internal structures. A higher magnification TEM image (f) reveals these sheets are comprised of aggregates of GNRs. Line profile across the GNR-1 bundles (g) allows calculation of the average width of these thin ribbons, which is about 1.36 nm, agreeing with the width calculated based on chemical structures.
Figure 12B:
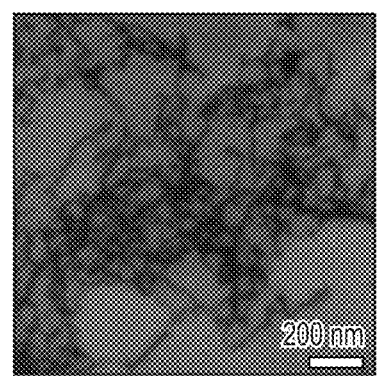
Figure 12C:
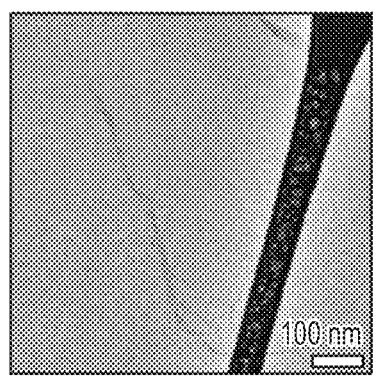
Figure 12D:
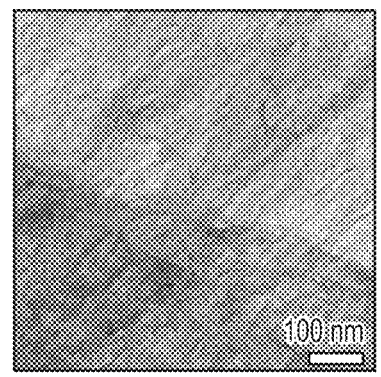
Figure 12E:
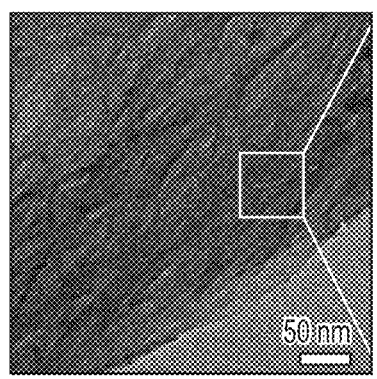
Figure 12F:
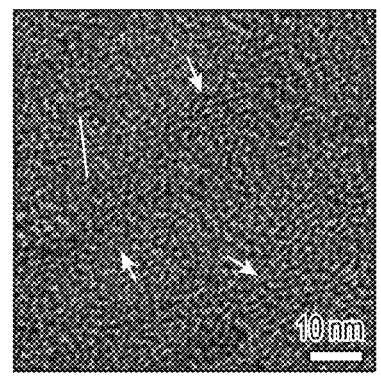
Figure 12G:
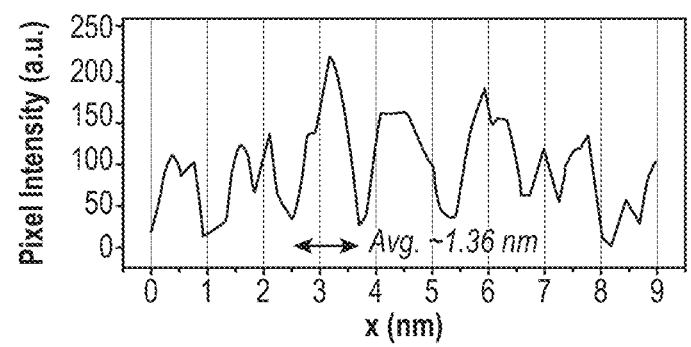

The successful transformation of PDA-1 to GNR-1 was further confirmed through SEM and TEM characterization. FIG. 5A shows a bundle of ribbon-like structures in which the larger ribbon (about 10 nm in width) splits into finer features as small as <about 2 nm in width. The higher-resolution image zooming on a section that is about 5 nm in width reveals two thin ribbons (<about 2 nm) lying adjacent to each other, with a width similar to the calculated GNR-1 width of about 1.32 nm on the basis of the molecular structure (Scheme 1). GNR-1 processed from PDA-1 fibers that are mildly sonicated tend to form sheet-like structures as a result of the aggregation of many GNRs (FIG. 12). The fine nanoscaled ribbon features are evident in TEM images (FIGS. 12D and 12E). Higher-resolution images allow observation of the individual GNR-1 constituents (FIG. 12F), where each bundle comprises GNRs oriented parallel with respect to each other. A line profile across these bundles (e.g., the highlighted line in FIG. 12F) reveals periodic repeating distances (FIG. 12G) that are averaged to about 1.36 nm (averaged over >30 ribbons across multiple areas), which is very similar to the calculated GNR width of about 1.32 nm (Scheme 1), further confirming the formation of GNRs.

Figure 5C:
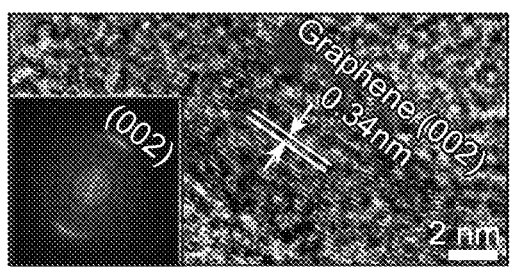
Figure 5D:
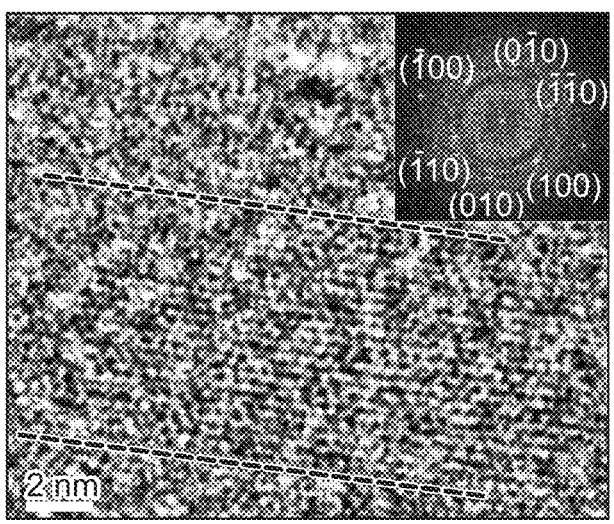

Stacks of GNRs assembled via co-facial $\pi$-$\pi$ interactions were also observed in TEM. FIG. 5C shows such a stack with a characteristic (002) graphitic interlayer spacing of about 0.34 nm. Resolving the atomic structure of graphitic materials on TEM without spherical aberration correction features is challenging, particularly for individual GNRs. However, although the majority of GNRs observed were <about 2 nm in width (FIGS. 5A, 5B, 12F, and 12G), occasionally the TEM sample contained larger-area GNRs that were about 7.8 nm wide, which allowed resolving of the hexagonal atomic lattice of its basal plane (FIG. 5D). The fast Fourier transform (FFT) pattern of the high-resolution TEM image (inset to FIG. 5D) agrees with the crystal structure of the graphene basal plane, confirming full aromatization. The about 7.8 nm width of such graphene ribbons indicates that about six original GNRs have possibly fused together. Although this can be further investigated, such edge-to-edge fusion can provide a path for controlled synthesis of larger GNRs.

Patterning and Electrical Measurements

Figure 6A:
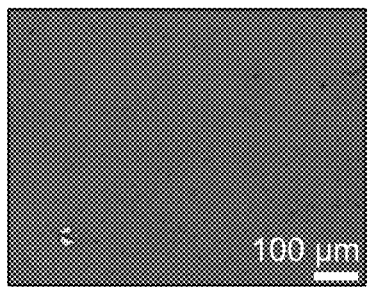
FIG. 6. Patterning and Electrical Property Characterization. (A-C) Optical microscopy images of stars, lines, and UCLA CHEM which patterns comprise GNR thin films obtained by selective-area adsorption of PDA followed by solid-state aromatization. (D) Optical microscopy image of a GNR transistor. (E) Transfer characteristics of a GNR transistor at $V_{sd}$=about 1 V. (F) Drain current ($I_{sd}$) versus source-drain voltage ($V_{sd}$) under different gate-modulation voltages.
Figure 6B:
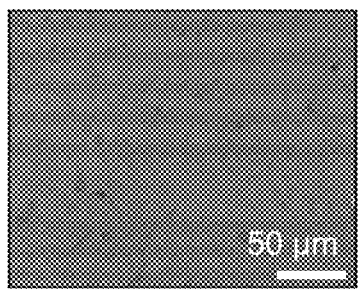
Figure 6C:
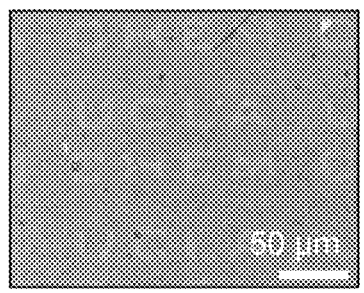

Microscopic patterning is a part of fabrication of various electronic devices. Here, a demonstration is made of patterning GNR-1 ribbons into microscale features by selective adsorption. The patterning stages are summarized in FIG. 13. In short, photolithography is used to create desired microscopic features on $SiO_2$/Si wafers and these features are treated with a monolayer of octadecyltrichlorosilane (OTS) before photoresist liftoff. These patterned substrates were dip coated in a heavily sonicated chloroform dispersion of PDA-1. Because of the higher binding affinity that these organic polymers have for hydrocarbon-terminated surfaces over oxide surfaces, the PDA-1 fibers selectively adsorbed on the OTS-covered microscale features. The PDA-1-coated substrates were then thermally aromatized to GNR-1. FIGS. 6A and 6B show GNR films patterned in star and line shapes, respectively. Feature resolution as small as about 10 µm can be achieved (FIG. 6B). Reverse coverage is also possible by treating the areas outside the patterns with OTS instead. FIG. 6C shows a substrate with such inverted patterns where the UCLA CHEM shapes are left intact, while other surfaces are covered with GNRs. Note that because of the small size of GNRs, these micrometer-sized, photolithographically patterned features are several orders of magnitude larger than the dimension of GNR-1. The feature sizes can be further scaled down by incorporating e-beam or nanoimprint lithography. The demonstration illustrates the possibility of selectively depositing a single or a few GNRs at desired locations on a substrate or potentially in circuits.

Figure 6D:
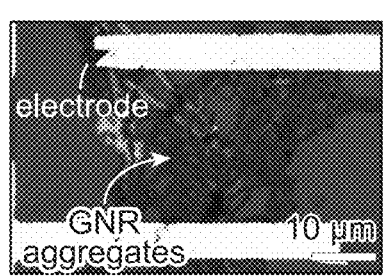
Figure 6E:
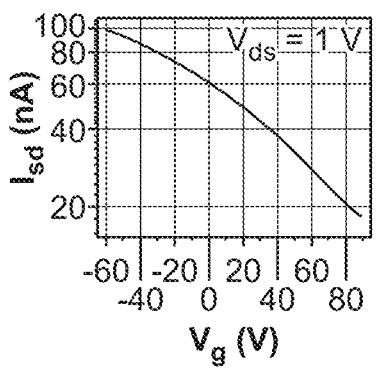
Figure 6F:
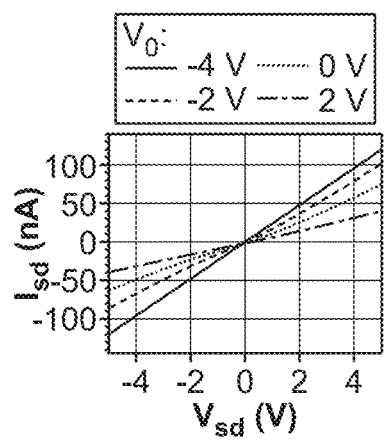

In order to probe the electrical properties of the topochemically synthesized GNRs, bottom-contact, back-gate, FETs were fabricated. A dispersion of PDA in chloroform was drop cast onto an OTS-coated $SiO_2$/Si wafer with microelectrodes fabricated by photolithography, followed by thermally induced aromatization to GNR. FIG. 6D illustrates a representative device. The transfer characteristic indicates that here the GNR is heavily p-doped with a Dirac point of about or slightly beyond 85 V (FIG. 6E). The heavily shifted Dirac point could be attributed to the presence of the OTS adhesion layer and solvent molecules trapped between the GNR and the dielectric layer. FIG. 6F demonstrates the gate-modulation behavior of the transistor, where the drain current ($I_{sd}$) changes under different gate voltages ($V_g$). The low-field field-effect mobility expression is used here for mobility calculations:

$$\mu = \frac{dI_{sd}}{dV_g} \times \frac{L}{W \cdot C_i \cdot V_{sd}},$$

where the channel length L is about 24 the channel width W is integrated on the basis of the GNR aggregate coverage between the electrodes, and the capacitance $C_i$ for the OTS-treated about 300-nm-thick $SiO_2$ dielectric layer is about 10 nF/cm. The devices show an average mobility μ of about 0.15 cm² V⁻¹ s⁻¹ and an $I_{on}/I_{off}$ value of about 5 (under the assumption that the Dirac point is about 85 V). The mobility value is comparable with other devices. Note that because of the small size of the GNRs, it is challenging to fabricate FETs on the basis of single ribbons to probe their intrinsic properties. There are numerous randomly stacked GNRs within the channel area. The tremendous number of junctions between GNRs create contact resistance, which greatly decreases the drain current ($I_{sd}$). The contact resistance may also be attributed to a much-lowered $I_{on}$, which leads to a low $I_{on}/I_{off}$ value. In addition, as a result of the collective effect of numerous GNRs within the channel, it is possible that the electrical property is approaching bulk, which could contribute to a bulk-graphene-like low $I_{on}/I_{off}$ ratio. Note that the purpose of the electrical-property measurements here is to complement the spectroscopic and microscopic characterization of the GNRs, which demonstrates that they are indeed electrically active, further confirming the aromatization of PDA-1 to GNR-1. Further probing of the intrinsic properties of individual GNRs can be made.

In conclusion, a bottom-up approach to synthesizing GNRs with a well-defined width (e.g., about 1.36 nm) and bandgap (e.g., about 1.4 eV) includes starting with diacetylenes such as dinaphthyl diyne derivative 1. This process involves an in-crystal topochemical polymerization of dinaphthyl diyne 1 to the polydiacetylene polymer PDA-1, which can be isolated and manipulated in stable suspensions. Subsequent aromatization at relatively mild temperatures efficiently converts PDA-1 to GNR-1. This approach can lend itself to nanofabrication methods on a large scale using relatively inexpensive procedures.

Experimental Procedures

Figure 7:
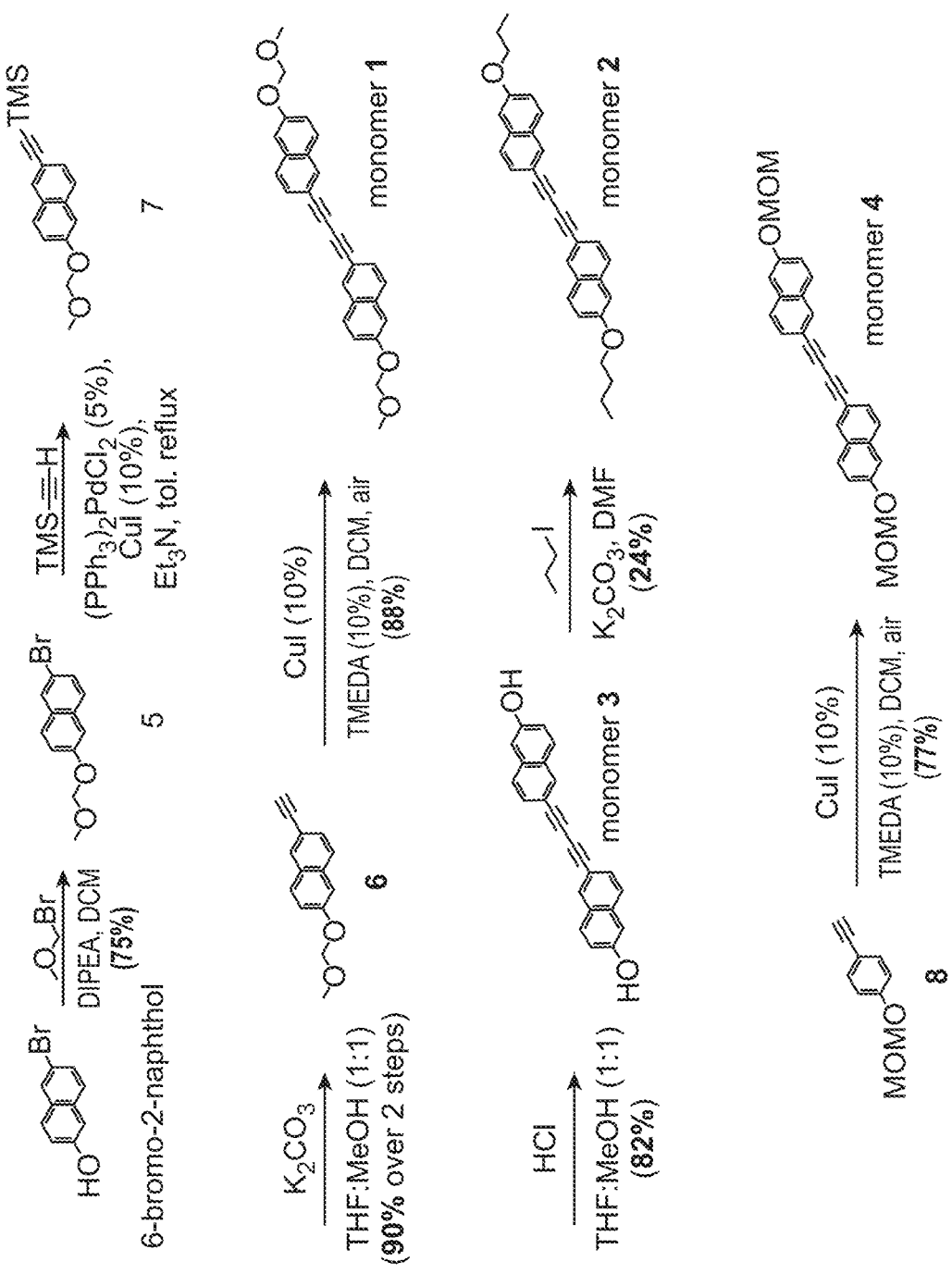
FIG. 7. Scheme 3—Overview of Synthetic Reactions for Various Compounds Described.

Synthetic procedures for various compounds are described in Scheme 3 in FIG. 7 and the Additional Information section below. Topochemical polymerization of the monomer was carried out by irradiation of the crystals directly with a quartz-filtered medium-pressure Hg Hanovia lamp. The crystals were irradiated for about 3 days, after which time dissolution in chloroform and filtration provided the PDA on average of about 5% yield based on weight. PDA-1 was converted to GNR-1 by annealing in a programmable tube furnace at various temperatures up to about 300° C. under an inert atmosphere (in vacuum or under an argon flow) for various amounts of time. About 10° C./min ramping rate was used to reach the target temperature.

UV-vis-NIR spectra of thin films deposited on glass or quartz substrates were collected on a Shimadzu UV-3101 PC UV-vis-NIR scanning spectrophotometer. Raman spectroscopy was performed on a Reinshaw 1000 instrument using a 50× objective lens and an excitation wavelength of about 514 nm. SEM samples were prepared by drop casting a chloroform dispersion of PDA after sonication, followed by the aromatization stage described in the previous section. SEM images were collected on a JEOL JSM-6700 field-emission scanning electron microscope. TEM samples were prepared by brushing a Cu TEM grid with a lacey carbon support against the surface of a substrate containing the SEM sample, hence mechanically transferring some GNRs onto the TEM grid. TEM imagining was performed on an FEI Tecnai G² TF20 transmission electron microscope operating at about 200 kV accelerating voltage. Selection was made of about 200 kV instead of about 80 kV in order to resolve the atomic structure of the graphene basal plane because the equipment lacked spherical aberration correction. Electron beam damage to the GNR was reduced via low-dose techniques.

Figure 13:
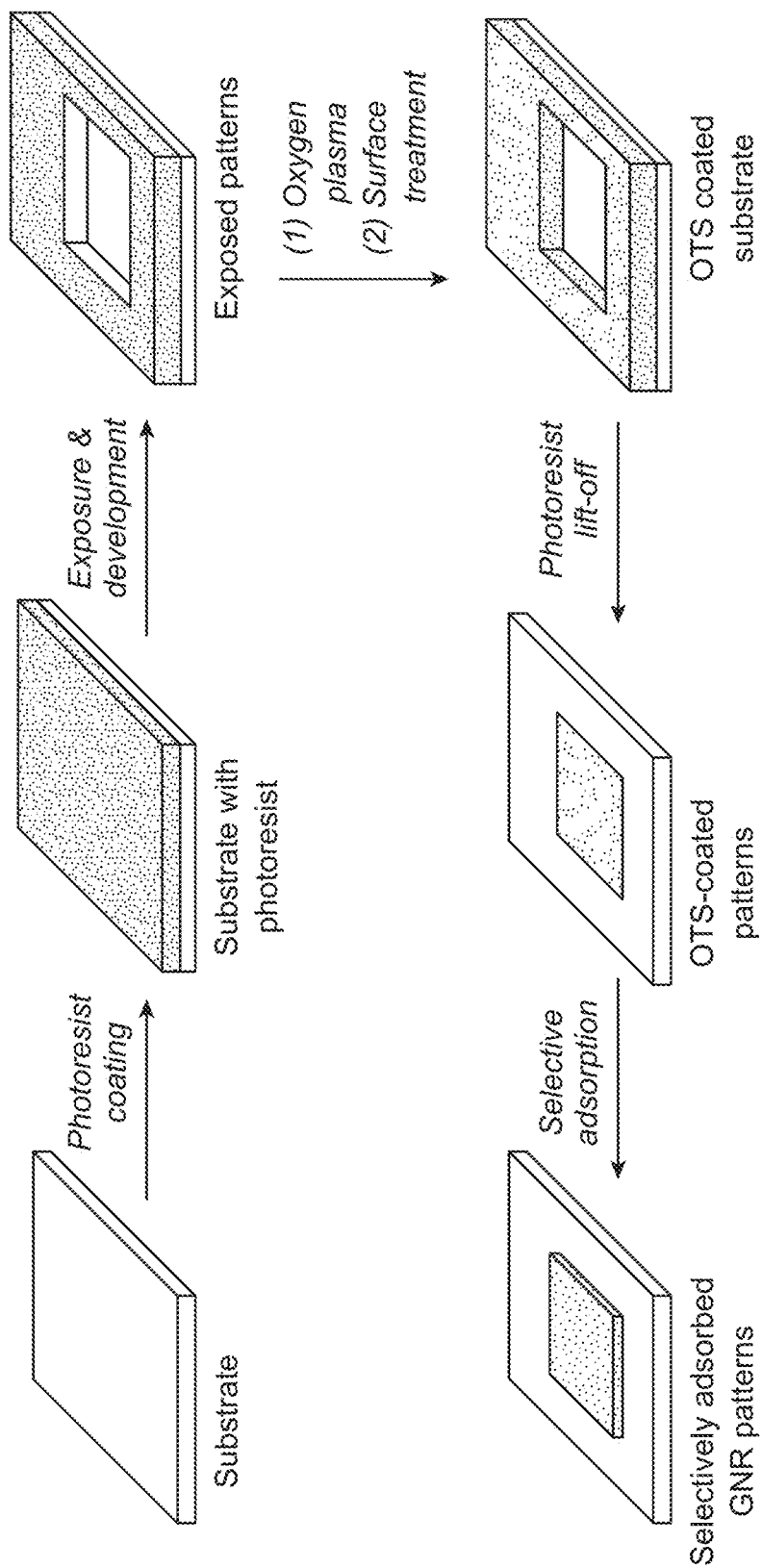
FIG. 13. Schematic diagram showing patterning stages for achieving selective adsorption of GNR.

Photolithography patterning of the GNR are depicted in FIG. 13. In short, a photomask with desired patterns was aligned to an $SiO_2$/Si wafer coated with AZ 5214 photoresist and exposed to UV irradiation (about 6 s, about 8 mW) using a Karl Suss MA6 aligner. After exposing the patterns by developing the substrate in the AZ developer, the wafer pieces were treated with oxygen plasma (about 200 W, about 10 s) to create a hydroxyl-terminated $SiO_2$ surface. The samples were then soaked in about 1% OTS chloroform solution for about 3 hr and rinsed repeatedly with copious amounts of chloroform, followed by about 10 min baking at about 150° C. in air. Finally, the remaining photoresist was removed with acetone, and the substrate was rinsed with acetone and then isopropanol. The patterned substrates were dip coated in a heavily sonicated chloroform dispersion of PDA and dried with a nitrogen flow. The sample was then annealed in a tube furnace at about 300° C. for about 8 hr under an argon flow to convert the PDA to GNR.

FETs were fabricated by first defining the source and drain electrode areas using photolithography followed by metal deposition (about 5/40 nm Ti/Au) on a heavily p-doped Si wafer (as the back-gate electrode) with about 300 nm $SiO_2$ layer (as the dielectric layer). Liftoff of the photoresist affords an $SiO_2$/Si wafer covered with microelectrodes. The surface was treated with OTS (as described previously) to improve the adhesion between the active material and the substrate. A PDA/chloroform dispersion was drop cast onto these electrodes and allowed to soak for about 30 s, and the excess dispersion was removed with a gentle nitrogen flow. The sample was then annealed for about 8 hr at about 300° C. under an argon flow. The FET measurements were carried out in a Lake Shore probe station.

Additional Information

Supplemental Experimental Procedures:

General Procedures: Unless stated otherwise in this example, reactions were performed under an argon atmosphere in flame-dried glassware. Tetrahydrofuran (THF), methylene chloride ($CH_2Cl_2$), diethyl ether ($Et_2O$), toluene ($C_7H_8$), and acetonitrile ($CH_3CN$) were passed through activated alumina columns prior to use. Chemical reagents were obtained from commercial sources and used without further purification. Reaction temperatures were controlled using an IKA magnetic temperature modulator. Procedures were performed at room temperature (about 23° C.) unless otherwise indicated. Column chromatography was performed on Silicycle (Siliflash P60) silica gel 60 (240-400 mesh). Thin layer chromatography and preparative layer chromatography utilized pre-coated plates from E. Merck (silica gel 60 PF254, 0.25 mm or 0.5 mm).

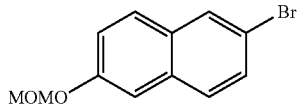

2-Bromo-6-(methoxymethoxy)naphthalene (5): 2-Bromo-6-hydroxynaphthol (about 10 g, about 45 mmol, about 1 eq) was added to a round bottom flask and DCM (about 200 mL, about 0.23 M) was added. To the resulting solution was added N,N diisopropylethylamine (about 15.7 mL, about 90 mmol, about 2 eq) followed by bromomethyl methyl ether (about 4.4 mL, about 54 mmol, about 1.2 eq) in one portion under argon. The resulting mixture was allowed to stir at room temperature until the SM had been consumed (TLC). Upon completion of the reaction the mixture was diluted with water and the layers separated. The aqueous layer was extracted with fresh DCM (about 2×50 mL) and the organics combined. The organic layer was washed with about 0.5M HCl, brine, dried over $MgSO_4$, filtered and concentrated in-vacuo. The crude residue was purified using by filtration over $SiO_2$ (Hex:$CHCl_3$ or DCM) to produce about 9.3 g (about 75%) of the product (5) as a tan/white solid. $^1$H NMR (400 MHz, $CDCl_3$): 3.53 (s, 3H, $CH_3$), 5.29 (s, 2H, $CH_2$), 7.24 (dd, J=8.9, 2.4 Hz, 1H, CH), 7.36 (d, J=2.4 Hz, 1H, CH), 7.50 (dd, J=8.8, 2 Hz, 1H, CH) 7.60 (d, J=8.8 Hz, 1H, CH), 7.67 (d, J=8.9 Hz, 1H, CH), 7.92 (d, J=2 Hz, 1H, CH); $^{13}$C NMR (100 MHz, $CDCl_3$): 56.2, 94.5, 109.9, 117.6, 120.0, 128.5, 128.7, 129.6, 129.7, 130.5, 132.9, 155.3; HRMS (DART): calculated for $C_{12}H_{11}BrO_2$ (M•+): 265.9942; measured: 265.9939.

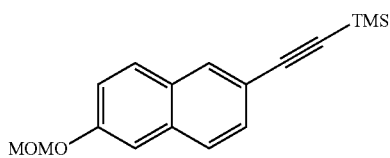

2-Trimethylsilylethynyl-6-(methoxymethoxy)naphthalene (6): 2-Bromo-6-(methoxymethoxy)naphthalene (5) (about 8.5 g, about 31.8 mmol, about 1 eq) was added to a schlenk flask followed by addition of toluene (about 96 mL, about 0.33 M) and triethylamine (about 8.9 mL, about 64 mmol, about 2.0 eq). Bis(triphenylphosphine)palladium chloride (about 1.1 g, about 1.6 mmol, about 0.05 eq) and copper(I) iodide (about 610 mg, about 3.2 mmol, about 0.1 eq) was added in succession and the mixture was sparged with argon for about 30 min at room temperature. After the sparging had completed trimethylsilylacetylene (about 9 mL, about 64 mmol, about 2 eq) was added, the flask flushed with argon, sealed and heated to about 110° C. until the SM had been consumed by 1H NMR analysis. After cooling to room temperature the mixture was filtered over celite and the filter cake washed with fresh toluene (about 2×50 mL). The crude product 6 (about 9 g) was recovered as a deep brown/red oil and used directly in the next stage without further purification. $^1$H NMR (400 MHz, $CDCl_3$): 0.27 (s, 9H, $CH_3$), 3.51 (s, 3H, $CH_3$), 5.28 (s, 2H, $CH_2$), 7.21 (dd, J=9.0, 2.4 Hz, 1H, CH), 7.34 (d, J=2.4 Hz, 1H, CH) 7.46 (dd, J=8.5, 1.6 Hz, 1H, CH), 7.65 (d, J=8.5 Hz, 1H, CH), 7.69 (d, J=9.0 Hz, 1H, CH), 7.92 (d, J=1.6 Hz, 1H, CH); $^{13}$C NMR (100 MHz, $CDCl_3$): 0.1, 56.2, 93.9, 94.4, 105.6, 109.8, 118.5, 119.6, 126.9, 128.9, 129.2, 129.4, 131.8, 134.1, 155.8; HRMS (DART): calculated for $C_{17}H_{20}O_2Si$ (M•+): 284.1227; measured: 284.1226.

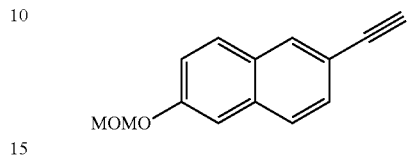

2-Ethynyl-6-(methoxymethoxy)naphthalene (7): 2-Trimethylsilylethynyl-6-(methoxymethoxy)naphthalene (6) (about 9 g, about 31.6 mmol, about 1 eq) was added to a round bottom flask and dissolved in about 150 mL (about 0.2 M) of an about 1:1 mixture of THF and MeOH. Solid potassium carbonate (about 414 mg, about 3 mmol, about 0.1 eq) was added in a single portion and the mixture allowed to stir at room temperature. After stirring for about 30 min TLC indicated consumption of the starting material. The mixture was concentrated in vacuo to remove the solvents. The crude residue was partitioned between $Et_2O$ and $H_2O$ and the layers were separated. The aqueous phase was extracted with fresh $Et_2O$ (about 3×50 mL), organics combined and dried over $MgSO_4$, filtered and concentrated in vacuo to provide a crude residue that was purified by flash column chromatography on $SiO_2$. The product (7) (about 6.2 g, about 90% over 2 stages) was recovered as a tan crystalline solid. $^1$H NMR (400 MHz, $CDCl_3$): 3.10 (s, 1H, CH), 3.52 (s, 3H, $CH_3$), 5.29 (s, 2H, $CH_2$), 7.23 (dd, J=8.9, 2.4 Hz, 1H, CH), 7.36 (d, J=2.4 Hz, 1H, CH), 7.48 (dd, J=8.5, 1.7 Hz, 1H, CH) 7.67 (d, J=8.5 Hz, 1H, CH), 7.72 (d, J=8.9 Hz, 1H, CH), 7.95 (d, 1.7 Hz, 1H, CH); $^{13}$C NMR (100 MHz, $CDCl_3$): 56.2, 76.9, 84.1, 94.4, 109.8, 117.4, 119.7, 127.2, 128.8, 129.1, 129.4, 132.1, 134.2, 155.9; HRMS (DART): calculated for $C_{14}H_{12}O_2$ (M+H): 213.0910; measured: 213.0908.

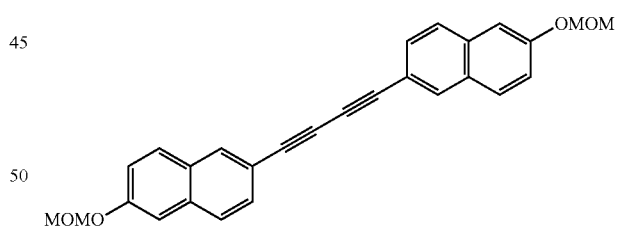

1,4-Bis(6-(methoxymethoxy)naphthalen-2-yl)buta-1,3-diyne (1): 2-Ethynyl-6-(methoxymethoxy)naphthalene (7) (about 6.2 g, about 29 mmol, about 1 eq) was added to a round bottom flask and dissolved in DCM (about 100 mL, about 0.33 M). Copper(I) iodide (about 550 mg, about 2.9 mmol, about 0.1 eq) was added followed by TMEDA (about 434 µL, about 2.9 mmol, about 0.1 eq). Air was bubbled through the mixture for about 30 minutes. The resulting solution was allowed to stir overnight open to the air. In the next day, TLC indicated consumption of SM. The mixture was diluted with water, the layers separated, aqueous washed with fresh DCM (about 2×50 mL), organics combined, washed with dilute (about 0.5 M) HCl, brine, dried over $MgSO_4$, filtered and concentrated in vacuo to produce the crude product. The crude product was purified by recrystallization from ACN/H$_2$O by hot filtration to give the product (1) as deep gold needles (about 5.5 g, about 88%). It is noted that the crystals undergo spontaneous topochemical polymerization under ambient light to the corresponding polydiacetylene polymer. To inhibit the extent of polymerization, exposure to light should be reduced and the crystals stored in a covered vessel at about −20° C. $^1$H NMR (400 MHz, CDCl$_3$): 3.53 (s, 3H, CH$_3$), 5.30 (s, 2H, CH$_2$), 7.25 (dd, J=8.9, 2.4 Hz, 1H, CH), 7.37 (d, J=2.4 Hz, 1H, CH), 7.52 (dd, J=8.5, 1.6 Hz, 1H, CH) 7.69 (d, J=8.5, 1H, CH), 7.73 (d, J=8.9 Hz, 1H, CH), 8.01 (d, J=1.6 Hz, 1H, CH); $^{13}$C NMR (100 MHz, CDCl$_3$): 56.2, 74.0, 82.2, 94.4, 109.9, 117.1, 119.9, 127.3, 128.8, 129.1, 129.5, 132.8, 134.4, 156.1; HRMS (DART): calculated for C$_{28}$H$_{22}$O$_4$ (M•+): 422.1512; measured: 422.1521. mp. 137-138° C.

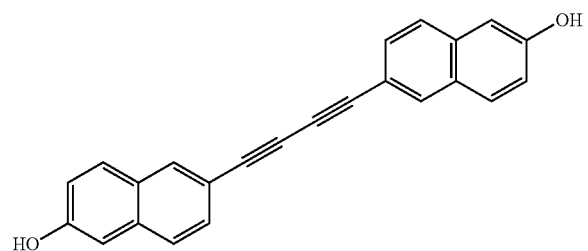 [SMILES: Oc1ccc2cc(C#CC#Cc3ccc4cc(O)ccc4c3)ccc2c1]

6,6′-(Buta-1,3-diyne-1,4-diyl)bis(naphthalen-2-ol) (3): 1,4-Bis(6-(methoxymethoxy)naphthalen-2-yl)buta-1,3-diyne (1) (about 118 mg, about 0.3 mmol, about 1 eq) was dissolved in about 40 mL of THF:MeOH (about 1:1) in a round bottom flask. Concentrated HCl (about 37%, about 1 mL) was added, the flask capped, and allowed to stir at room temperature until consumption of SM by TLC (about 2 days). The reaction was concentrated in vacuo, residual water was azeotroped using ACN×2, and the crude residue was purified by crystallization from ACN by hot-filtration to give about 80 mg (about 82%) of the product (3) as tan crystals. $^1$H NMR (400 MHz, CD$_3$OD): 7.10 (1H, s), 7.11 (dd, J=8, 2 Hz, 1H, CH), 7.42 (dd, J=8.5, 1.5 Hz, 1H, CH), 7.62 (d, J=8.5 Hz, 1H, CH), 7.72 (dd, J=8, 2 Hz, 1H, CH) 7.96 (d, J=1.5 Hz, 1H, CH); $^{13}$C NMR (100 MHz, CDCl$_3$): 74.2, 82.9, 110.1, 117.0, 120.4, 127.7, 129.2, 129.7, 130.6, 133.8, 136.5, 158.1; HRMS (DART): calculated for C$_{24}$H$_{14}$O$_2$ (M•+): 334.09883; measured: 334.09733.

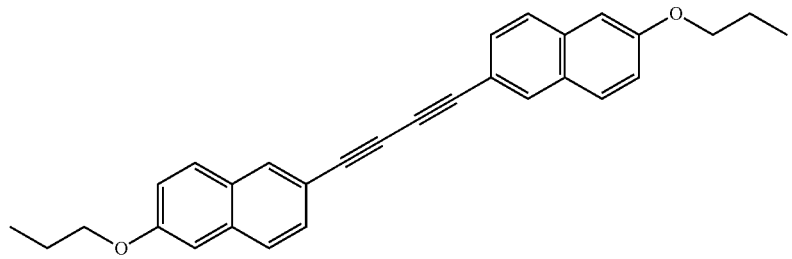 [SMILES: CCCOc1ccc2cc(C#CC#Cc3ccc4cc(OCCC)ccc4c3)ccc2c1]

1,4-Bis(6-propoxynaphthalen-2-yl)buta-1,3-diyne (2): 6,6′-(Buta-1,3-diyne-1,4-diyl)bis(naphthalen-2-ol) (3) (about 100 mg, about 0.3 mmol, about 1 eq) was added to a round bottom flask and potassium carbonate (about 166 mg, about 1.2 mmol, about 4 eq) was added followed by DMF (about 3 mL). Iodopropane (about 153 mg, about 0.9 mmol, about 3 eq) was added in a single portion and the mixture was allowed to stir at room temperature. DMF was added as desired to maintain stirring. The mixture was allowed to stir until the reaction was complete as judged by TLC. When the reaction was complete, the mixture was diluted with water (about 10×DMF volume) and the solid filtered. Purification of the crude precipitate using flash column chromatography gave about 31 mg (about 24%) of the product as a tan solid. $^1$H NMR (400 MHz, CDCl$_3$): 1.08 (t, J=7.5 Hz, 3H, CH$_3$), 1.88 (m, 2H, CH$_2$), 4.09 (t, J=6.5 Hz, 2H, CH$_2$), 7.10 (d, J=2.4 Hz, 1H, CH), 7.17 (dd, J=8.9, 2.4 Hz, 1H, CH) 7.5 (dd, J=8.5, 1.6 Hz, 1H, CH), 7.66 (d, J=8.5 Hz, 1H, CH), 7.70 (d, J=8.9, 1H, CH), 7.99 (d, J=1.6 Hz, 1H, CH); $^{13}$C NMR (100 MHz, CDCl$_3$): 10.6, 22.5, 69.6, 73.8, 82.3, 106.6, 116.5, 119.9, 126.9, 128.3, 129.1, 129.4, 132.8, 134.7, 158.3; HRMS (DART): calculated for C$_{24}$H$_{14}$O$_2$ (M•+): 418.19273; measured: 418.19135.

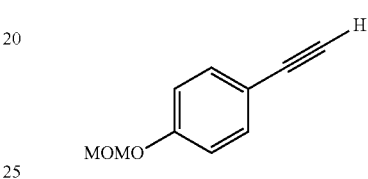

1-Ethynyl-4-(methoxymethoxy)benzene (8): Compound 8 was prepared as described in, for example, Arakawa, Y., Kang, S., Nakajima, S., Sakajiri, K., Cho, Y., Kawauchi, S., Watanabe, J., Konishi, G-I. (2013) Diphenyltriacetylenes: novel nematic liquid crystal materials and analysis of their nematic phase-transition and birefringence behaviours. *J. Mater. Chem. C,* 1, 8094-8102.

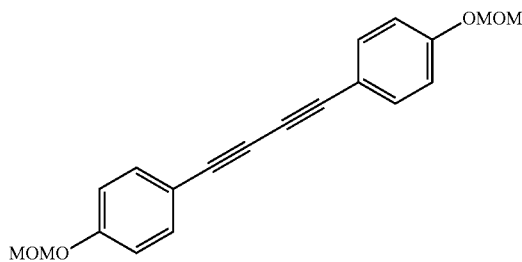

1,4-Bis(4-(methoxymethoxy)phenyl)buta-1,3-diyne (4): 1,4-Bis(4-(methoxymethoxy)phenyl)buta-1,3-diyne was prepared in a Hay coupling analogous to compound (1). Utilizing (8) (about 2.6 g, about 16 mmol, about 1 eq), CuI (about 304 mg, about 1.6 mmol, about 0.1 eq), TMEDA (about 186 mg, about 1.6 mmol, about 0.1 eq) and DCM (about 50 mL) provided about 2.0 g (about 77%) of the desired product (4) as an orange crystalline solid after workup as described above. $^1$H NMR (400 MHz, CDCl$_3$): 3.48 (s, 3H, CH$_3$), 5.19 (s, 2H, CH$_2$), 6.99 (d, J=8.7 Hz, 2H, CH), 7.45 (d, J=8.7 Hz, 2H, CH); $^{13}$C NMR (100 MHz, CDCl$_3$): 56.2, 73.1, 81.2, 94.2, 115.1, 116.3, 134.0, 157.9; HRMS (DART): calculated for C$_{20}$H$_{18}$O$_4$ (M•+): 322.11996; measured: 322.11870.

Example 2

Synthesis of N=8 Armchair Graphene Nanoribbons ([8]$_A$GNRs) from Four Polydiacetylenes Introduction While graphene displays a number of remarkable properties, its zero bandgap makes it unsuitable for many semiconductor applications. However, graphene nanoribbons (GNRs), which are narrow strips of graphene with widths typically at or below about 10 nm, display defined bandgaps in addition to ballistic charge transport due to the lateral confinement of charge carriers. As a result, the designed synthesis of GNRs has quickly gained prominence in this field.

Figure 14:
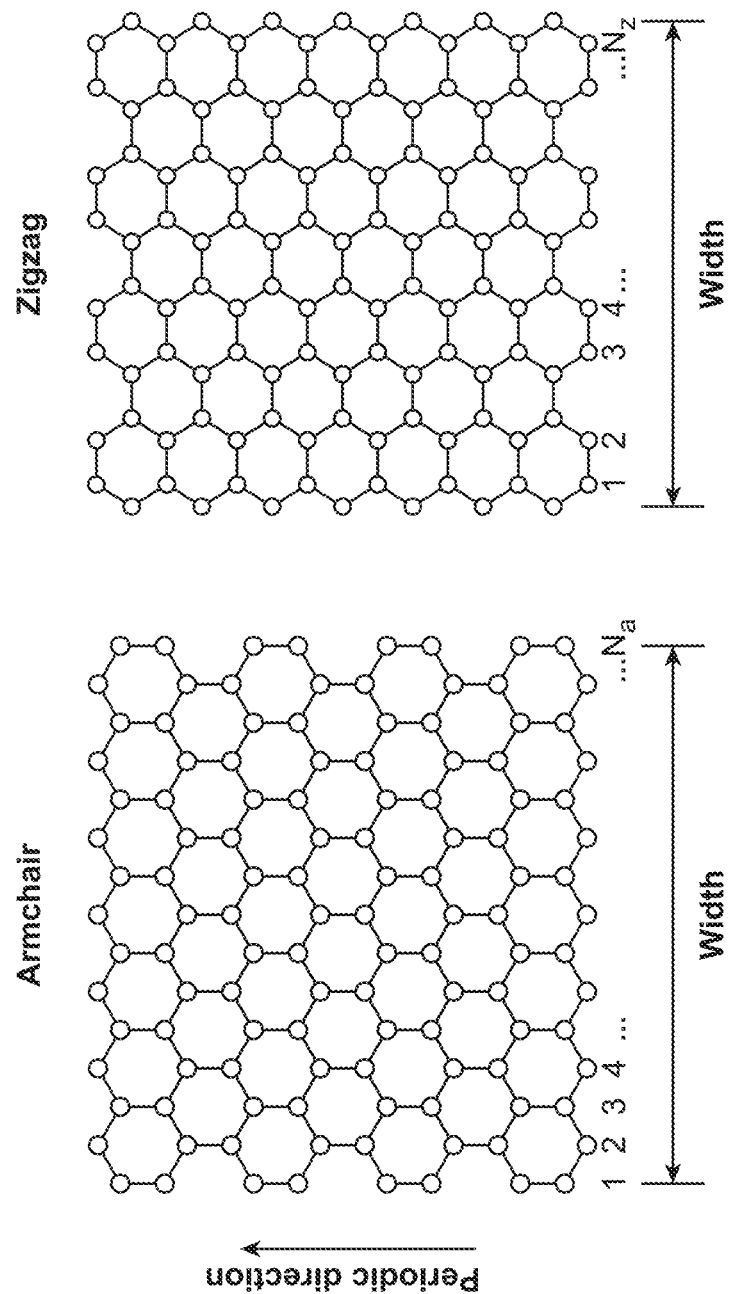
FIG. 14. Comparison of an armchair graphene nanoribbon and a zigzag graphene nanoribbon.

Graphene nanoribbons are classified as either armchair, zigzag, or chiral, depending on the topology of the repeating units within their long edges. Armchair graphene nanoribbons ($_A$GNRs), which are the most interesting type of GNR in terms of semiconductor applications, can be divided into three classes specified by the number of carbon atoms within their width (see FIG. 14). These classes comprise 3p, 3p+1, and 3p+2 carbon atoms, where p is in an integer. Armchair GNRs that fall into the 3p or 3p+1 classes (e.g., [6] and [7]$_A$GNRs) are predicted to be semiconducting, with a bandgap that increases as ribbon width decreases, while the 3p+2 class (e.g., [8]$_A$GNR) is predicted to have a significantly narrower bandgap.

While graphene nanoribbons are quickly gaining importance, there is a constrained number of methods to generate them. These methods fall either into "top-down" or "bottom-up" strategies. Top-down strategies include cutting a large piece of graphene with an electron beam, unzipping of carbon nanotubes, or sonochemical tearing of graphene sheets. A major constraint of the top-down strategies is that they do not provide homogeneous ultra-narrow ribbon widths (<about 10 nm) as well as atomically precise edges. By contrast, bottom-up strategies rely on the precision and control afforded by synthetic chemistry to construct ribbons molecule-by-molecule. Two marginally differing bottom-up approaches include: (1) surface assisted coupling and cyclodehydrogenation of dihalo polycyclic arenes, or (2) metal-catalyzed solution-phase polymerization of similar precursors, including alkynylarenes, to form polyarylene backbone polymers, followed by their subsequent, typically oxidative, aromatization to GNRs. Other approaches utilize benzannulation reactions performed after metal-catalyzed polymerization.

Overview

This example demonstrates a highly efficient thermal conversion of four differently substituted poly(1,4-diphenyl) butadiyne polymers (polydiacetylenes, PDAs 1 and 2a-c) into virtually indistinguishable N=8 armchair graphene nanoribbons ([8]$_A$GNR). Characterization is made of the clean, stepwise transformation of these substituted PDAs, initially into partially annulated intermediates, and subsequently into N=8 armchair graphene nanoribbons following full aromatization and side-chain losses using complementary spectroscopic techniques (CP/MAS $^{13}$C NMR, Raman, Fourier transform-infrared spectroscopy (FT-IR), and XPS) and high-resolution transmission electron microscopy (HR-TEM). The four different PDAs 1 and 2a-c are obtained in about 7, about 11, about 23, and about 15% yield, respectively, upon photochemically initiated topochemical polymerization of the para or meta-substituted 1,4-diphenylbutadiynes (3 and 4a-c) within their crystal phases. The overall yield is substantially increased upon recycling of the leftover starting material (e.g., diyne 3 produces about 24% yield of PDA 1 over four cycles). The subsequent clean, quantitative transformation of PDAs 1 and 2a-c into N=8 armchair graphene nanoribbons occurs via a series of Hopf pericyclic reactions, followed by aromatization reactions of the annulated polycyclic aromatic intermediates, as well as homolytic bond fragmentation of the edge functional groups upon heating up to about 600° C. under an inert atmosphere. This improved approach to GNRs exploits the power of crystal engineering and solid-state reactions by targeting very large organic structures through programmed chemical transformations. It also affords [8]$_A$GNR, which can now be synthesized on a large scale via two operationally streamlined and discrete solid-state processes.

Figure 15:
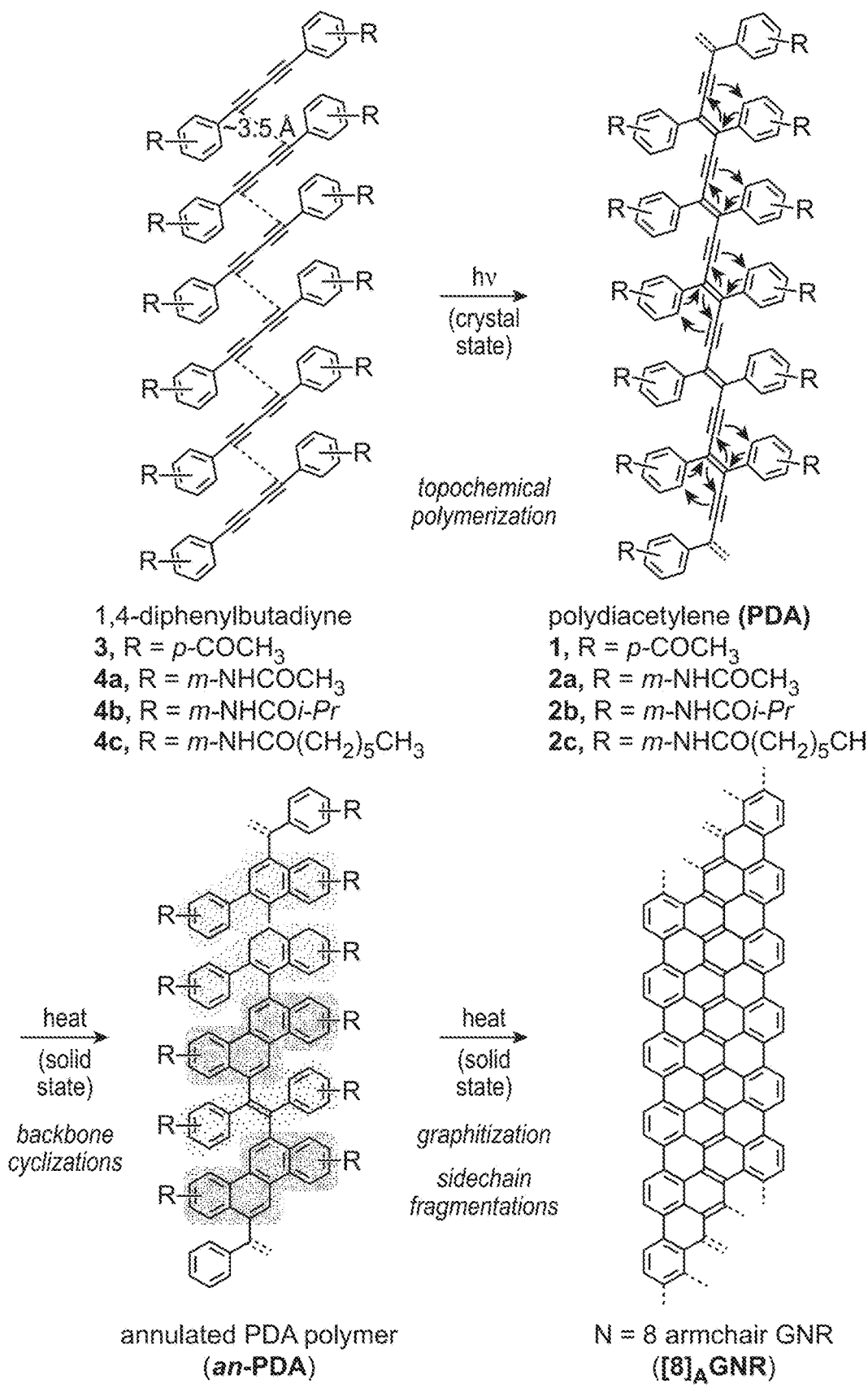
FIG. 15. Synthetic approach to $[8]_4$GNR from substituted 1,4-diphenylbutadiynes via crystalline-state topochemical polymerization of substituted 1,4-diphenylbutadiynes, followed by solid-state thermal aromatization and fragmentation of side-chains. Likely stages in the series of random Hopf cyclizations include the formation of 2-phenylnaphthalene units, as well as chrysene and 1,2-diphenylethene units.
Figure 16E:
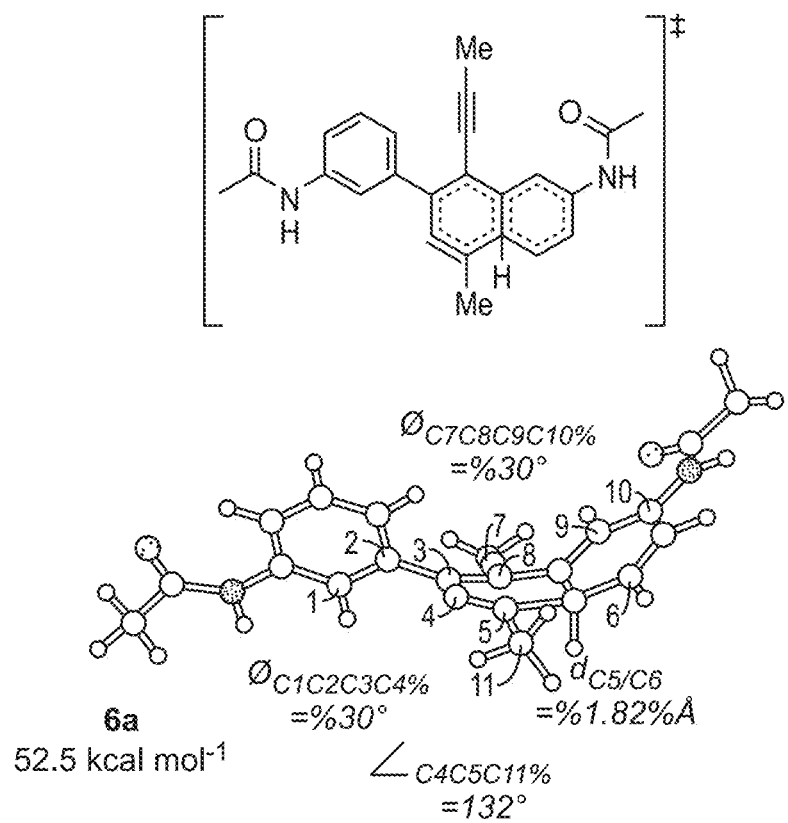
FIG. 16. Transition state geometries and free activation energies of the 6π-electrocyclization and subsequent H-shift for model systems 5 and 6. Structures were optimized in the gas phase using B3LYP/6-31G(d) and single-point energies were performed using M06-2X/6-311+G(d,p). Frequency analysis was performed at about 350° C.
Figure 16F:
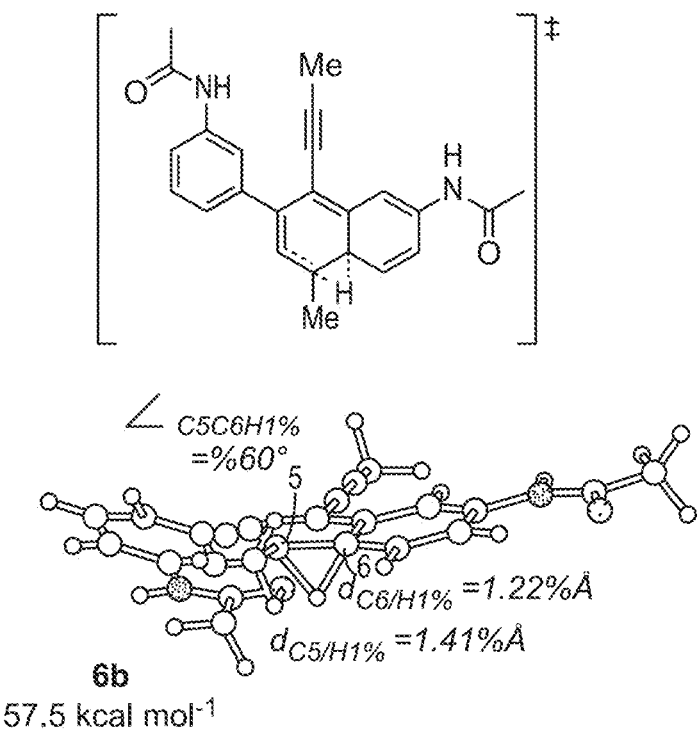
Figure 16G:
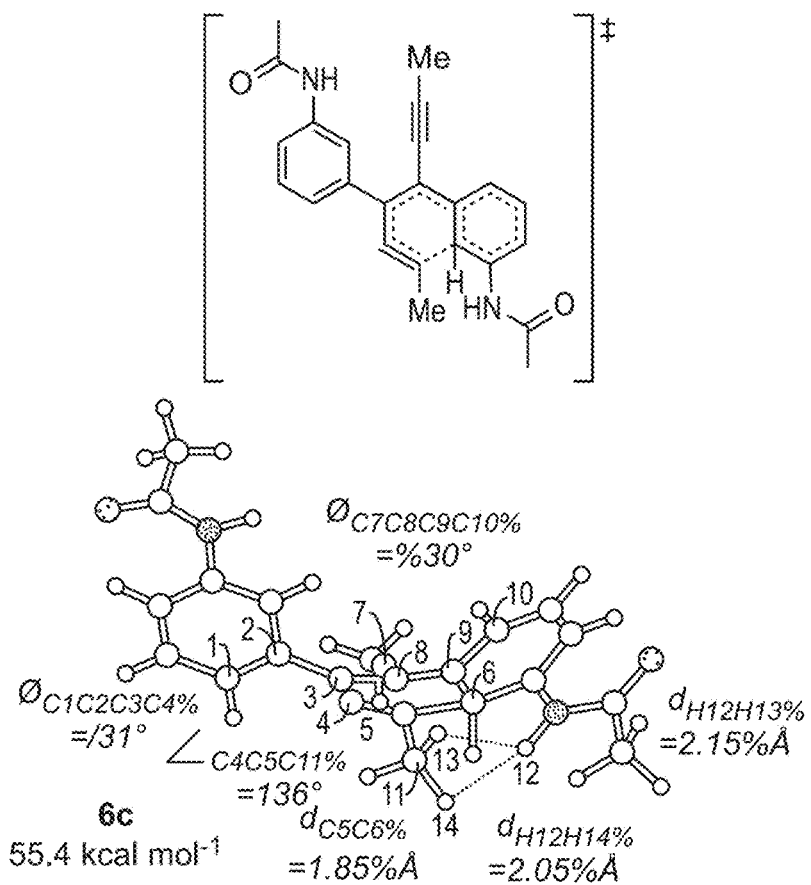
Figure 16H:
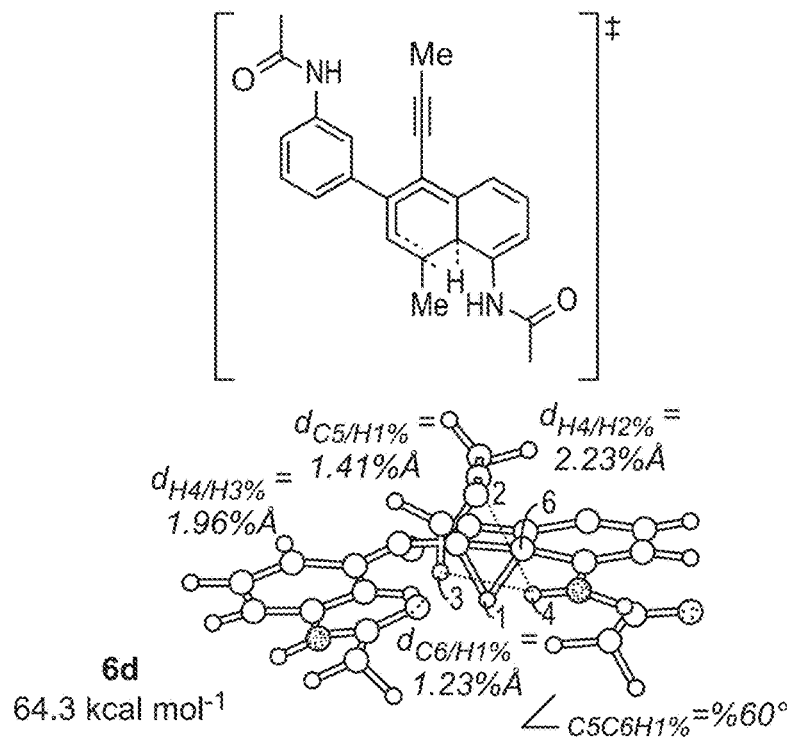

It is proposed that diphenyl polydiacetylene polymers can produce [8]$_A$GNR if they can be triggered to undergo internal backbone cyclization and cyclodehydrogenation (FIG. 15). The proposed approach to GNRs exploits the rehybridization energy of sp carbons within the alkyne units of aryl-substituted polydiacetylenes. By coercing them to expand their coordination using thermal reactions involving the aryl substituents, the rehybridization and aromatization energies gained from each cyclizing alkyne unit should be energetically favorable and give polycyclic aromatic structures. This strategy can be used to target the synthesis of [12]$_A$GNRs from naphthyl-substituted PDAs. Here, some embodiments extend this strategy to access [8]$_A$GNRs. Investigation is made of the conversion stages in great detail using complementary spectroscopic techniques (CP/MAS $^{13}$C NMR, Raman, FT-IR, and XPS), as well as HRTEM.

As demonstrated in this example, the diphenyl polydiacetylene motif has proven itself to be a desirable platform to access these GNRs. Four differently substituted diphenyl PDA polymers with either para- or meta-substituents (PDAs 1 and 2a) can produce pristine [8]$_A$GNRs quantitatively via heating. This process is readily applicable to bulk synthesis due to the ease with which solid-state transformations can be scaled up. This operationally streamlined, two-stage synthesis of [8]$_A$GNRs does not require any external reagents or solvents and should be applicable to a range of device manufacturing techniques. Furthermore, these transformations are not constrained by edge substituents and should ultimately provide access to a variety of different edges and widths, including the incorporation of heteroatoms.

Results and Discussion

To generate [8]$_A$GNRs, it is postulated that the phenyl substituents on the PDA backbone should engage their adjacent trans-dienyne moieties into a series of Hopf pericyclic reactions to provide annulated polycyclic aromatic intermediates (FIG. 15). Full cyclodehydrogenation of the resulting adjacent polycyclic aromatic rings, which would initially be a random mix of 2-phenylnaphthalene, chrysene, 1,2-diphenylethene units, or larger, should ultimately fully aromatize to 8-armchair graphene nanoribbons (FIG. 15). Hopf cyclizations have been experimentally shown to take place via three distinct mechanisms dependent on the reaction temperature: 1) 6π electrocyclization, 2) rearrangement of the alkyne to a vinylidene carbene followed by aryl C—H insertion, and 3) cyclization via initial radical addition to the alkyne. Electrocyclization can be the predominant mechanism for a gas phase reaction below about 550° C. Various polymers discussed here undergo backbone cyclizations below about 500° C. in the solid state, therefore it is likely that the backbone cyclization process occurs via a 6π electrocyclization pathway.

Thus, to model the energetics of the Hopf cyclization stage for PDAs 1 and 2a, DFT calculations are performed on the trans-enediynes 5 and 6 as model systems for the keto and amido functionalized PDAs 1 and 2a (FIG. 16). Mechanistic study is based on computational evaluation establishing that the Hopf cyclization proceeds through the initial 6π-electrocyclization, which is followed by two consecutive [1,2]-H shifts, with the first H-shift being the rate-determining stage. Structures were optimized in the gas-phase using B3LYP/6-31G(d), and single-point calculations were performed using M06-2X/6-311+G(d,p) to obtain free energy values. Transition state geometries of the Hopf cyclization (5a, 6a, c) and first H-shift (5b, 6b, d) stages are shown in FIG. 16.

The activation free energies are about 52.6 and about 58.4 kcal mol$^{-1}$ for 5a and 5b, respectively. Similar reaction barriers of about 52.5 and about 57.5 kcal mol$^{-1}$ are found for the meta-amide model system undergoing cyclization para to its amide side chain (6a, b). The barriers to ortho cyclization (6c,d) are higher than for para cyclization by about 2.9 and about 6.8 kcal mol$^{-1}$, respectively. In all cases, the barriers for the first H-shift are higher than that for the Hopf cyclization.

The geometries of each of the transition structures are similar. The π-system of the alkynes is planar in each of the Hopf cyclization transition states, while the flanking aryl groups are out of plane by about 30°. In the H-shift stage, the forming naphthyl ring is planar, and the C6-H1 bond stretches to about 1.23-1.25 Å from its normal C—H bond length of about 1.09 Å (FIG. 2d,f, h). In both ortho transition states 6c and 6d, the close proximity of the amide and methyl groups at the forming C—C bond leads to higher barriers. This results in a preference for the para pathway over the ortho pathway by about 6.8 kcal mol$^{-1}$.

For both models 5 and 6, the reaction barriers of the rate-determining H-shift are >about 14 kcal mol$^{-1}$ higher than that of cis-hexa-1,3-dien-5-yne. This increase in reaction barrier can be attributed to the benzannulation within the π-systems of 5 and 6 compared to cis-hexa-1,3-dien-5-yne, which involves disrupting the aromatic π-system at the transition state. In addition, while these gas-phase energies are useful for understanding the intrinsic barriers to cyclization, these models do not fully account for the solid-state behavior and polymer conformational influence on the large scale graphitization process within PDAs 1 and 2a.

Monomer Synthesis

An aspect of the methodology was to identify monomers that have: 1) phenyl substituents at both ends of the butadiyne unit, and 2) undergo the proper crystalline-state organization that promotes topochemical polymerization. In investigations of the solid-state packing of [24]-dehydroannulenes, it is noted that carbamate groups could be exploited to achieve tight, in-register crystal packing of the internal butadiyne units. While designing monomers to access [8]$_4$GNRs, it is proposed that amide, carbamate, or urea functionalities are suitable to promote tight, in-register packing of diphenylbutadiyne. The synthesis and characterization of both 3, 4a and 4c confirmed their predisposition to undergo topochemical polymerization. Synthesis is made of a range of diphenylbutadiynes containing a number of different amide substituents in their meta position and it is found that many of them, including amide 4b, provide crystals that undergo topochemical polymerization.

While diynes 3 and 4a-c differ in their substitution, the position and nature of these substituents do not significantly affect the PDA to GNR conversion process. For diyne 3, there is one possible Hopf cyclization pathway because of the axial symmetry of its para-substitution (FIG. 16). For diynes 4a-c, the meta-amido group is predicted, as discussed above, to have a significant para-directing effect in preference to ortho in the Hopf cyclizations. Thus, annulated polymers with primarily edge amido substituents should be formed initially according to calculations. However, should a small fraction of Hopf cyclization reactions take place at ortho positions, this should not be an issue because substantially all side-chains are ultimately lost in the final conversion of PDAs 1 or 2a-c to [8]$_4$GNR. Due to this design feature, nearly any emergent edge group can be used to promote organization of the internal butadiyne monomer units without detrimental effect on the resulting GNR structure. In addition, GNRs with heteroatom doping (e.g., B, N, O, or S) can be targeted through the specific incorporation of heteroaromatic rings as substituents of the butadiyne.

Figure 17:
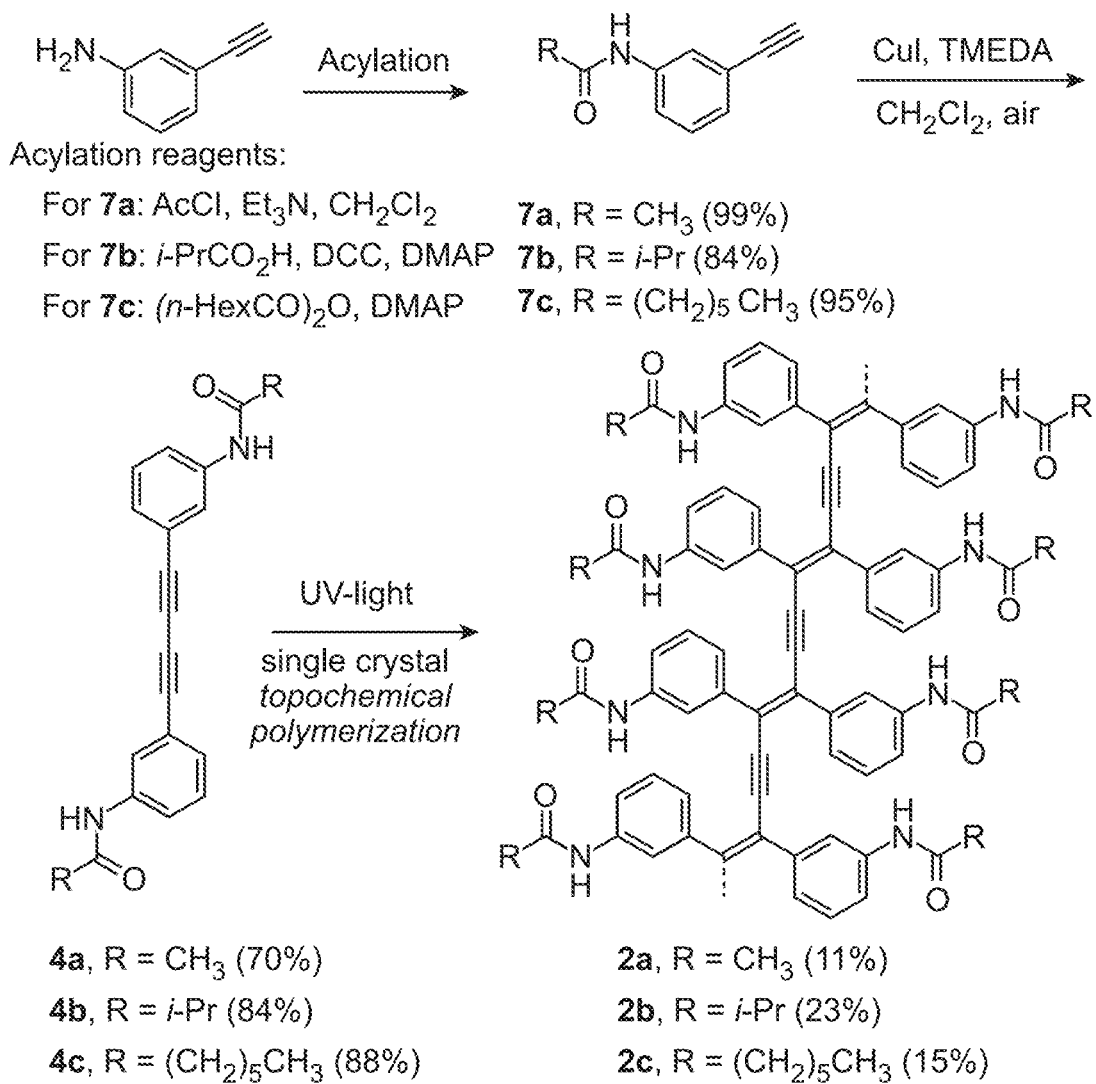
FIG. 17. Scheme 4—Syntheses of PDAs 2a-c.
Figures 18A, 18B:
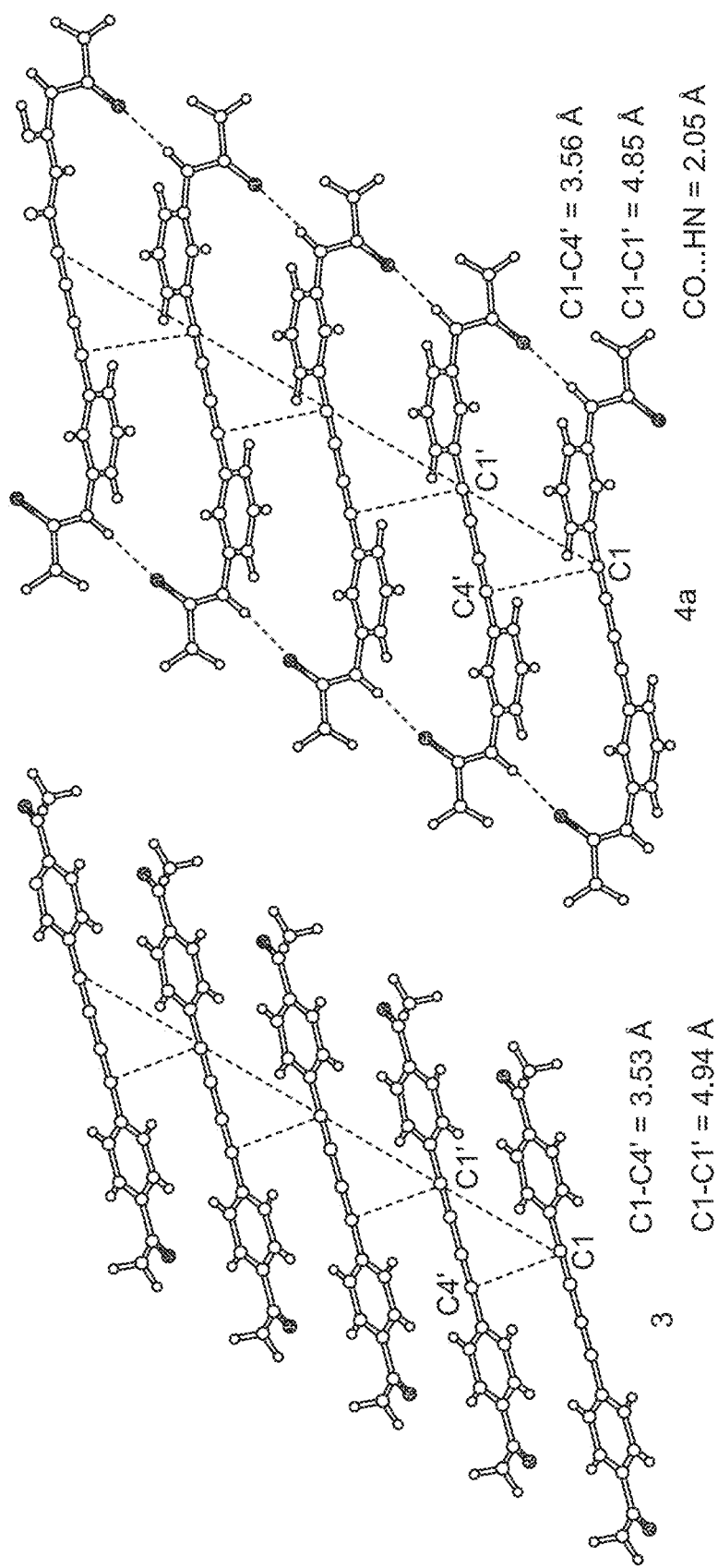
FIG. 18. Crystal packing structures of diynes 3 and 4a-c showing close contact distances C1-C4' (≤about 3.5 Å) and C1-C1' (≤about 5 Å) desired for topochemical polymerization.
Figures 18C, 18D:
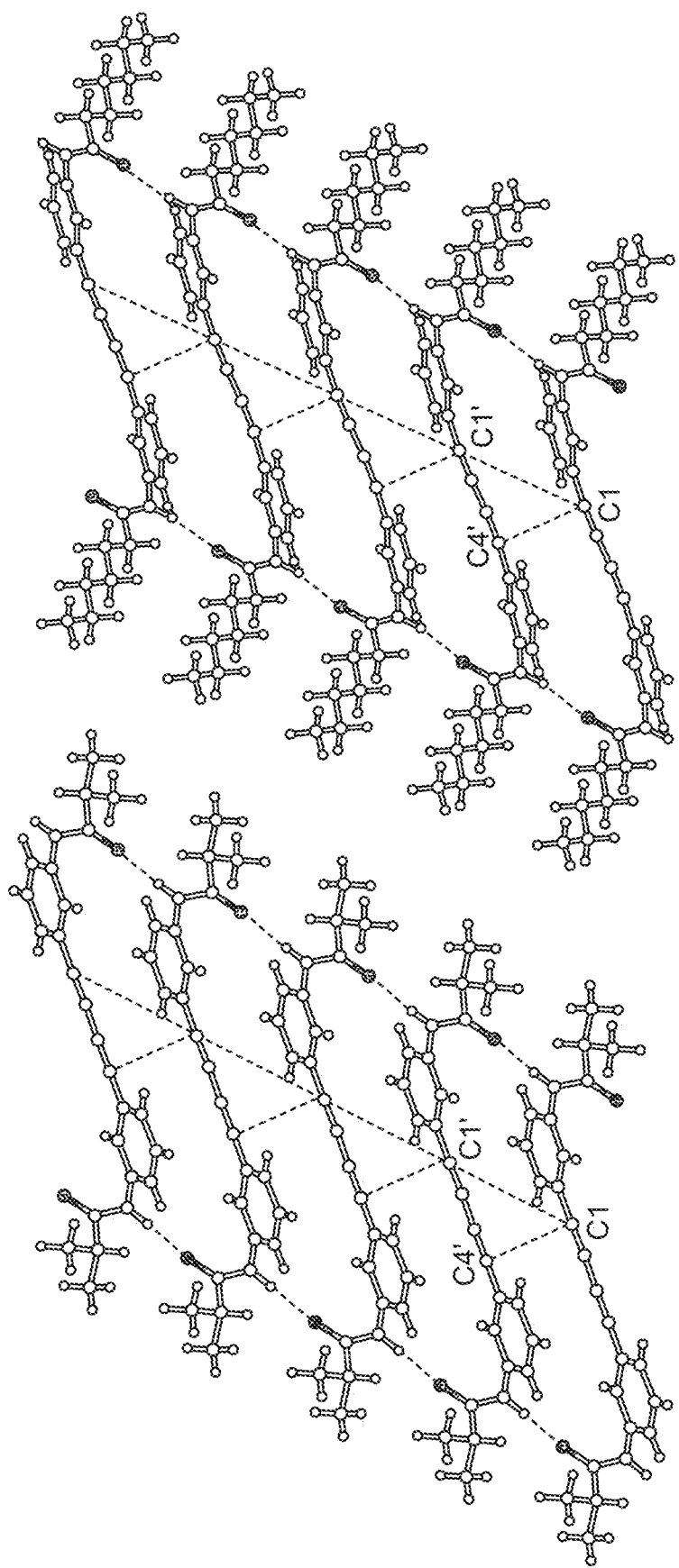

The synthesis of monomer 3 was carried out in three stages from commercially available 4-bromoacetophenone following a reported method (Osowska et al., Eur. J. Org. Chem. 2008, 4598-4606). Crystals of monomer 3 turn rapidly blue upon standing, which is indicative of their propensity to undergo topochemical polymerization. Monomeric amides 7a-c were synthesized in two stages from commercially available 3-ethynylaniline (Scheme 4 in FIG. 17). Amide bond formation between the amino group and either acetyl chloride, isobutyric acid (via activation with N,N'-dicyclohexylcarbodiimide (DCC)), or heptanoic anhydride, produced the highly crystalline amides 7a-c. Oxidative dimerization of these alkynyl aryl amides under the Hay conditions produced the corresponding butadiynes monomers (4a-c) in good yields. Recrystallization from an appropriate solvent gave crystals suitable for topochemical polymerization in each case. All syntheses are very efficient (about 66%, about 69%, about 71%, and about 84% overall yields for monomers 3, 4a, 4b and 4c, respectively, from the commercially available starting materials) and allowed generation of tens of grams of the respective diynes 3 and 4a-c within a few days.

Topochemical Polymerization of Diynes 3 and 4a-c

For butadiyne units to undergo topochemical polymerization, their termini should be within close to van-der-Waals contact (≤about 3.5 Å), and also offset by a short repeat distance (≤about 5 Å). As can be seen from the X-ray crystal packing structures (FIG. 18a-d), diynes 3 and 4a-c all display close-contacts between the terminal carbons of their butadiyne units, which should favor topochemical polymerization. Accordingly, all four crystalline diynes (3 and 4a-c) readily undergo topochemical polymerization at room temperature upon exposure to ambient light. Polymerization is noted by the deep blue color that appears within the crystals upon standing in an unshielded container. Topochemical polymerization can be accelerated by irradiation of the crystals with a high powered Hanovia lamp, typically overnight, producing a deep purple/black color within the crystals. Dissolution of the polymerized crystals to dissolve any unreacted monomer provides the pristine polydiacetylenes 1 and 2a-c as bulk fibrous powders after filtration. The recovered monomer solutions can be concentrated, recrystallized and subjected again to irradiation to provide further amounts of PDA. Repeating this process allowed the production of gram quantities of PDAs 1 and 2a-c in a few days.

As an example, the recycling polymerization reaction of the lowest yielding diyne 3 produced about 24% of PDA 1 overall after four cycles (first cycle: about 7%).

Characterization of the Polydiacetylenes

Polydiacetylene polymers 1 and 2a-c were characterized by solid state CP/MAS $^{13}$C NMR, XPS, IR, and Raman spectroscopy. Utilizing cross-polarization magic angle spinning (CP/MAS)$^{13}$C NMR spectroscopy, the structure and purity of all four polymers could be established. While full assignment of each carbon of the aryl or alkyl groups is difficult via solid-state NMR due to the large $^1$H dipolar couplings in this method, key features can be identified (FIG. 19). For example, the alkyne carbons in the PDA backbone can be seen at about 102 ppm for 1, and about 101 ppm for 2a, 2b, and 2c. The position of these peaks matches well with other reported PDAs and supports the symmetric structure of the polymer backbone. Other discernable features of PDA 1 are the ketone carbonyl carbon, appearing at about 198 ppm, and the methyl carbon present at about 26 ppm. On the other hand, the carbonyl carbon for the amide-containing PDAs 2a-c appears at about 169, about 177, and about 172 ppm, respectively. The alkyl side chains in these amides appear as discrete carbon peaks in the alkyl region (about 10-50 ppm).

Further investigation of the PDA structure was carried out by analysis of the IR absorption spectra of all four polymers (FIGS. 20, 26-33). As will be discussed later, detailed assignment of the unreacted PDAs' IR spectra was helpful to determining subtle structural changes within the polymers upon heating. PDA 1 displays a strong absorption at about 1676 cm$^{-1}$ corresponding to the carbonyl stretch of its ketone functional group. Furthermore, strong absorption bands centered at about 831 cm$^{-1}$ correspond to the in-phase out-of-plane (oop) C—H wagging motion of two adjacent C—H bonds on the para-substituted phenyl rings. A medium strength in-plane ring bending mode can be identified at about 1400 cm$^{-1}$, attributed to the para-substituted phenyl ring in PDA 1. Infrared analysis of PDAs 2a-c reveals a medium strength N—H stretch centered at about 3300 cm$^{-1}$, as well as strong carbonyl absorptions at about 1665, about 1652 and about 1660 cm$^{-1}$, respectively, confirming the presence of the amide sidechains (FIG. 20). The well-defined in-phase oop C—H wagging motion of the meta-substituted phenyl ring can be identified by the strong absorptions at about 888, about 783, and about 694 cm$^{-1}$ for PDA 2a, about 873, about 774, and about 698 cm$^{-1}$ for PDA 2b, and about 870, about 783, and about 698 cm$^{-1}$ for PDA 2c, respectively. The stretching vibration at about 880 cm$^{-1}$ corresponds to the oop C—H wagging motion of a single, isolated aromatic C—H bond, whereas the stretching vibration at about 780 cm$^{-1}$ results from the oop C—H wagging motion of the three adjacent hydrogens between the meta substituents. The strong absorption at about 700 cm$^{-1}$ is a ring bending mode characteristic of asymmetrically substituted (meta) phenyl rings. In combination, these stretches provide strong support for the meta-substituted nature of the aryl rings in PDAs 2a-2c.

Due to the symmetric nature of the PDA backbone, Raman spectroscopy is another technique of choice for its characterization. Excitation of the polymers in the form of pressed pellets using an about 514 nm Argon laser produces intense peaks at about 1466 cm$^{-1}$ and about 2113 cm$^{-1}$ for PDA 1, about 1471 cm$^{-1}$ and about 2120 cm$^{-1}$ for PDA 2a, about 1483 cm$^{-1}$ and about 2133 cm$^{-1}$ for PDA 2b, and about 1480 cm$^{-1}$ and about 2110 cm$^{-1}$ for PDA 2c (FIG. 21). These peaks correspond to symmetric stretching vibrations for the alkene (about 1466, about 1471, about 1483, and about 1480 cm$^{-1}$) and alkyne (about 2113, about 2120, about 2133 and about 2110 cm$^{-1}$) moieties of the polydiacetylene backbone. Importantly, lack of any noticeable absorption at about 2200 cm$^{-1}$, corresponding to monomeric butadiynes 3 and 4a-c, confirms the absence of any monomer contamination in the polymer samples.

XPS analysis of PDAs 1 and 2a-c shows distinct C1s spectra with two well defined peaks (FIGS. 34-37). The single peaks centered at about 284.5, about 284.7, about 284.6 and about 284.5 eV in the spectra of PDAs 1, 2a, 2b and 2c, respectively, reflect the combination of sp, sp$^2$, and sp$^3$ hybridized carbons engaged in the carbon-carbon bonding throughout the structure. The peaks centered at about 287.2, about 287.9, about 287.7, and about 287.5, respectively, correspond to the sp$^2$ hybridized carbonyl carbon of the PDA side chains.

Thermal Conversion of the Polydiacetylenes to Graphene Nanoribbons

With large quantities of the PDA polymers produced, their conversion to [8]$_4$GNR was carried out by heating of the bulk polymers in a programmable tube furnace under argon flow. PDA polymers 1 and 2a-c were placed in an aluminum oxide boat within a quartz tube and heated at various temperatures for about 1 hour. The resulting materials were characterized by CP/MAS $^{13}$C NMR, Raman, XPS and FT-IR to follow the PDA to GNR conversion process (FIGS. 19-22, 26-41). Successful transformation of the PDAs to [8]$_4$-GNR relies on three thermally promoted reactions, namely (1) backbone Hopf cyclization, (2) exhaustive cyclo-dehydrogenation of the nanoribbon core, and (3) removal of the edge groups (ketone or amide). From the gathered spectroscopic data, it can be concluded that for all PDAs presented here, Hopf cyclizations along the poly-enyne backbone are completed before the other two stages at the range of temperature between about 400 and about 500° C. Accordingly, the below presents spectroscopic evidence for all three stages of the PDA to GNR pathway.

Initial Step, Backbone Cyclization (Hopf Reaction)

Figure 22A:
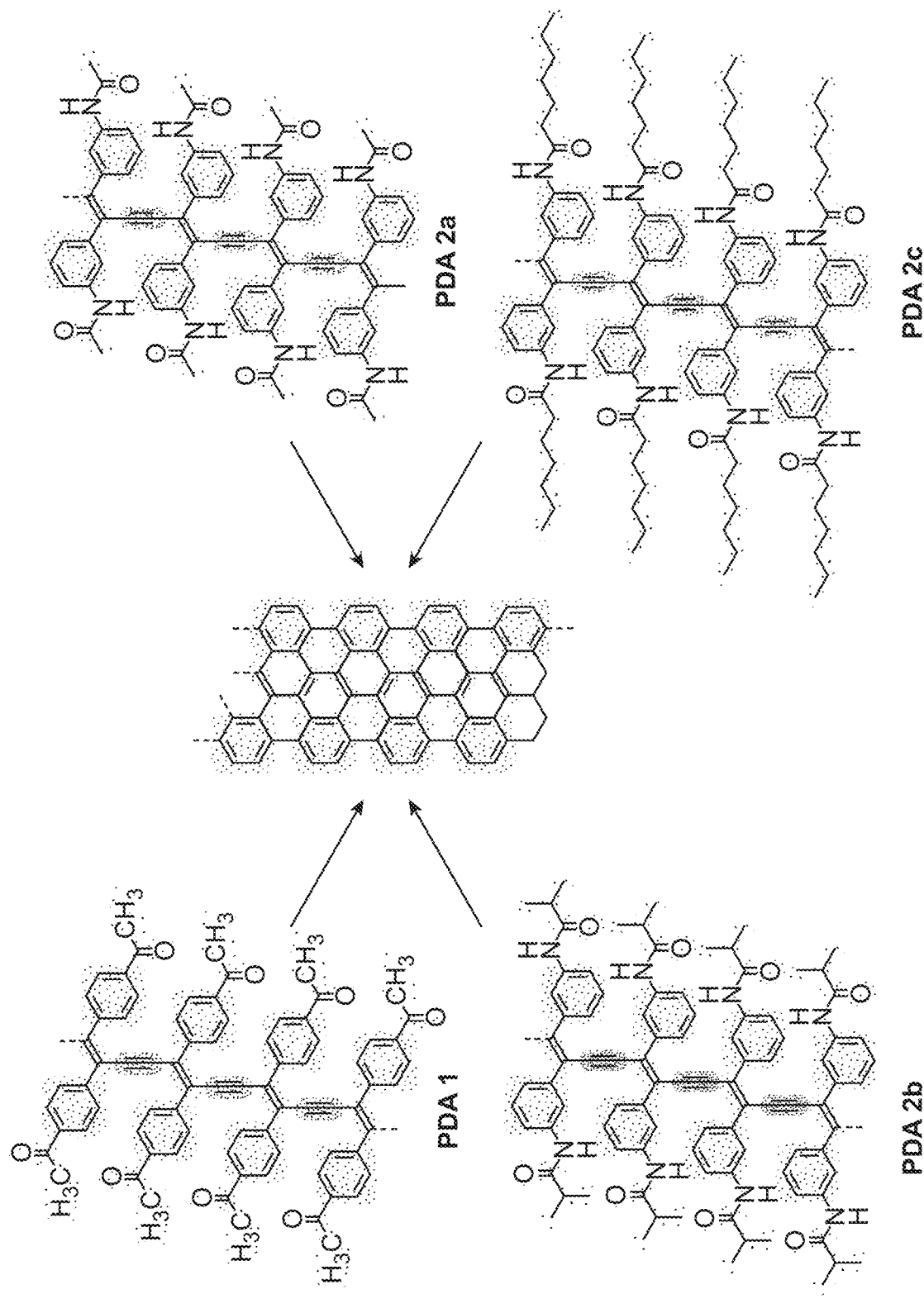
FIG. 22. CP/MAS $^{13}$C NMR spectra for the conversion of PDAs 1, 2a-2c to $[8]_4$GNR. a) Overview of the thermal conversions of PDAs 1, 2a-2c to $[8]_4$GNR. b-e) Spectra corresponding to the different samples obtained after heating at the temperatures shown, each for about one hour. All spectra are normalized for comparison.
Figures 22B, 22C:
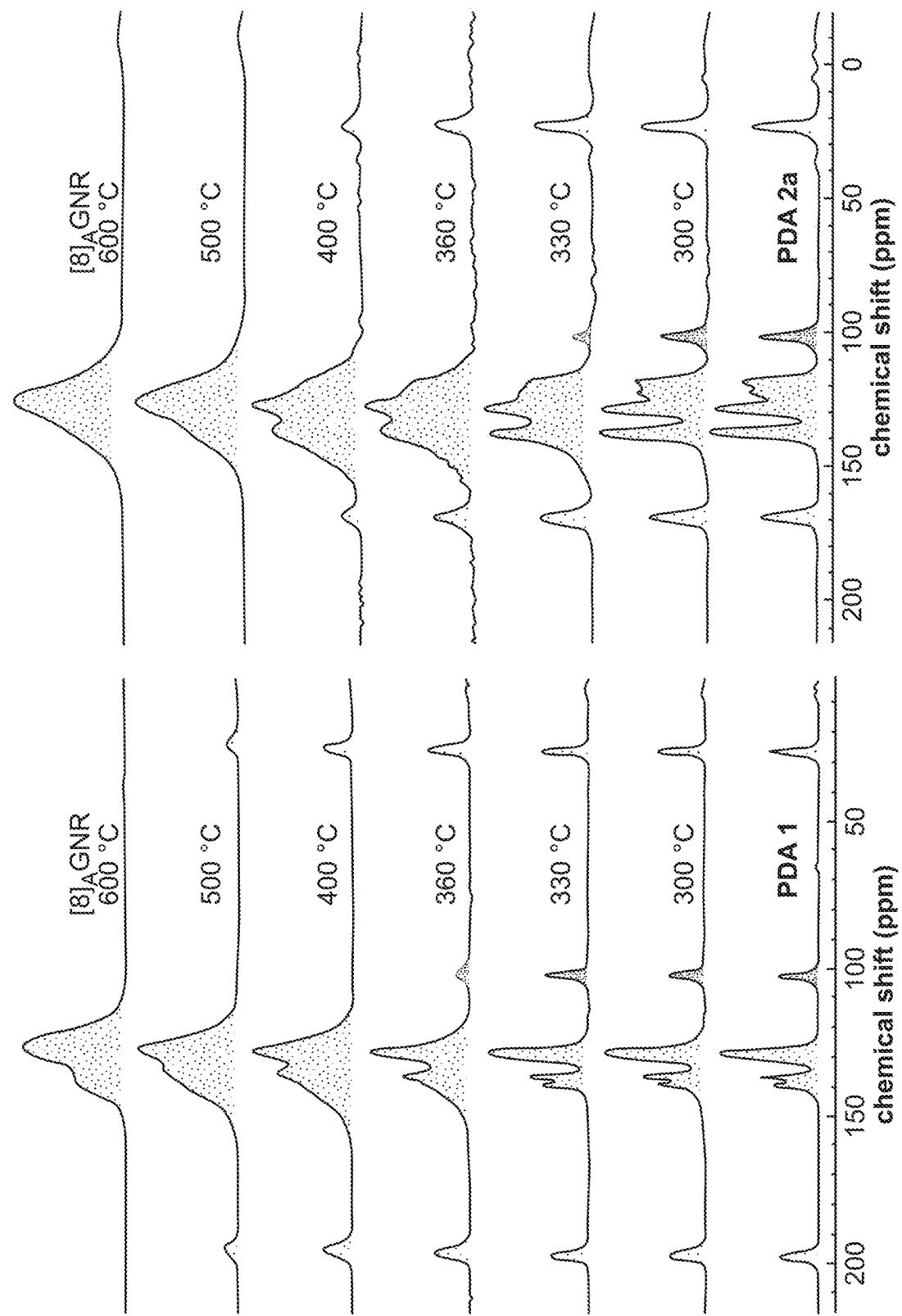

The CP/MAS $^{13}$C NMR spectra provide unambiguous assignments for the internal alkyne carbons of each PDA (about 101-102 ppm). Heating of the PDA polymers to either about 500° C. (1) or about 400° C. (2a-c) for about 1 hr results in complete loss of the backbone alkyne carbons in the CP/MAS $^{13}$C NMR spectra (FIG. 22). Concomitant with this change is a transformation of the aryl region (about 100-150 ppm) from the well-defined spectra of the unheated PDAs to a broader cluster with two main peaks at about 127 and about 135 ppm for 1, and about 127 and about 137 ppm for 2a-c, respectively. Interestingly, the spectra of the heated polymers are remarkably similar, which highlight a common cyclization pathway among all of the polymers.

Figure 20A:
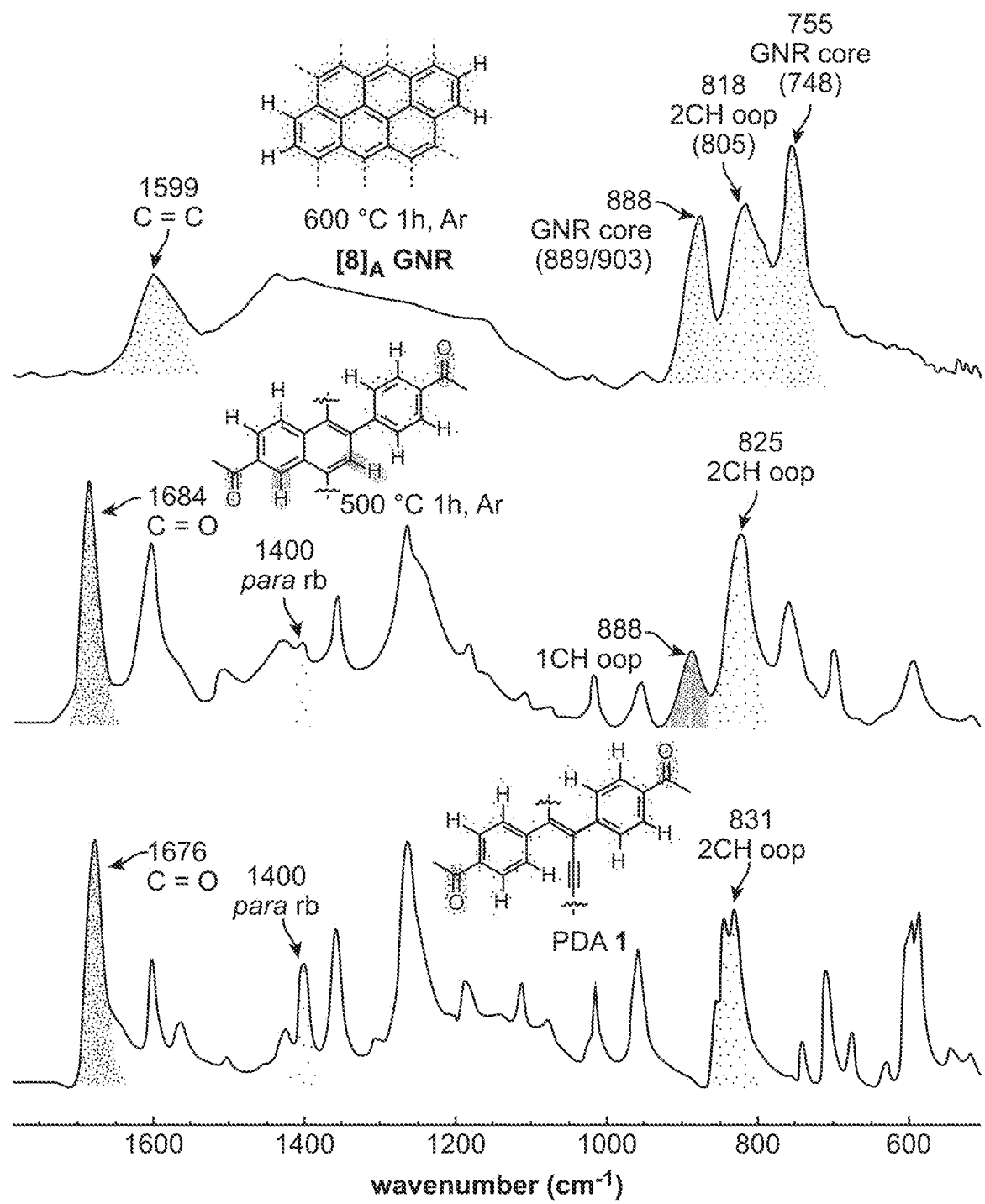
FIG. 20. Detailed infrared (IR) analysis of the conversion of PDAs 1 and 2a-2c to $[8]_4$GNR via annulated intermediate polymers. Characteristic stretches have been denoted and are shaded. Experimentally measured vibrations have been marked with corresponding calculated (DFT) vibrational modes denoted within parenthesis where applicable.
Figure 20B:
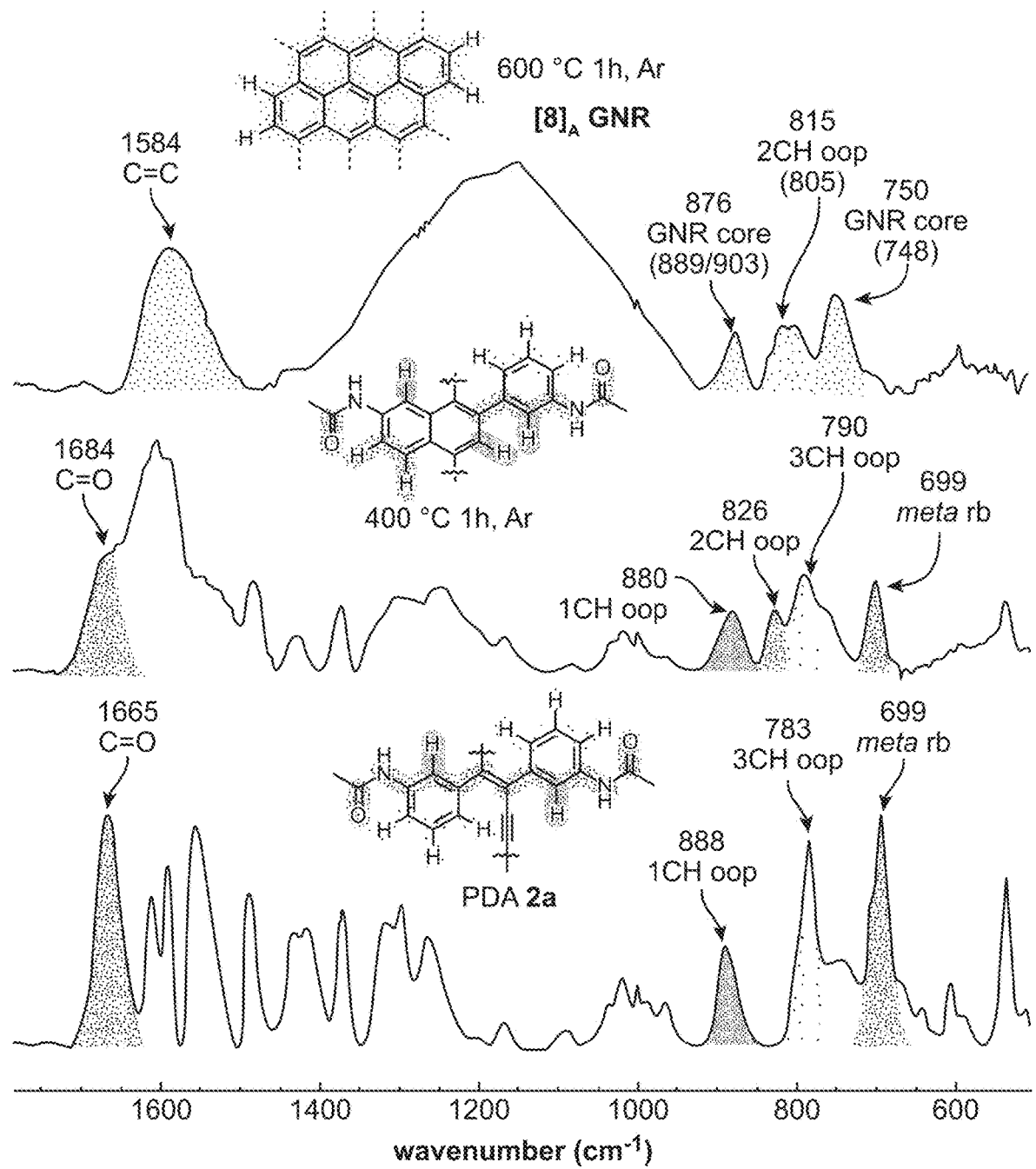
Figure 20C:
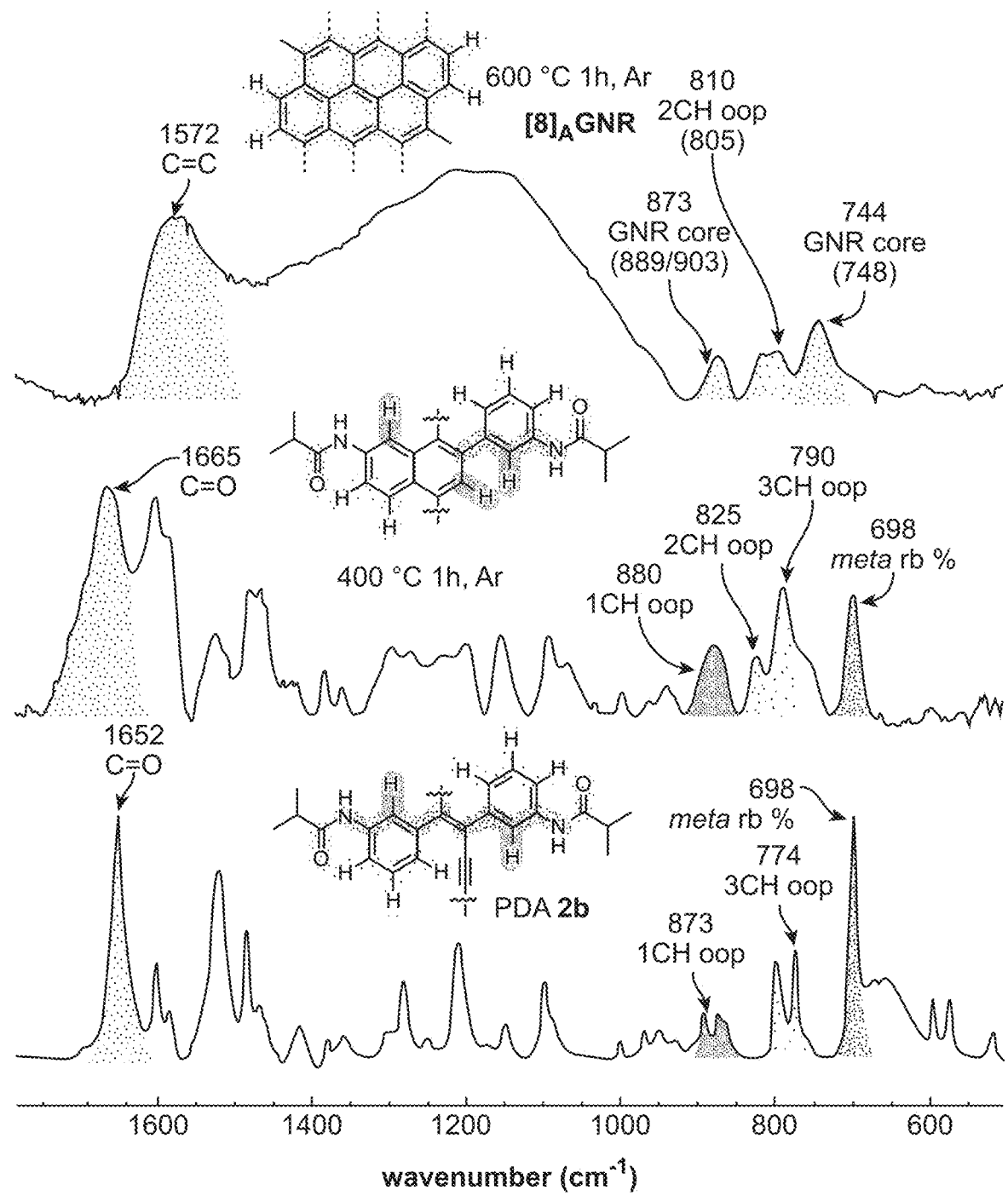
Figure 20D:
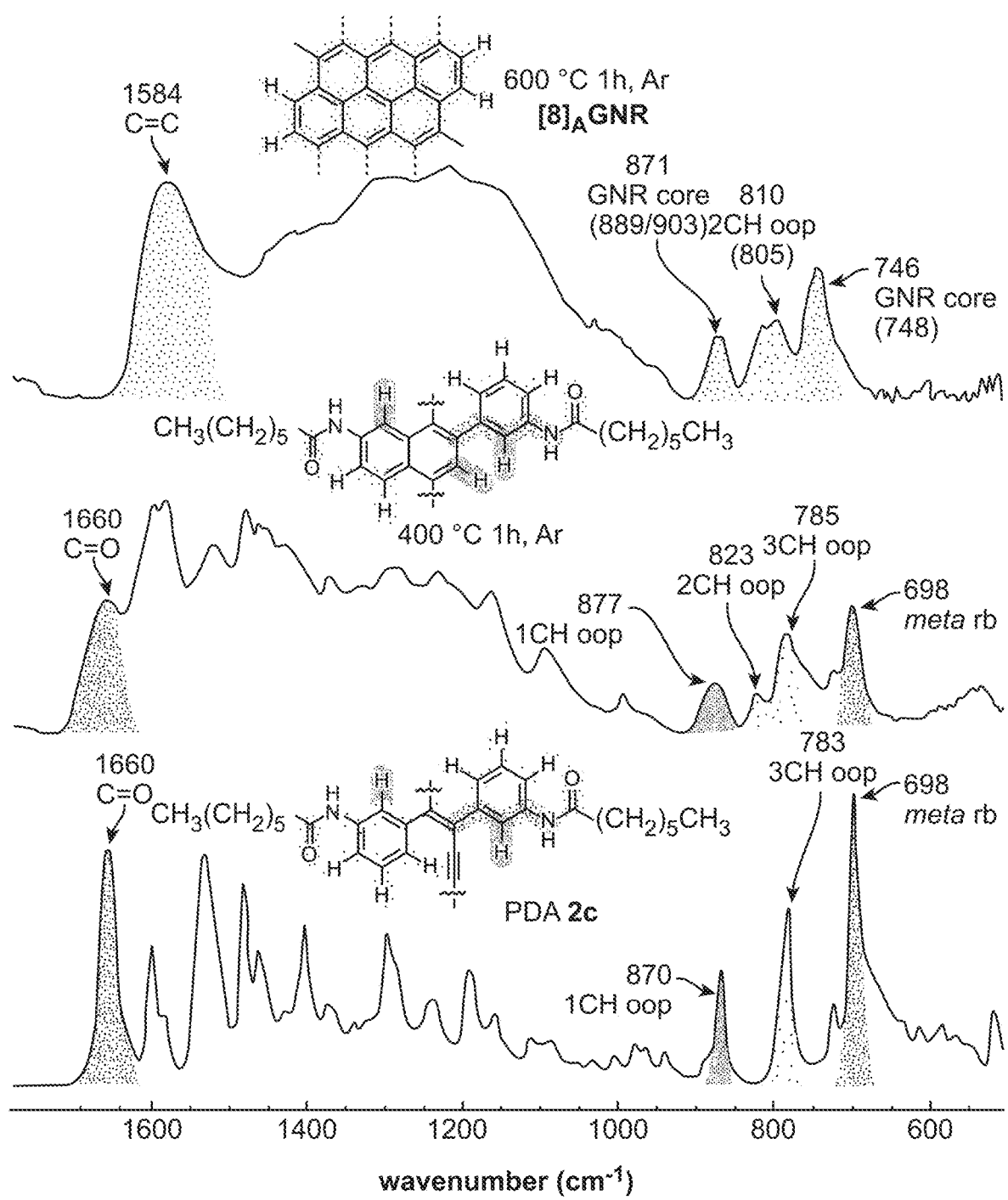
Figure 21A:
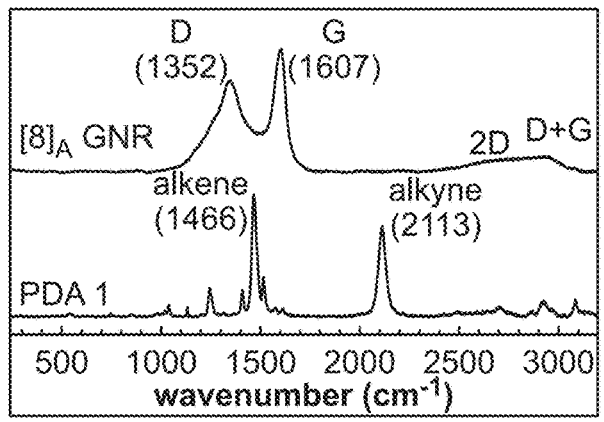
FIG. 21. Raman spectra of PDAs 1 and 2a-2c and the corresponding $[8]_4$GNR samples produced after thermal conversion. Specific vibrations corresponding to the enyne backbone of the PDA polymers, as well as the D and G peaks characteristic of GNRs, are labeled.
Figure 21B:
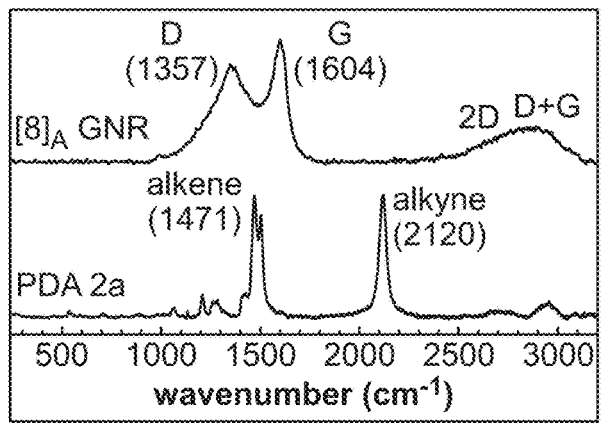
Figure 21C:
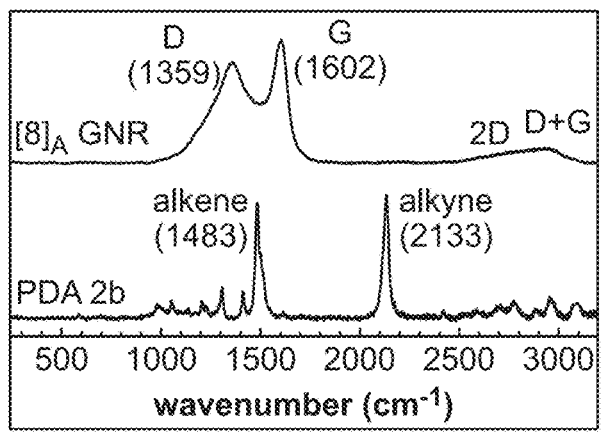
Figure 21D:
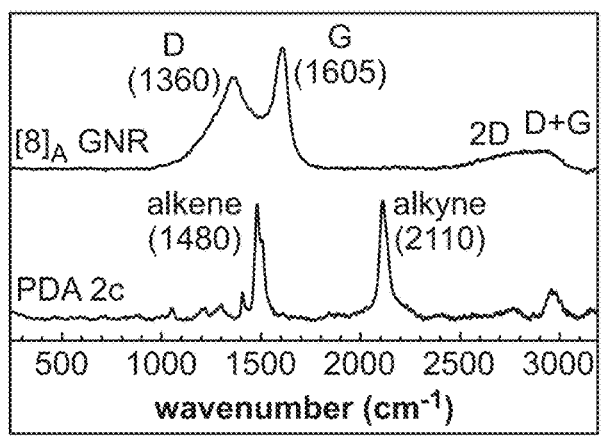

Raman analysis of the heated polymers also confirms the absence of any remaining backbone alkynes (FIGS. 38-41). Of note, analysis of the IR spectra obtained for these heated polymers details discrete changes in their out-of-plane (oop) bending modes (FIG. 20). The oop bending modes are spectroscopic signatures of the substitution patterns within the aryl rings in the starting material, intermediate structures, and final [8]$_4$GNR product. The IR data for PDA 1 heated to about 500° C. shows the appearance of a new C—H oop bending absorption at about 888 cm$^{-1}$, characteristic of a lone aryl C—H with no adjacent hydrogens, which can appear if an annulated ring such as naphthalene or chrysene is formed, which is also supported by the frequency calculations (FIG. 20a). Furthermore, the strong phenyl ring bending mode characteristic of para substituted rings at about 1400 cm$^{-1}$ has been attenuated, lending further support to an annulated intermediate structure. Very similar changes can be noted in the IR spectra of samples of 2a-c heated to about 400° C. (FIGS. 20b-d). In all three IR spectra, a new oop C—H bend characteristic of two adjacent aryl hydrogens appears at about 826, about 825, and about 813 cm$^{-1}$ for PDAs 2a, 2b, and 2c, respectively. Importantly, this specific oop C—H bend should occur if polymers 2a-c underwent cyclization para to their amido substituents.

The combined CP/MAS $^{13}$C NMR, IR, and Raman data provide strong evidence that the PDA polymers have undergone successful cyclization of the backbone alkyne units to form annulated polycyclic aromatic structures (FIG. 15). While the spectroscopic data does not directly point to a specific mechanism of backbone cyclization, it is highly likely that formal Hopf (dieneyne) cyclizations are occurring as designed.

Stages 2 and 3—Exhaustive Cyclodehydrogenation and Side Chain Removal

The remaining two thermal stages, cyclodehydrogenation of the nanoribbon core and side chain removal, both occur upon heating of PDAs 1 and 2a-c up to about 600° C. for about 1 hr. Evidence for thermal cyclodehydrogenation is again found through analysis of the CP/MAS $^{13}$C NMR, IR and Raman data (FIGS. 20-22). The CP/MAS $^{13}$C NMR spectra obtained after heating PDAs 1 and 2a-c to about 600° C. for about 1 hr show a clean convergence to the uniform spectra of [8]$_A$GNR (FIG. 22). In all spectra, resonances corresponding to the carbonyl and alkyl carbons of the PDA side chains are absent, indicating substantially complete removal. Furthermore, the aryl region has simplified dramatically and all spectra of [8]$_A$GNR exhibit a principal peak centered at about 126 ppm, along with a prominent shoulder at about 137 ppm. The position of the principal peak is in good agreement with calculated and experimental data for graphene-like systems.

Figure 23A:
FIG. 23. Table 1—Comparison of fitted experimental spectral curves with calculated $^{13}$C NMR chemical shifts (B3LYP/6-31G(d)) for the model $[8]_4$GNR molecule shown in a). b) Deconvolution analysis of the $^{13}$C CP/MAS NMR spectrum $[8]_4$GNR obtained from PDA 1 using a set of four curves with substantially equal heights.
Figure 23B:
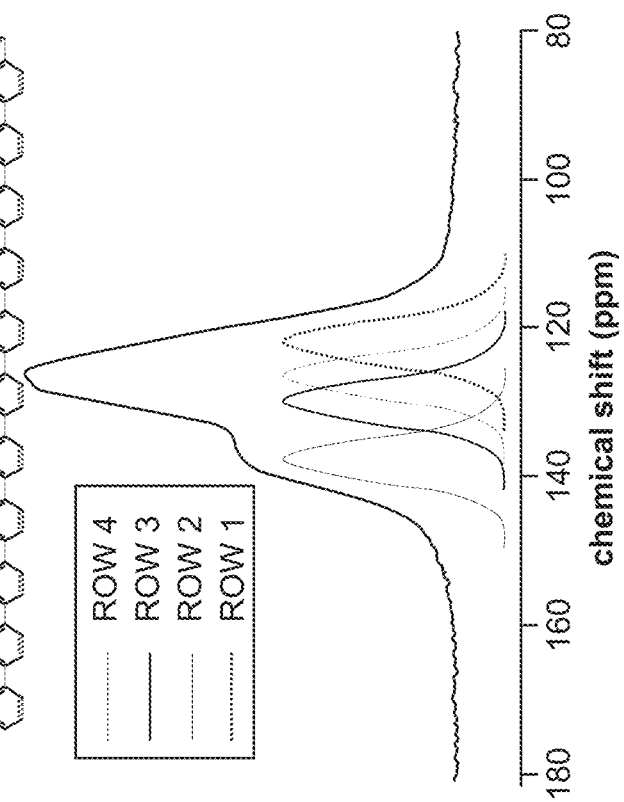
Figure 42:
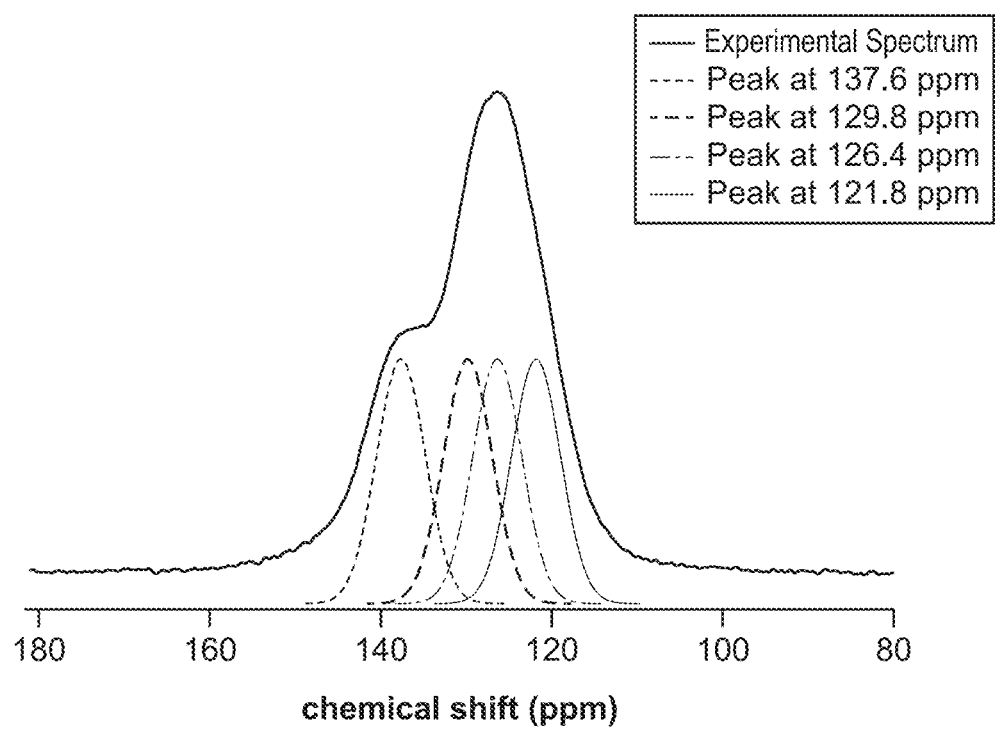
FIG. 42. Calculated curve fitting of CP/MAS $^{13}$C NMR data for [8]$_4$ GNR produced from thermal aromatization of PDA 1. Peak fitting was accomplished using the Multipeak Fitting 1.4 package in Igor Pro 6.37. The experimental spectra were fit to four peaks over the region of interest using a Gaussian line shape. As each GNR is composed of four distinct carbons of equal weighting, the amplitude and width of each fit was held constant during the fitting process. The results show four distinct functions whose centers were taken to be the chemical shift of the carbons in question.
Figure 43:
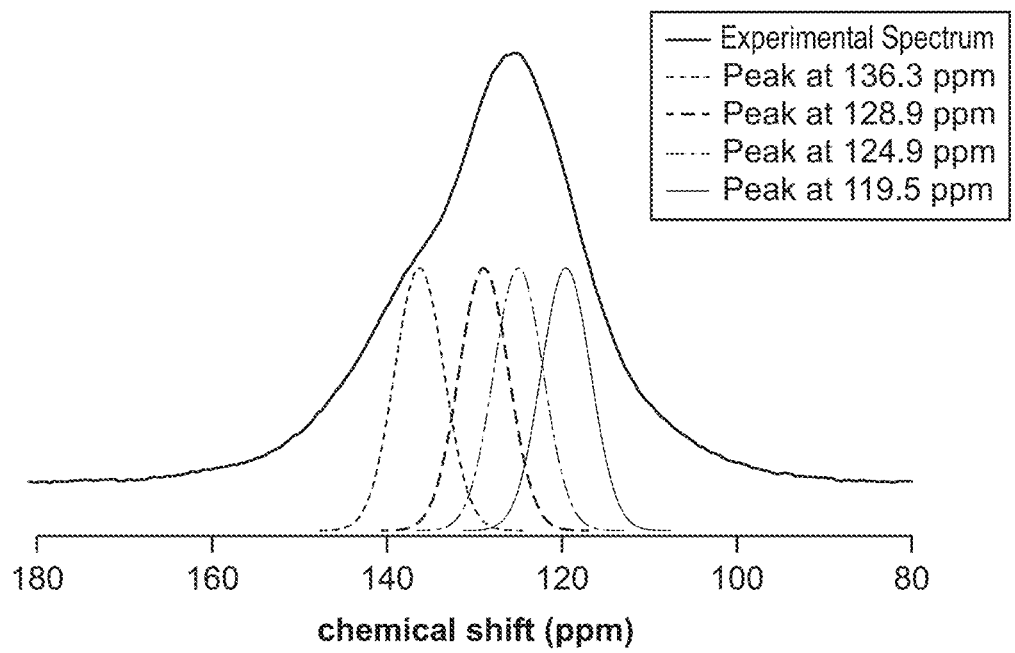
FIG. 43. Calculated curve fitting of CP/MAS $^{13}$C NMR data for [8]$_4$ GNR produced from thermal aromatization of PDA 2a. Peak fitting was accomplished using the Multipeak Fitting 1.4 package in Igor Pro 6.37. The experimental spectra were fit to four peaks over the region of interest using a Gaussian line shape. As each GNR is composed of four distinct carbons of equal weighting, the amplitude and width of each fit was held constant during the fitting process. The results show four distinct functions whose centers were taken to be the chemical shift of the carbons in question.
Figure 44A:
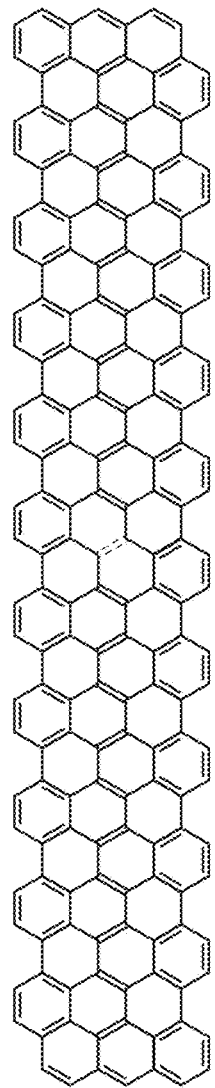
FIG. 44. a) Chemical structure with listed range of calculated $^{13}$C NMR chemical shifts for each row of non-symmetrically related carbons, and b)$^{13}$C NMR chemical shifts δ (ppm) for a large section of [8]$_4$GNR calculated at the B3LYP//6-31G* level of theory. NMR shielding tensors were computed with the Gauge-Independent Atomic Orbital (GIAO) method. The calculation was performed with the MacSpartan 16 package. The $^{13}$C NMR chemical shifts that are displayed here are all within ±1 ppm of each other in each of the four different rows of carbons. Thus, the 2nd row of carbons should roughly have a relative intensity of about 1:3 with those carbons within rows 1, 3, and 4. c) Plot of all the $^{13}$C NMR chemical shifts obtained in the B3LYP//6-31G* calculation for this model compound using Spartan 16.
Figure 44B:
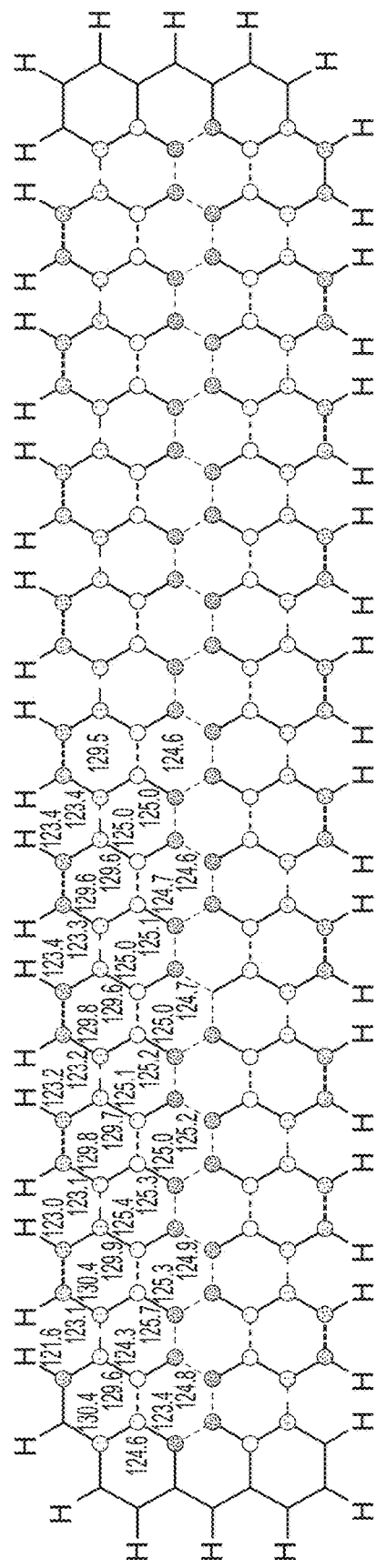
Figure 44C:
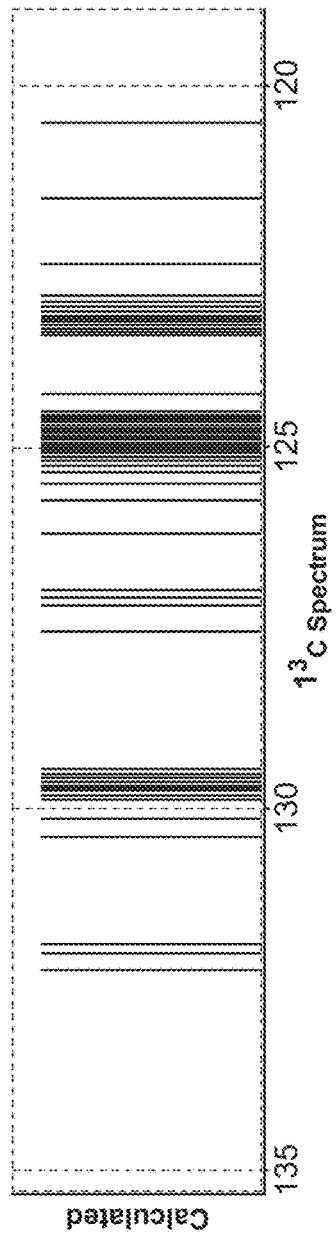

The spectra of [8]$_A$GNR produced from the different PDAs vary slightly with respect to their peak width at half height (FIG. 22), which can be attributed to the differences in morphology of the samples as further discussed in the IR analysis below. In CP/MAS experiments, the intensities of carbon peaks are directly related to the amount of cross-polarization that they experience. In the CP/MAS experiments, a long cross-polarization contact time (about 5 ms) is used to eliminate any distance dependence and its effect on the height or ratio between individual peaks. The relative ratio of the shoulder at about 137 ppm to the main peak at about 126 ppm in all three spectra is about 1:3 (Table 1 in FIG. 23). Due to the highly symmetric nature of the graphene nanoribbons, there should be just four carbons with distinct chemical shifts in [8]$_A$GNR; which include the edge C—H carbons and three quaternary interior carbons (FIGS. 42 and 43). Deconvolution of the experimental spectra of [8]$_A$GNR obtained from PDAs 1 and 2a using four equal intensity curves provides the values shown in Table 1. The chemical shifts of the individual carbons of [8]$_A$GNR produced from PDA 1 are centered at about 137.6, about 129.8, about 126.4, and about 121.8, while the [8]$_A$GNR produced from PDA 2a has chemical shifts of about 136.3, about 128.9, about 124.9, and about 119.5 respectively. The shoulder peak (about 137 ppm) can be attributed to the quaternary carbon of the bay region (second row), which is also evidenced by the calculated model for a large section of [8]$_A$GNR (B3LYP//6-31G* level of theory) (Table 1 and FIG. 44). The NMR shielding tensors were computed with the Gauge-Independent Atomic Orbital (GIAO) method. Overall, the calculated chemical shifts are in rather good agreement with the deconvoluted chemical shifts for the four types of carbons (Table 1 and FIG. 44)

Figure 45:
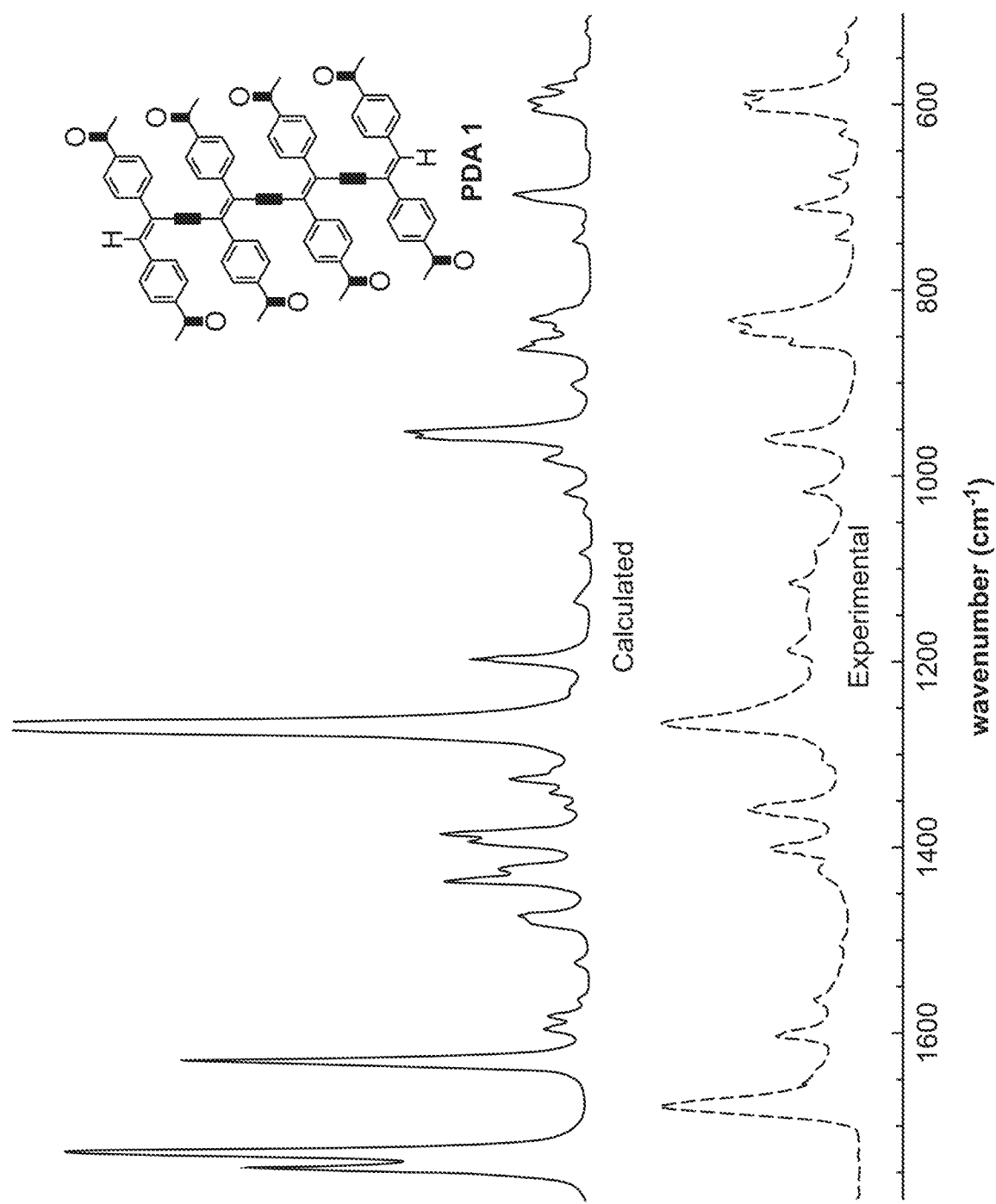
FIG. 45. Comparison of calculated and experimental IR spectra for PDA 1.
Figure 46:
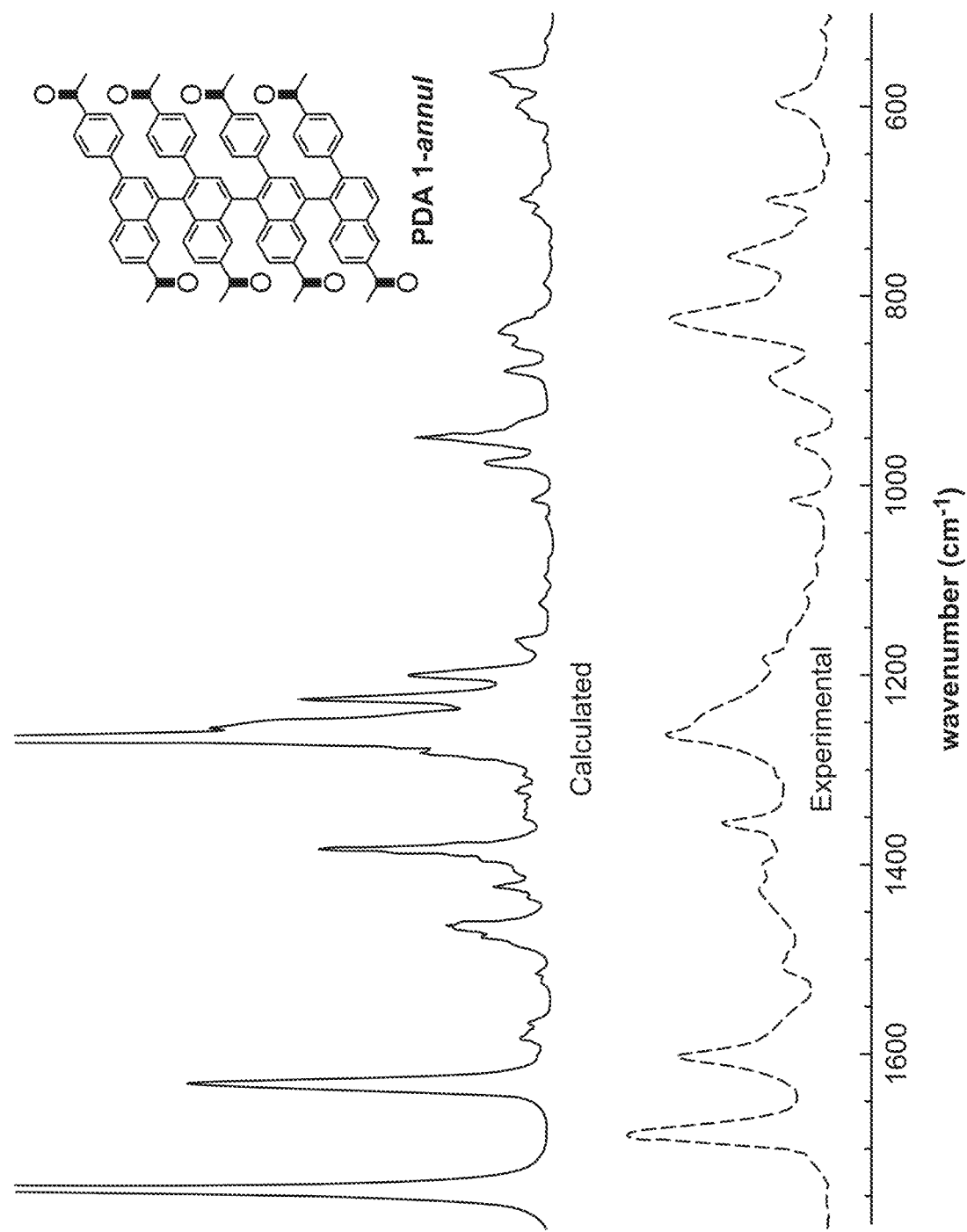
FIG. 46. Comparison of calculated IR spectra of a possible structure for the annulated polymer (an-PDA) resulting from thermal treatment of PDA 1 and comparison to experimental data.
Figure 47:
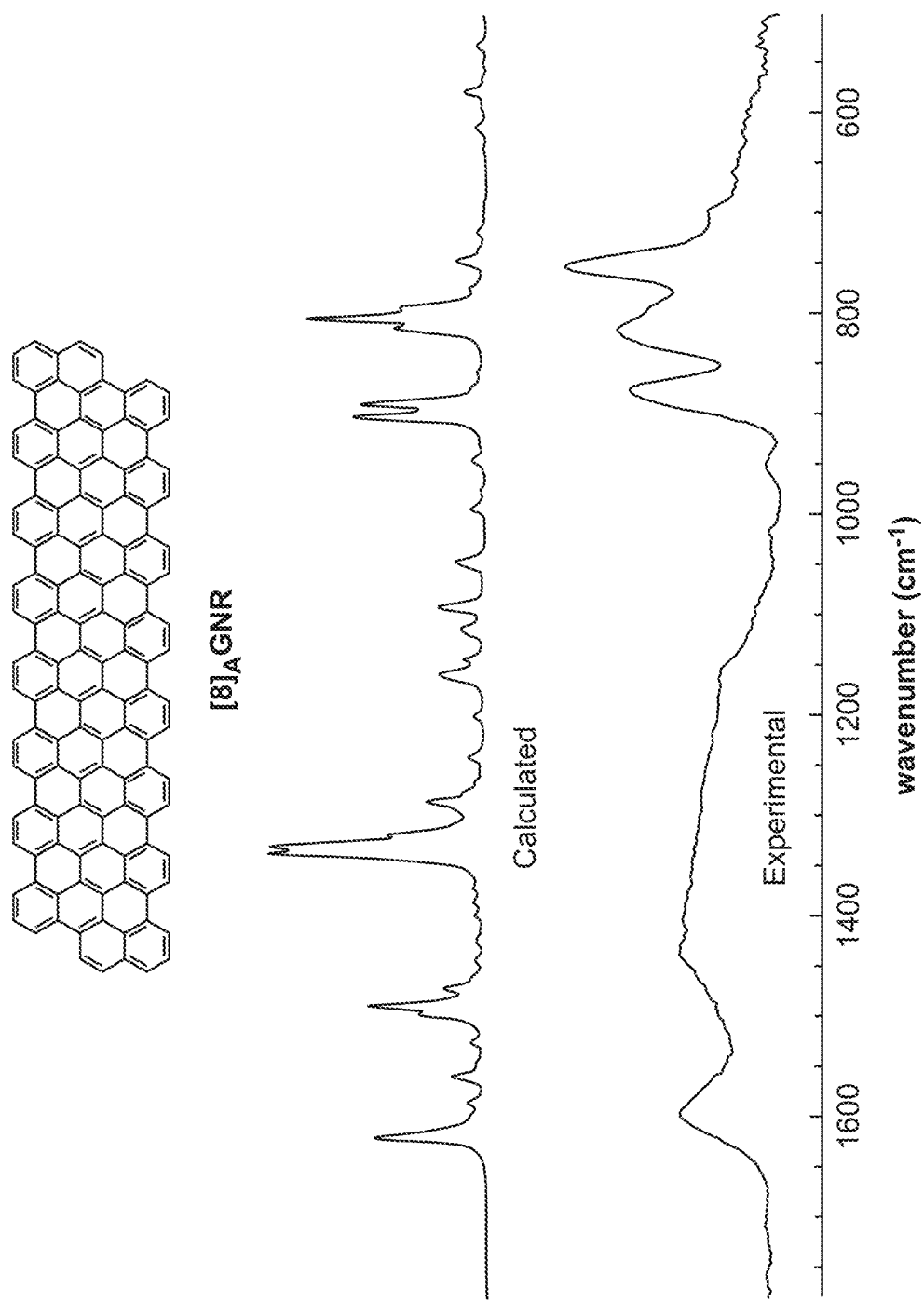
FIG. 47. Comparison of calculated and experimental IR spectra for [8]$_4$GNR produced from thermal aromatization of PDA 1. In light of available computational resources, a section of [8]$_4$GNR was used as a surrogate for the spectrum calculation in lieu of the corresponding infinite ribbon. The ribbon is 34 carbons in length and its structure is shown above the spectra.

As was detailed earlier, analysis of the oop CH wag region (about 1000-700 cm$^{-1}$) for heated samples of the PDAs confirms the successful cyclization of alkynes on the backbone of PDAs 1 and 2a-c. Upon heating of the polymers to about 600° C., IR spectra are obtained with remarkably similar features which can be assigned to [8]$_A$GNR (FIG. 20). The CH oop region is transformed further upon heating to about 600° C., producing three distinct peaks. The intensity and shape of the peaks are similar in all samples of [8]$_A$GNR and occur at similar wavenumbers. Of note, all samples of [8]$_A$GNR display an oop CH wagging mode for two adjacent (ortho) hydrogens at about 818, about 815, about 810, and about 810 cm$^{-1}$ for [8]$_A$GNR produced from PDAs 1 and 2a-c, respectively. This stretch is consistent with the presence of two adjacent hydrogens at the edges of [8]$_A$GNR. The two other distinguishable peaks in the oop region are centered at about 875 cm$^{-1}$ and about 750 cm$^{-1}$ for all samples. Frequency analysis calculation performed on a model system slightly shorter than that shown in Table 1 gives a fingerprint region similar to the experimental spectrum (FIG. 47). Analysis of the calculated vibrational modes provides insight into the molecular origin of the three fingerprint stretches observed in all experimental spectra. The experimental absorption at about 750 cm$^{-1}$ can be attributed to an asymmetric ring stretching mode for the C=C bonds within the [8]$_A$GNR core, calculated to occur at about 748 cm$^{-1}$. Furthermore, the oop CH wagging mode for the edge protons is calculated to occur at about 805 cm$^{-1}$ and is observed experimentally at about 815 cm$^{-1}$. Finally, the strong absorption at about 875 cm$^{-1}$ is calculated as two modes at about 905 and about 890 cm$^{-1}$, which are in-plane rocking modes for the edge CH bonds. Another common feature in all spectra of [8]$_A$GNR is the presence of a broad range of absorptions (hump) between about 1000 and about 1400 cm$^{-1}$. The calculations predict this region to contain a number of frequencies arising from the in- or out-of-plane modes for edge C—H bonds, as well as in-plane bending modes for C—C and C=C stretches within the fused rings of the GNR core (see FIGS. 45-46). Broad absorbance in this region has been ascribed to large networks of delocalized, conjugated π bonds.

Further confirmation of successful cyclodehydrogenation and side-chain removal is evidenced by the Raman spectra of the respective samples of [8]$_A$GNR (FIG. 21). Raman spectra of all PDA polymers after heating to about 600° C. for about 1 hr exhibit D and G peaks, which are spectroscopic signatures for GNRs (FIGS. 21 and 38-41). The [8]$_A$GNRs produced from either 1 or 2a, 2b or 2c display a large D peak at about 1352, about 1357, about 1359, and about 1360 cm$^{-1}$ and a base G peak at about 1607, about 1604, about 1602 and about 1605 cm$^{-1}$, respectively. In all four cases, the G peak is slightly upshifted and broadened compared to the G peak for pristine few-layer graphene, which occurs at about 1581 cm$^{-1}$. This shift is consistent with a narrowing of a graphene sheet into "nanographene". Additionally, the overtone 2D and D+G peaks can clearly be identified, but display significant broadening. The broadening of these peaks can be attributed to strong π-π* interactions between multiple layers, a consequence of the highly stacked nature of the GNRs in bulk samples (see below for TEM section). While this broadening is most likely a consequence of the tight graphitic stacking of the GNRs in the bulk, it is also possible that defects within the formed ribbons are contributing to this effect. One consequence of the crystal-phase topochemical polymerization of diynes 3 and 4a-c is that the resulting PDA polymers 1 and 2a-c are strongly organized in columnar stacks. These stacks are likely to have a templating effect during the graphitization stage affording the GNRs. Nevertheless, the appearance of the D and G peaks and their overtones provide spectroscopic evidence that exhaustive cyclodehydrogenation has taken place along the PDA nanoribbons to give the $[8]_4$GNRs.

All four samples of $[8]_4$GNR produced from PDAs 1 and 2a-c to $[8]_4$GNR—were also examined by XPS to ensure the substantially complete removal of side-chains as evidenced by the loss of a C=O peak (FIGS. 34-37). All C1s spectra of $[8]_4$GNRs display a single peak centered at about 284.6 eV, characteristic of $sp^2$ hybridized carbons engaged in C—C and C—H bonding. All spectra also show significant narrowing of their main C1s peak, due to the absence of sp or $sp^3$ hybridized carbons, further confirming that backbone cyclization and side-chain removal is substantially complete.

Transmission Electron Microscopy

The morphology of the PDA polymers and the ensuing GNRs was investigated by HRTEM (FIG. 24). All four PDA polymers have a thin fibrous nature with uniform thickness, and show large regions of agglomeration (FIG. 24a). After thermal aromatization to $[8]_4$GNR, all samples display tight (about 0.34 nm) co-facial graphitic stacking and can be seen by HRTEM (FIG. 24b). Additionally, the long length and flexibility of the stacked GNRs can be distinctly visualized. The stacked nature of the GNR samples appears reinforced by the initial preorganization of the PDA polymers as they are formed within crystals, which leads to in-register columnar stacks that remain strongly associated after aromatization. This supports the Raman data gathered from the samples and helps to explain the broadening of the 2D and D+G bands as a consequence of tight nanoribbon stacking. Of note, individual ribbons can be identified and measured (FIGS. 24c,d). FIG. 24c shows a number of individual $[8]_4$GNRs, produced from thermal aromatization of PDA 2b, aligned horizontally with respect to each other. Their uniform width (about 1.2 nm) is confirmed through a plot profile of pixel intensities across a number of GNR bundles (see FIG. 48). This value is in close agreement with their calculated width of about 1.3 nm.

Conclusion

Described are parallel synthetic routes to $[8]_4$GNRs from four differently substituted 1,4-diphenyl polydiacetylenes. PDA polymers 1 and 2a-2c can be readily synthesized in bulk quantities via a solid-state topochemical polymerization. Heating of all four PDAs between about 500 and about 600° C. under Ar for about 1 hr promotes their conversion to $[8]_4$GNR in the solid state, without requiring additional reagents. This process occurs via a cascade of thermally promoted reactions including (1) backbone cyclization, (2) exhaustive cyclodehydrogenation, and finally (3) side chain thermolysis, as highlighted by the spectroscopic data. This solid-state reaction cascade is remarkably efficient, as evidenced by the yields in the PDA 1 and 2a-2c to GNR conversions being quantitative in all cases. Accordingly, the quality of this complex transformation can be viewed as a highlight of designed solid-state reaction pathways. The approach should be expandable to GNRs of different widths and structure (including heteroatoms) via judicious design of the starting diarylbutadiyne monomers.

Experimental Highlights

Figure 24A:
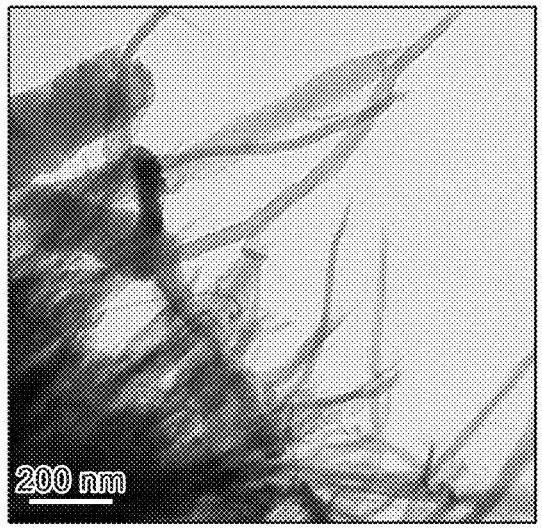
FIG. 24. TEM and high-resolution TEM (HRTEM) analysis of PDA polymers and the $[8]_4$GNRs produced from their solid-state graphitization. a) TEM analysis of PDA polymer 1 showing the thin, layered and fibrous nature of the polymer. b) HRTEM analysis of the resulting $[8]_4$GNR produced from heating of PDA 1. The tight (about 0.34 nm) co-facial π-π (002) graphitic stacking of the GNRs can be seen. c,d) HRTEM analysis of $[8]_4$GNR produced from PDA 2b. Individual GNRs of width about 1.2 nm can be seen.
Figure 24B:
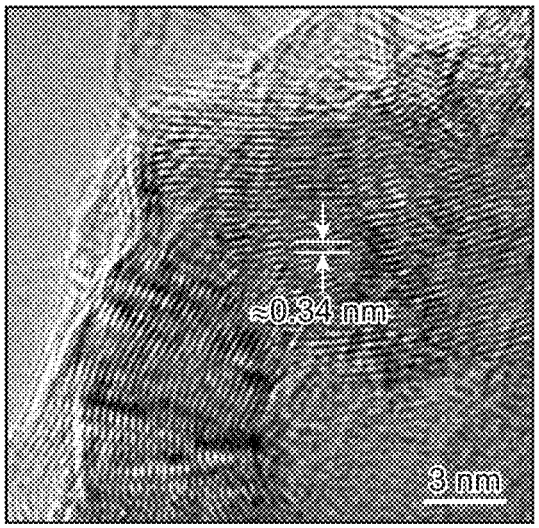
Figure 24C:
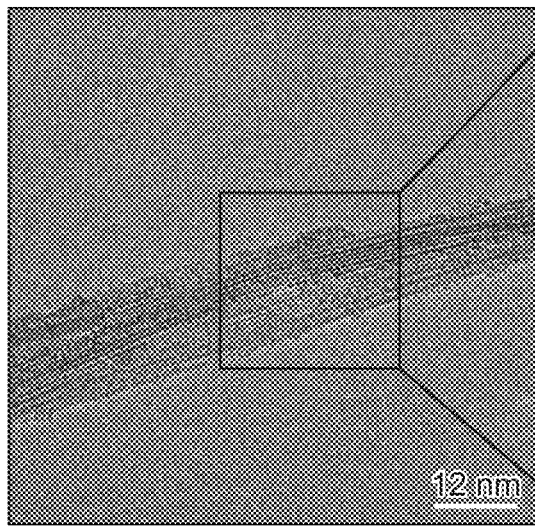
Figure 24D:
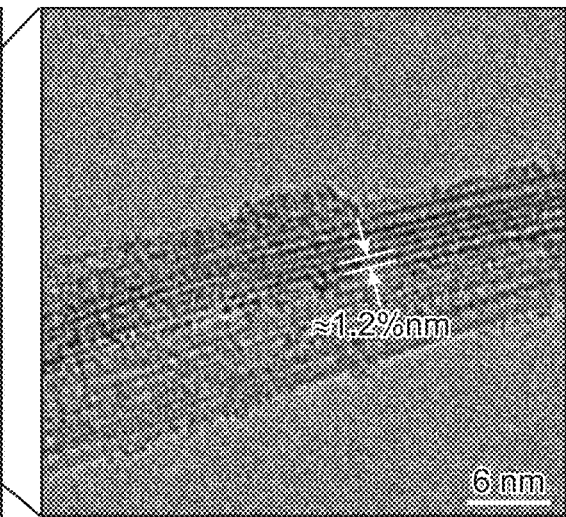

Detailed synthetic procedures and characterization data for compounds are provided in the section below. Topochemical polymerizations were carried out using a high powered Hanovia lamp inside a quartz immersion well for cooling. All PDA heating experiments were carried out in alumina boats inside a programmable tube furnace under a positive argon flow. Solid state CP/MAS $^{13}$C NMR experiments were performed on a Bruker DSX300 instrument operating at about 300 MHz, utilizing an about 4 mm zirconia rotor spinning at about 10 KHz. Raman spectra were obtained on pressed pellets using a laser excitation wavelength of about 514 nm with a maximum output of about 40 mW. IR spectra were obtained using an ATR-IR instrument. TEM and HRTEM samples were prepared by drop-casting of dispersed PDA samples onto Si wafers. The PDA coated Si wafers were then heated at about 600° C. for about 1 hr under argon flow to promote graphitization. The formed GNRs were then mechanically transferred in air to a TEM grid by brushing of the grid against the GNR coated surface. All TEM images were collected on a Tecnai G$^2$ TF20 (FEI). FIGS. 24a,b were collected at about 200 kV on TEM grids with formvar films and lacey carbons grids. FIGS. 24c,d were acquired at about 200 kV with low-dose technique on TEM grids with lacey carbon. FIG. 24d was processed using ImageJ.

Additional Information

Experimental Details:

General Procedures: Unless stated otherwise, reactions in this example were performed under an argon atmosphere in flame-dried glassware. Tetrahydrofuran (THF), methylene chloride ($CH_2Cl_2$), diethyl ether ($Et_2O$), toluene ($C_7H_8$), and acetonitrile ($CH_3CN$) were passed through activated alumina columns prior to use. Chemical reagents were obtained from commercial sources and used without further purification. Reaction temperatures were controlled using an IKA magnetic stirring plate with a temperature modulator and silicone oil bath. Procedures were performed at about 25° C. unless otherwise indicated. Column chromatography was performed on Silicycle (Siliflash P60) silica gel 60 (240-400 mesh). Thin layer chromatography utilized pre-coated plates from E. Merck (silica gel 60 PF254, 0.25 mm). 4'-Ethynylacetophenone and compounds 3, 7c, and 4c were prepared according to their previously reported syntheses.

4'-Ethynylacetophenone: 4'-Bromoacetophenone (about 10.5 g, about 52.8 mmol, about 1 eq) was added to a round bottom flask with a magnetic stirring bar under argon. THF (about 160 ml) was added, followed by bis(triphenylphosphine) palladium dichloride (about 1.85 g, about 2.6 mmol, about 0.05 eq) and copper(I) iodide (about 1.01 g, about 5.28 mmol, about 0.1 eq) in one portion. This mixture was sparged with argon for about 30 min and then trimethylsilylacetylene (about 10.4 g, about 105 mmol, about 2 eq) was added and the mixture heated to reflux until judged complete by $^1$H NMR of the crude (typically overnight). The mixture was cooled to about 25° C. and KF (about 6.13 g, about 105 mmol, about 2 eq) was added along with MeOH (about 110 ml), and the mixture allowed to stir in the air for about 30 min. Once the TMS deprotection was complete as judged by NMR, the mixture was filtered over celite and concentrated. The crude residue was purified by filtration over $SiO_2$ eluting with $CH_2Cl_2$. Evaporation on the Rotavap afforded about 6.2 g (about 81%) of 4'-ethynylacetophenone as a deep yellow oil. $^1$H NMR (400 MHz, $CDCl_3$): 2.60 (s, 3H), 3.24 (s, 1H), 7.57 (d, J=8.6 Hz, 2H), 7.90 (d, J=8.6, 2H); $^{13}$C NMR (100 MHz, $CDCl_3$): 26.65, 80.35, 82.76, 126.93, 128.20, 132.31, 136.80, 197.27. HRMS (DART) Calculated for $C_{10}H_8O$ [M•+H]: 144.05751; found 144.05872.

1,1'-(Buta-1,3-diyne-1,4-diylbis(4,1-phenylene))bis (ethan-1-one) (3): 4'-Ethynylacetophenone (about 6.2 g, about 43 mmol, about 1 eq) was added to a round bottom flask with a magnetic stirring bar and dissolved in $CH_2Cl_2$ (about 200 ml, about 0.2M). To this mixture was added copper(I) iodide (about 820 mg, about 4.3 mmol, about 0.1 eq) and TMFDA (about 500 mg, about 4.3 mmol, about 1 eq) in one portion. Air was bubbled into the mixture and allowed to react at about 25° C. until complete as indicated by TLC (SiO$_2$, CH$_2$Cl$_2$). Upon completion, the mixture was diluted with water and partitioned via a separator)/funnel. The aqueous layer was extracted with fresh CH$_2$Cl$_2$ three times, organics pooled, washed with about 0.5 M HCl, brine, dried over MgSO$_4$, and filtered and concentrated in vacuo to give the crude product as a crystalline solid. The crude product was immediately recrystallized from boiling ethanol hot filtration and the receiving flask protected from ambient light to constrain polymerization of the forming crystals. A total of about 5.1 g (about 83%) of 3 was obtained as clear crystals which rapidly turn blue upon standing in ambient light. $^1$H NMR (500 MHz, CDCl$_3$): 2.61 (s, 3H), 7.62 (d, J=8.6 Hz, 2H), 7.94 (d, J=8.6, 2H); $^{13}$C NMR (125 MHz, CDCl$_3$): 26.67, 76.56, 81.98, 126.26, 128.31, 132.71, 137.12, 197.06. HRMS (DART) Calculated for C$_{20}$H$_{14}$O$_2$ [M•+]: 286.09938; found 286.098676.

N-(3-Ethynylphenyl)acetamide (7a): Acetyl chloride (about 4.15 g, about 78.5 mmol, about 1.2 eq) dissolved in CH$_2$Cl$_2$ (about 20 ml) was added to a solution of 3-ethynylaniline (about 5.20 g, about 44.4 mmol, about 1.0 eq) and triethylamine (about 5.83 g, about 57.7 mmol, about 1.3 eq) in CH$_2$Cl$_2$ (about 150 ml) at 0° C. The mixture was allowed to warm to about 25° C. and stirred until complete by TLC (SiO$_2$, CH$_2$Cl$_2$/hexanes about 1:1). The reaction mixture was washed twice with an aqueous NaHCO$_3$ solution before passing the organic layer over a SiO$_2$ plug. A total of about 7.23 g (about 99%) of 7a was recovered as a yellow solid. $^1$H NMR (400 MHz, CDCl$_3$): 2.17 (s, 3H), 3.05 (s, 1H), 7.2-7.3 (m, 2H), 7.43 (br s, 1H), 7.53 (d, J=8.0 Hz, 1H), 7.61 (s, 1H); $^{13}$C NMR (100 MHz, CDCl$_3$): 24.71, 77.59, 83.28, 120.56, 122.94, 123.37, 128.15, 129.16, 138.06, 168.60; HRMS (DART) Calculated for C$_{10}$H$_9$NO [M•+]: 160.07569; found 160.07540.

N,N'-(Buta-1,3-diyne-1,4-diyl-bis(1,3-phenylene))diacetamide (4a): N-(3-Ethynylphenyl)acetamide (7a, about 7.07 g, about 44.4 mmol, about 1.0 eq), copper (I) iodide (about 845 mg, about 4.44 mmol, about 0.1 eq) and TMEDA (about 2.58 g, about 22.2 mmol, about 0.5 eq) was dissolved in CH$_2$Cl$_2$ (about 135 ml, about 0.33 M). Air was bubbled through the mixture, which was stirred at about 25° C. overnight. The insoluble product was filtered and washed with water before recrystallization from acetone. A total of about 4.91 g (about 70%) of 4a was isolated as clear crystals which rapidly turn blue. $^1$H NMR (500 MHz, DMSO): 2.06 (s, 3H), 7.27 (d, J=7.8 Hz, 1H), 7.36 (t, J=8.0 Hz, 1H), 7.56 (d, J=8.0 Hz, 1H), 7.87 (s, 1H), 10.1 (br s, 1H); $^{13}$C NMR (125 MHz, DMSO): 24.05, 73.14, 81.80, 120.58, 122.10, 127.04, 129.49, 139.67, 168.71; HRMS (DART) Calculated for C$_{20}$H$_{16}$N$_2$O$_2$ [M•+]: 317.12845; found 317.12841.

N-(3-Ethynylphenyl)isobutyramide (7b): 3-Ethynylaniline (about 5.00 g, about 42.7 mmol, about 1.0 eq), isobutyric acid (about 3.75 g, about 42.7 mmol, about 1.0 eq), N,N'-dicyclohexylcarbodiimide (about 8.79 g, about 42.7 mmol, about 1.0 eq) and DMAP (about 677 mg, about 5.55 mmol, about 0.13 eq) were dissolved in CH$_2$Cl$_2$ (about 200 ml, about 0.22M) and stirred at about 25° C. overnight. The resulting mixture was filtered and the filtrate concentrated in vacuo before purification by column chromatography with SiO$_2$ eluting with CH$_2$Cl$_2$. About 6.67 g (about 84%) of 7b was recovered. $^1$H NMR (500 MHz, CDCl$_3$): 1.26 (d, J=6.9 Hz, 6H), 2.50 (sept, J=6.9 Hz, 1H), 3.06 (s, 1H), 7.10 (br, 1H), 7.2-7.3 (m, 2H), 7.57 (d, J=7.9 Hz, 1H), 7.64 (s, 1H); $^{13}$C NMR (125 MHz, CDCl$_3$): 19.72, 36.90, 77.55, 83.27, 120.42, 122.97, 123.26, 128.01, 129.18, 138.16, 175.35; HRMS (DART) Calculated for C$_{12}$H$_{13}$NO [M•+]: 187.09917; found 187.09986.

N,N'-(Buta-1,3-diyne-1,4-diyl-bis(1,3-phenylene))bis(2-methylpropanamide) (4b): N-(3-Ethynylphenyl)isobutyramide (7b, about 659 mg, about 3.52 mmol, about 1.0 eq) was dissolved in CH$_2$Cl$_2$ (about 10 ml, about 0.33 M) before copper (I) iodide (about 67 mg, about 0.35 mmol, about 0.1 eq) and TMEDA (about 41 mg, about 0.35 mmol, about 0.1 eq) were added to the flask. Air was bubbled through the mixture and allowed to stir at about 25° C. overnight. The insoluble dimerization product was filtered and washed with water before recrystallization by hot filtration from THF. A total of about 549 mg (about 84%) of 4b was recovered as clear crystals which rapidly turn blue in ambient light. $^1$H NMR (500 MHz, DMSO): 1.10 (d, J=6.9 Hz, 6H), 2.59 (sept, J=6.9 Hz, 1H), 7.27 (dt, J=8.0, 1.0 Hz, 1H), 7.36 (t, J=8.0 Hz, 1H), 7.64 (ddd, J=8.0, 2.0, 1.0 Hz, 1H), 7.89 (t, J=2.0 Hz, 1H), 10.0 (br s, 1H); $^{13}$C NMR (125 MHz, DMSO): 19.48, 35.07, 73.18, 81.83, 120.61, 120.85, 122.34, 127.08, 129.53, 139.83, 175.72; HRMS (DART) Calculated for C$_{24}$H$_{24}$N$_2$O$_2$ [M•+]: 372.1833; found 372.17976.

N-(3-Ethynylphenyl)heptanamide (7c): 3-Ethynylaniline (about 3.5 g, about 30 mmol, about 1 eq) was added to a round bottom flask with a magnetic stirring bar and reflux condenser, pyridine (about 150 ml, about 0.2 M) was added followed by heptanoic anhydride (about 10.9 g, about 45 mmol, about 1.5 eq), and finally dimethylaminopyridine (DMAP) (about 367 mg, about 3 mmol, about 0.1 eq). The resulting mixture was heated to about 100° C. After stirring overnight, the reaction was complete as indicated by TLC (SiO$_2$, CH$_2$Cl$_2$/hexanes about 1:1). The mixture was concentrated in vacuo, partitioned between Et$_2$O/H$_2$O, aqueous extracted twice with Et$_2$O, washed twice with about 0.5 M HCl, then brine, dried over MgSO$_4$, filtered and concentrated in vacuo to give a crude residue. The residue was purified by column chromatography on SiO$_2$ utilizing a gradient up to about 20% of EtOAc in hexanes. About 6.6 g (about 95%) of 7c was recovered as an oil. $^1$H NMR (500 MHz, CDCl$_3$): 0.88 (t, J=7.0 Hz, 3H), 1.2-1.4 (m, 6H), 1.7 (quint, J=7.3 Hz, 2H), 2.34 (t, J=7.3 Hz, 2H), 3.05 (s, 1H), 7.2-7.3 (m, 2H), 7.37 (br s, 1H), 7.55 (d, J=7.6 Hz, 1H), 7.63 (s, 1H); $^{13}$C NMR (125 MHz, CDCl$_3$): 14.15, 22.62, 25.66, 29.04, 31.67, 37.90, 77.52, 83.30, 120.52, 122.92, 123.34, 127.99, 129.12, 138.13, 171.76. HRMS (DART) Calculated for C$_{15}$H$_{19}$NO [M•+]: 229.14666; found 229.14354.

N,N'-(Buta-1,3-diyne-1,4-diylbis(3,1-phenylene))diheptanamide (4c): N-(3-Ethynylphenyl)heptanamide (7c, about 6.6 g, about 29 mmol, about 1 eq) was added to a round bottom flask with a magnetic stirring bar and dissolved in CH$_2$Cl$_2$ (about 100 ml, about 0.33 M). To this mixture was added copper(I) iodide (about 550 mg, about 2.8 mmol, about 0.1 eq), followed by TMEDA (about 325 mg, about 2.8 mmol, about 0.1 eq). Air was bubbled through the mixture and allowed to react at about 25° C. overnight. The insoluble product 4c formed overnight was filtered over a fritted funnel. The filtrate was added back to the reaction flask and allowed to continue to react. The combined solids were washed with CH$_2$Cl$_2$ and dried. The product was recrystallized from boiling isopropanol via hot filtration, and the receiving flask was protected from ambient light during cooling. About 5.8 g (about 88%) of 4c was recovered as clear crystals which rapidly turn blue upon standing in ambient light. $^1$H NMR (500 MHz, DMSO): 0.86 (t, J=7.2 Hz, 3H), 1.29 (m, 6H), 1.58 (quint, J=7.3 Hz, 2H), 2.31 (t, J=7.3 Hz, 2H), 7.26 (d, J=7.8 Hz, 1H), 7.36 (t, J=8.0 Hz, 1H), 7.61

(d, J=8.0 Hz, 1H), 7.89 (s, 1H), 10.04 (s, 1H); $^{13}$C NMR 9125 MHz, DMSO): 13.94, 21.99, 24.97, 28.31, 31.04, 36.43, 73.12, 81.77, 120.56, 120.64, 122.14, 126.97, 129.46, 139.69, 171.66. HRMS (DART) Calculated for $C_{30}H_{36}N_2O_2$ [M•+]: 456.27768; found 456.27679.

General procedure for topochemical polymerizations: The crystals to be irradiated were placed into a suitable Erlenmeyer flask and suspended in hexanes with a stir bar. The flask was capped and placed inside a photoreactor equipped with a water-jacketed quartz immersion well with a high-powered Hanovia lamp inside. The flask was placed on a stirplate with stirring to ensure the crystals would mix in the liquid to expose all faces to UV light. The lamp was turned on and the crystals were allowed to react overnight. In the morning, the crystals typically took on a deep purple or black color. The crystals were filtered to remove hexanes and then dissolved in a solvent that readily dissolved the monomer. This solution was boiled to ensure substantially complete dissolution of the monomer from the crystals, resulting in a suspension of the PDA polymer. The hot mixture was filtered over a Buchner funnel with a filter paper and the polydiacetylene "paper" produced was further washed with fresh solvent. The PDA paper could be readily peeled away from the filter paper and further dried under vacuum to give pure polymer. Due to the insolubility of the polymers, their purity was routinely checked by CP/MAS $^{13}$C NMR, as the internal alkyne carbon (about 100 ppm) can be distinguished from the monomeric butadiyne (about 70-80 ppm). Utilizing the above procedure, specifically, boiling of the solvent while dissolving the reacted crystals, observation of any monomer impurities was rarely made in the recovered polymer samples. The recovered monomer solution was concentrated and recrystallized to produce more monomer crystals for further polymerization. As an example, about 11.6 g of diyne 3 was subjected to UV irradiation overnight, dissolved and filtered to produce about 807 mg (about 7%) of PDA 1. The dissolved monomer solution was concentrated and recrystallized to produce about 10.6 g of crystalline diyne 3. Repetition of this process 3 more times produced a total of about 2.8 g (about 24% overall yield) of PDA 1 from about 11.6 g of diyne 3.

Figure 25:
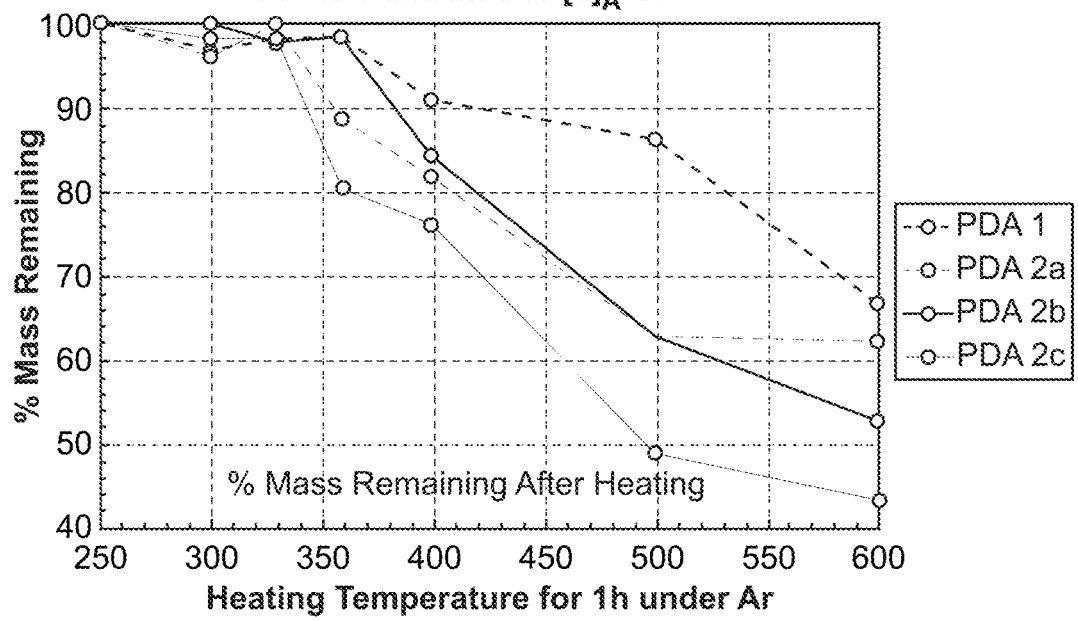
FIG. 25. Table 2—Mass and percent mass recovery for thermal conversions of PDAs 1 and 2a-c to $[8]_4$GNR.
Figure 26:
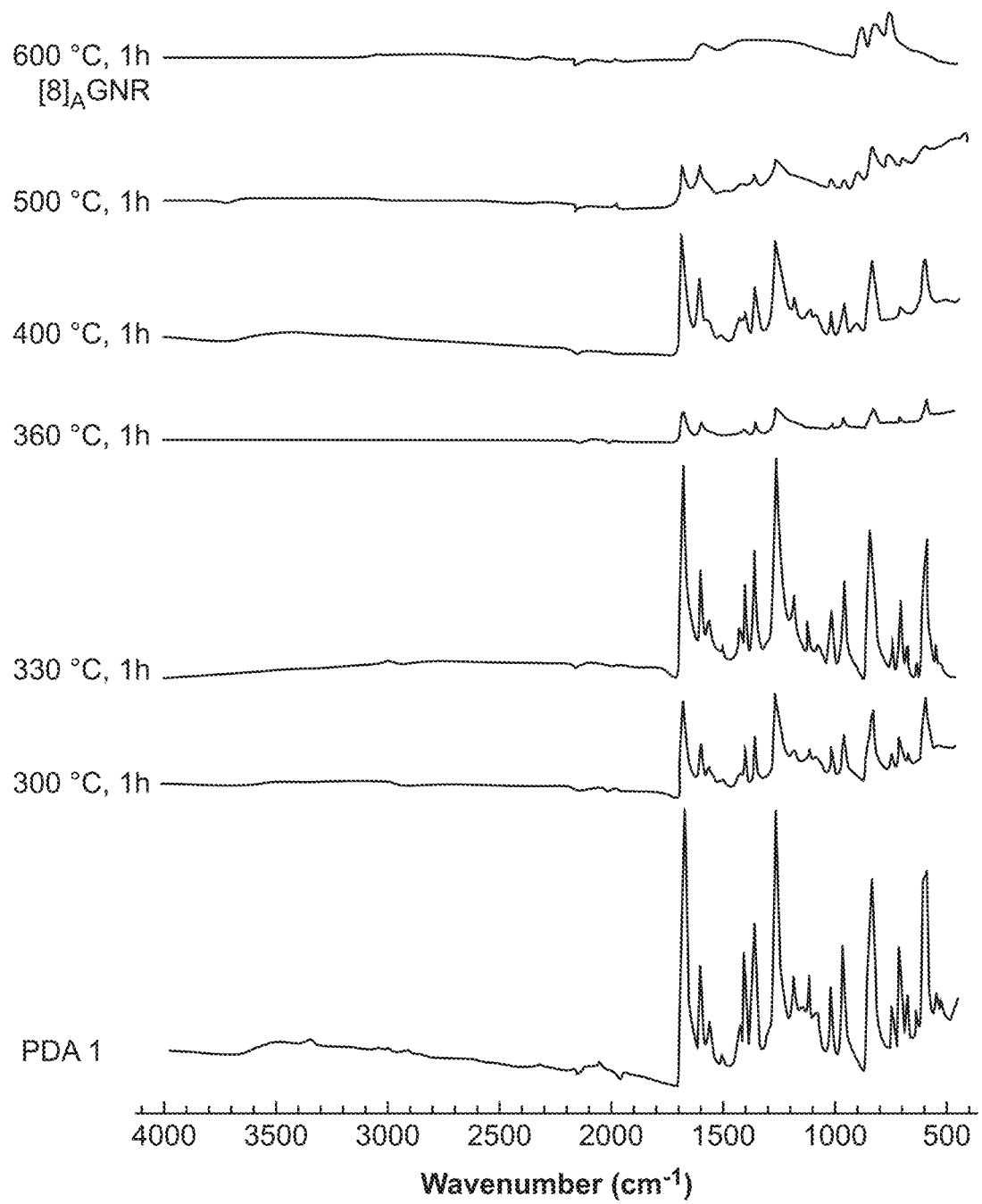
FIG. 26. Full width IR spectrum detailing the conversion of PDA 1 to $[8]_4$GNR, without baseline correction.
Figure 27:
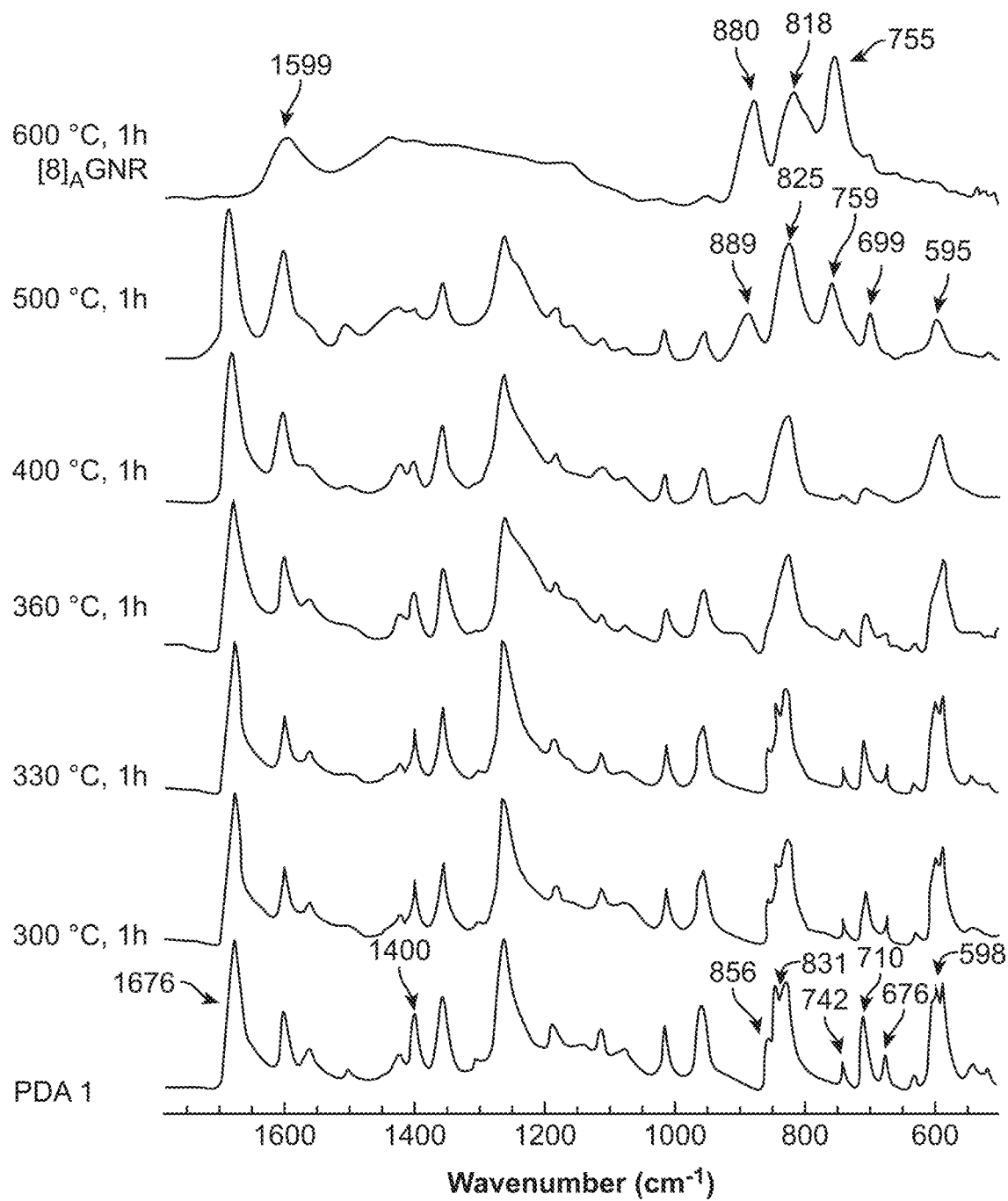
FIG. 27. Fingerprint region expansion of IR spectrum detailing the conversion of PDA 1 to $[8]_4$GNR, with baseline correction.
Figure 28:
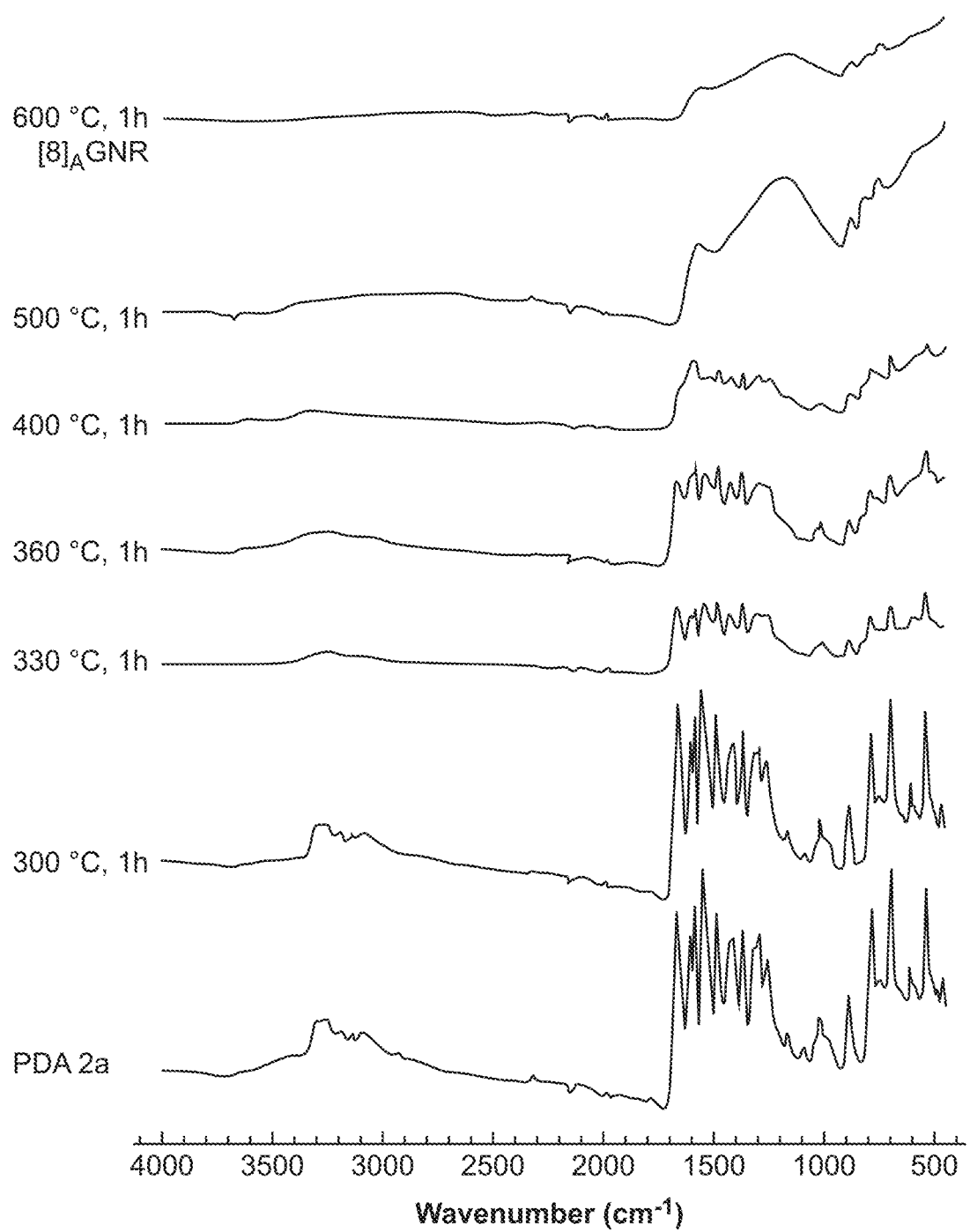
FIG. 28. Full width IR spectrum detailing the conversion of PDA 2a to $[8]_4$GNR, without baseline correction.
Figure 29:
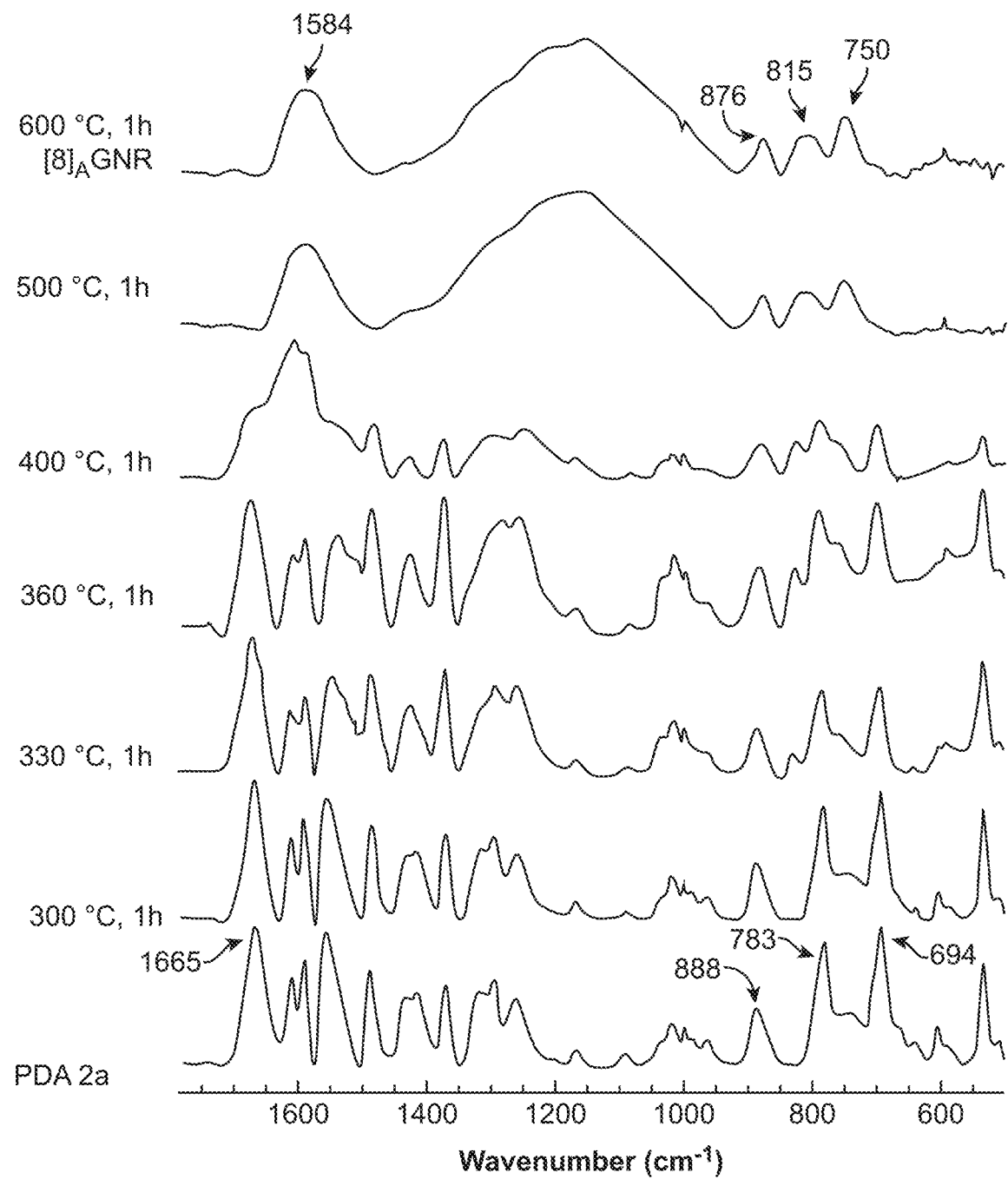
FIG. 29. Fingerprint region expansion of IR spectrum detailing the conversion of PDA 2a to $[8]_4$GNR, with baseline correction.
Figure 30:
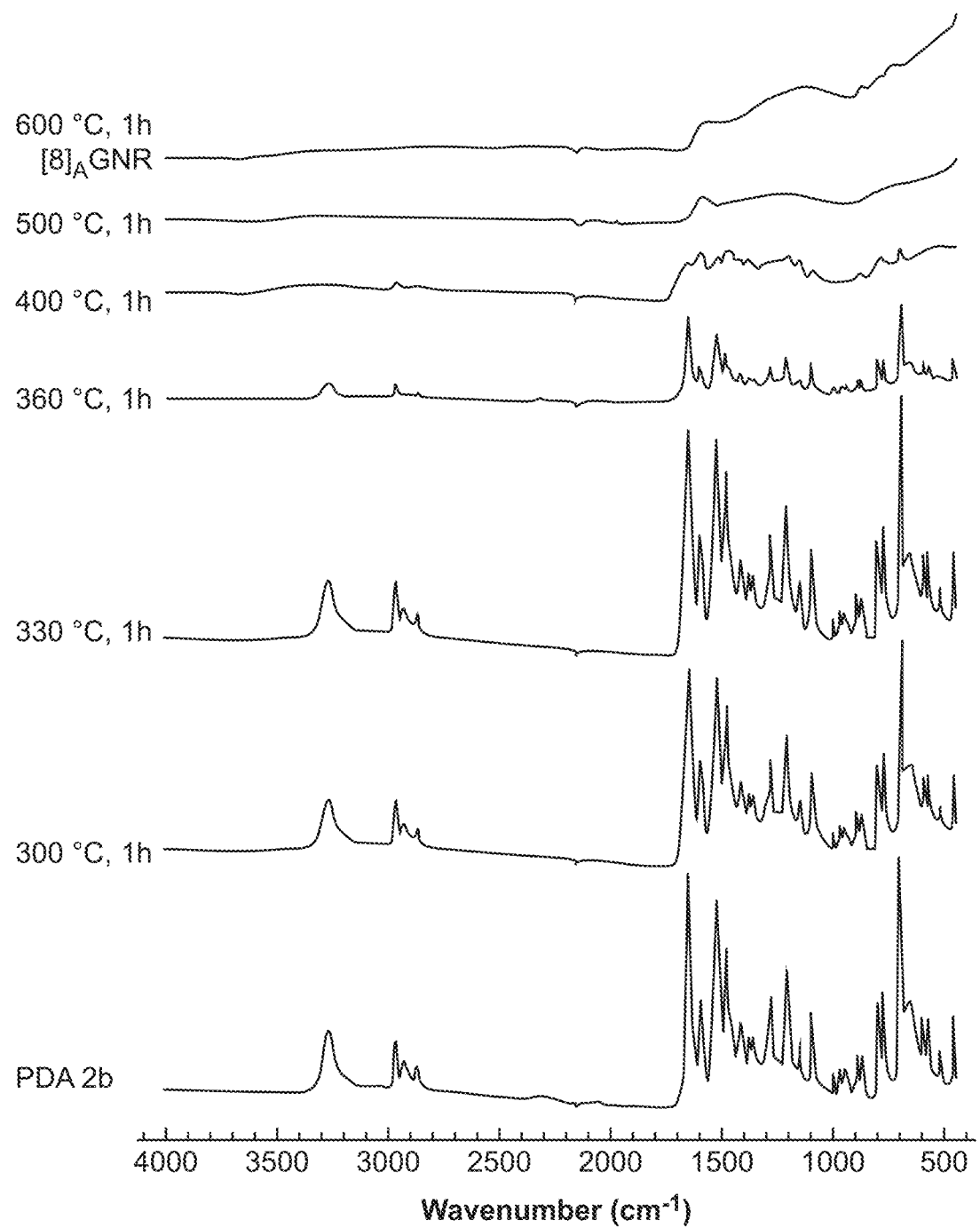
FIG. 30. Full width IR spectrum detailing the conversion of PDA 2b to $[8]_4$GNR, without baseline correction.
Figure 31:
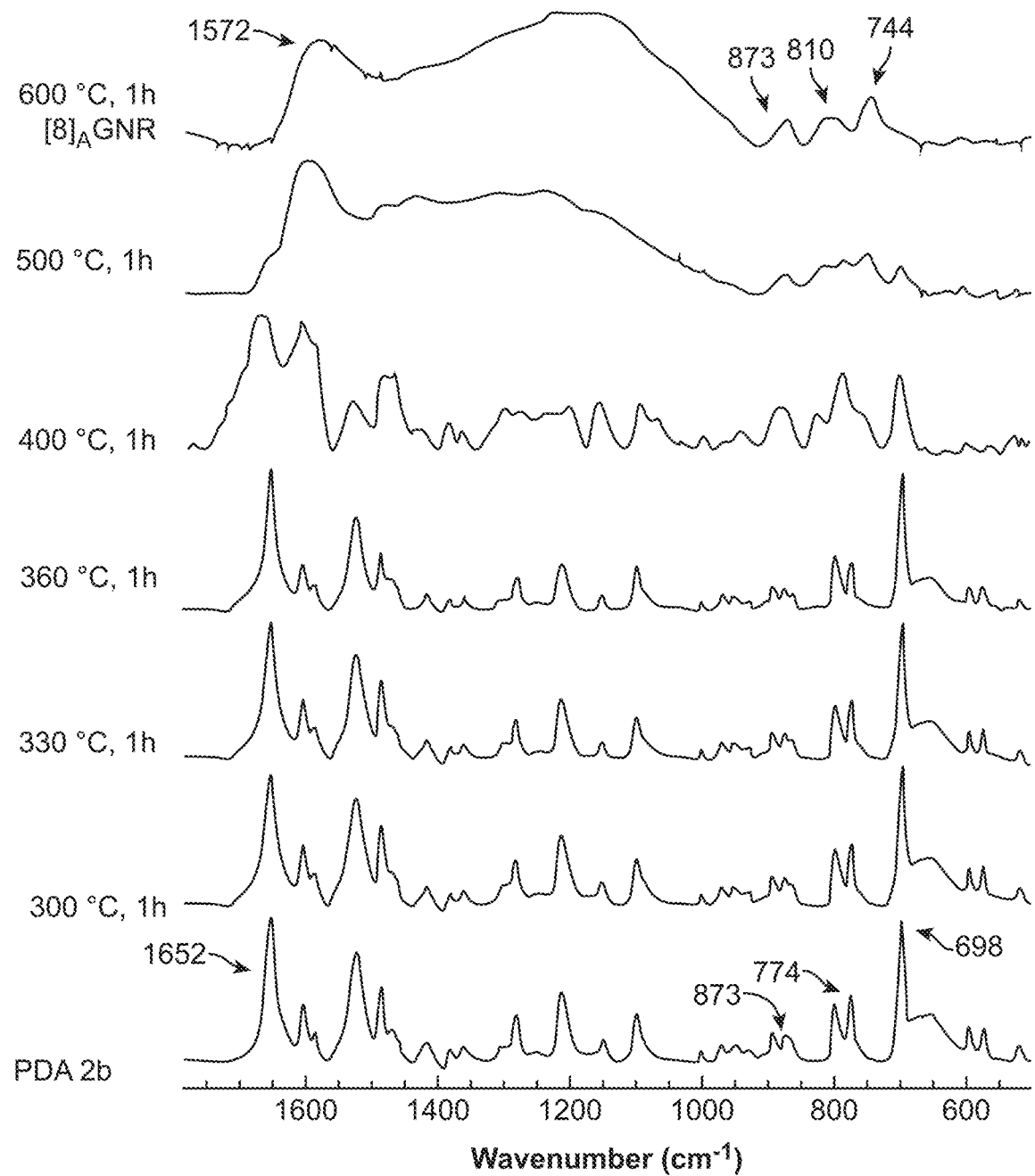
FIG. 31. Fingerprint region expansion of IR spectrum detailing the conversion of PDA 2b to $[8]_4$GNR, with baseline correction.
Figure 32:
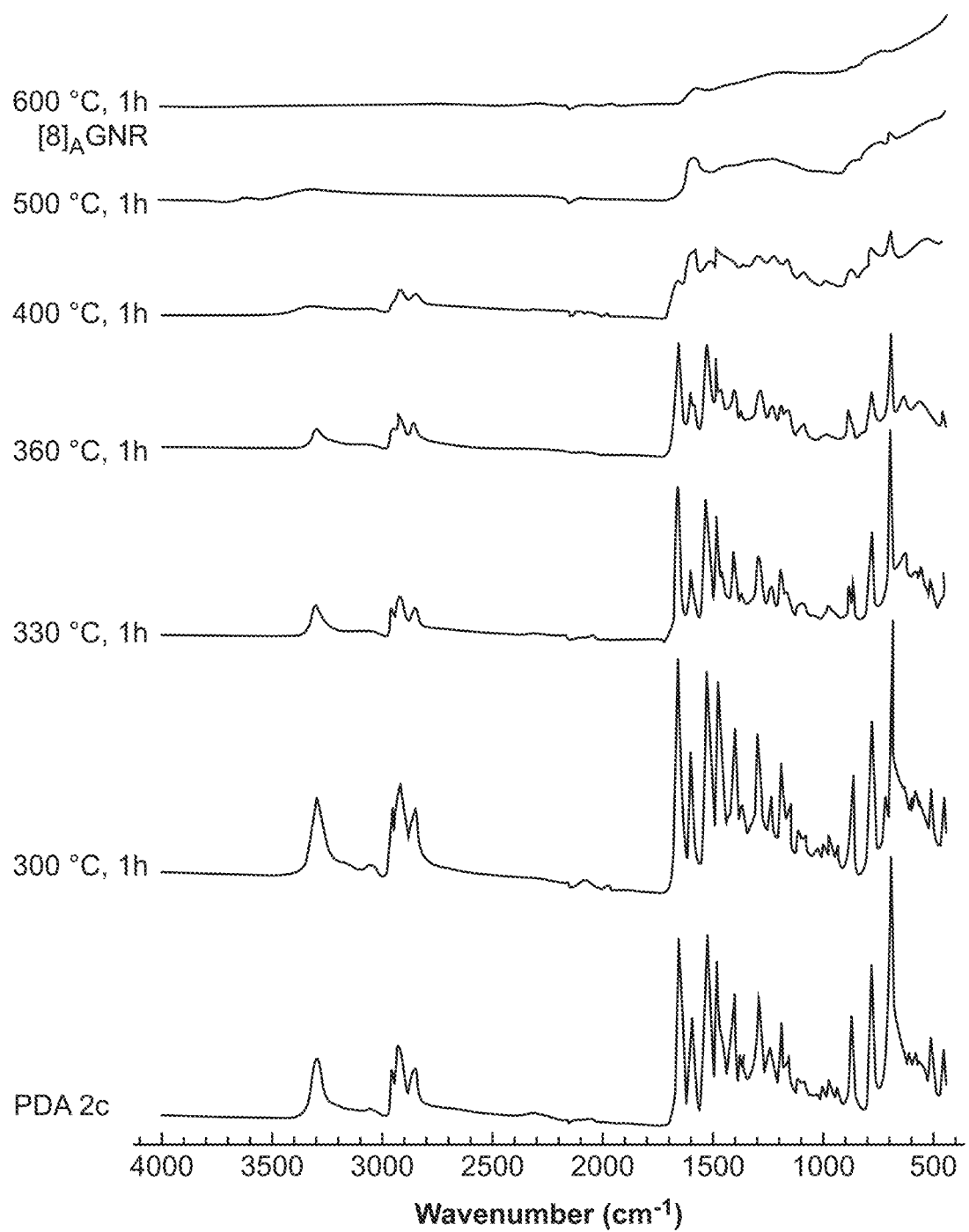
FIG. 32. Full width IR spectrum detailing the conversion of PDA 2c to $[8]_4$GNR, without baseline correction.
Figure 33:
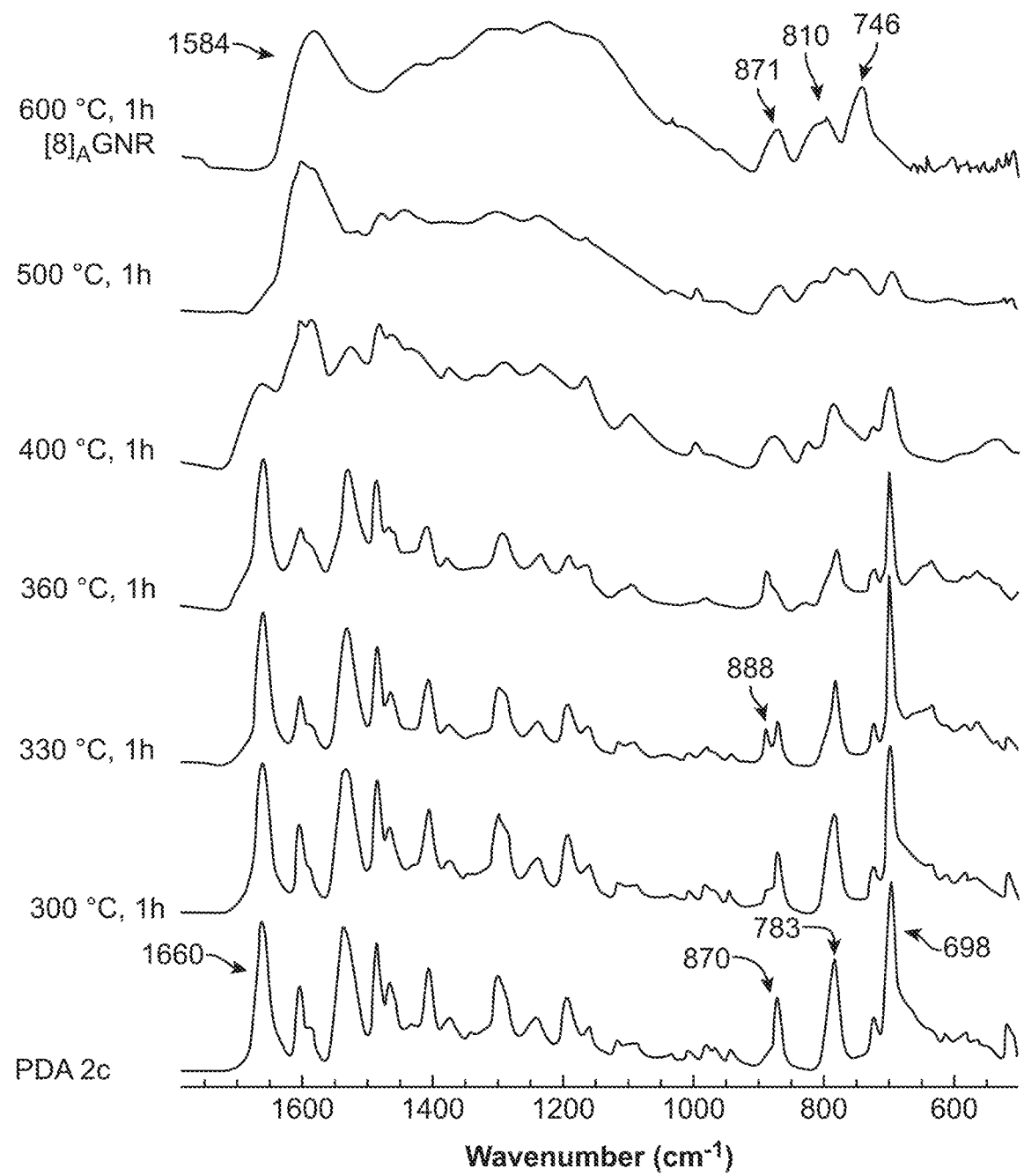
FIG. 33. Fingerprint region expansion of IR spectrum detailing the conversion of PDA 2c to $[8]_4$GNR, with baseline correction.
Figure 34:
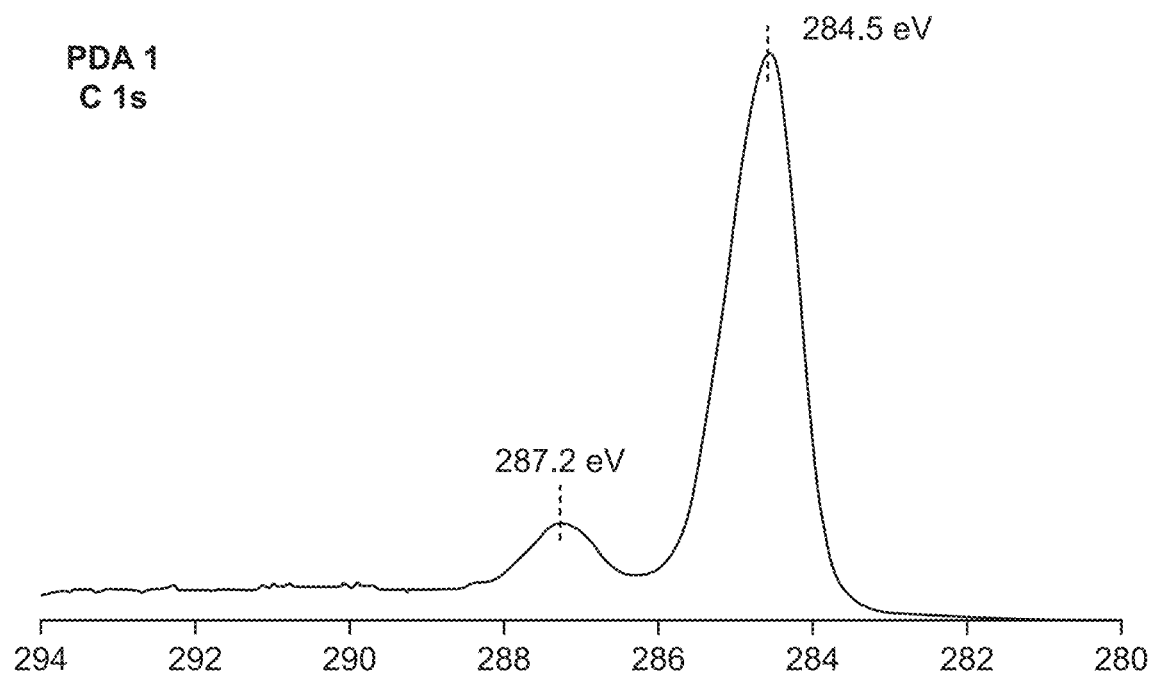
FIG. 34. XPS spectra showing the conversion of PDA 1 to $[8]_4$GNR.
Figure 34:
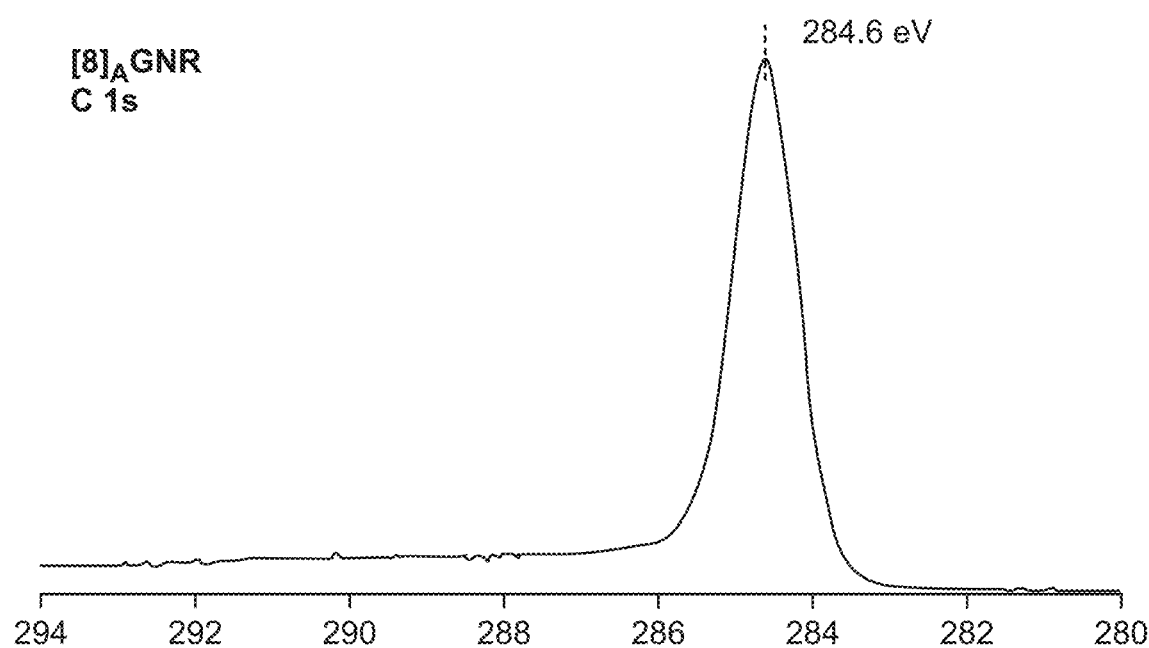
Figure 35:
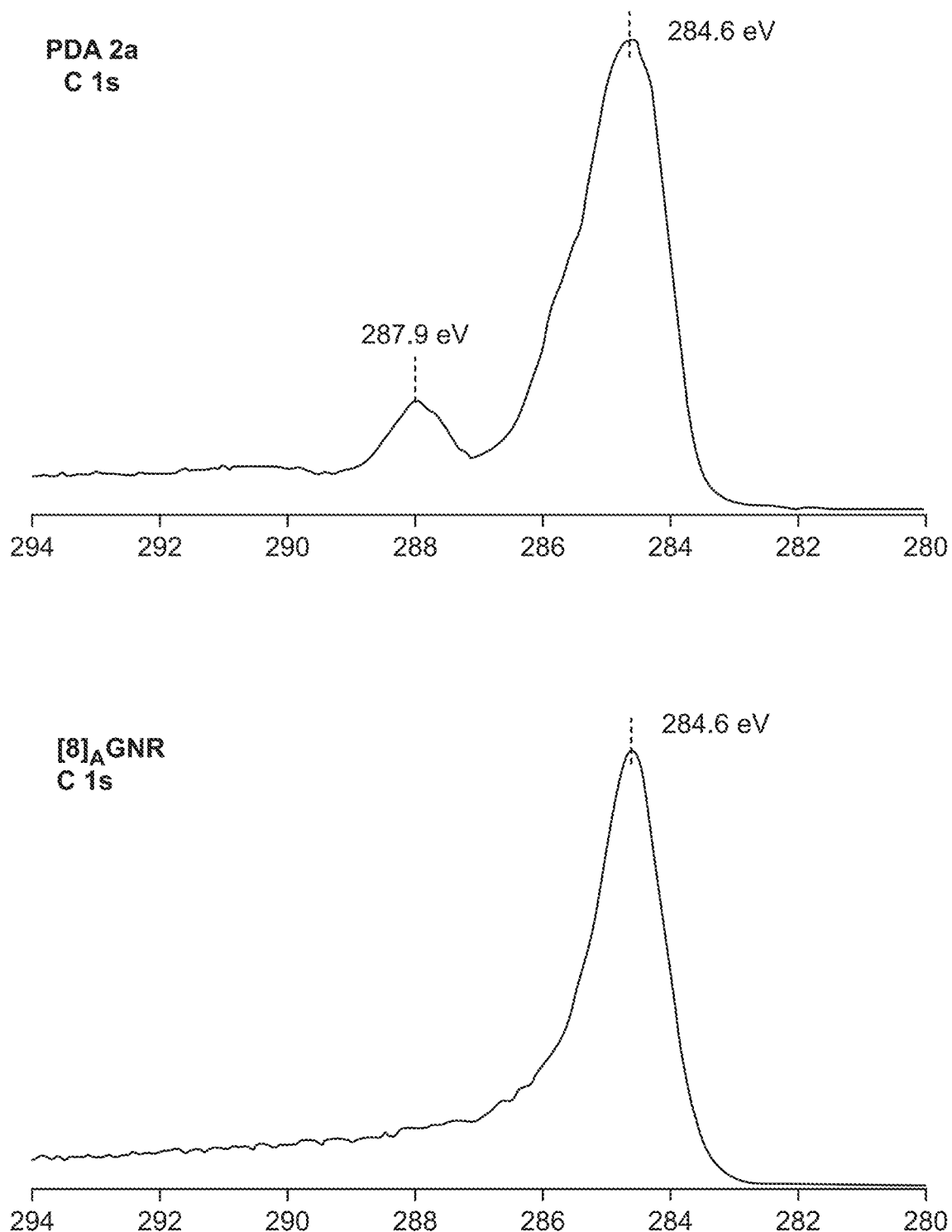
FIG. 35. XPS spectra showing the conversion of PDA 2a to $[8]_4$GNR.
Figure 36:
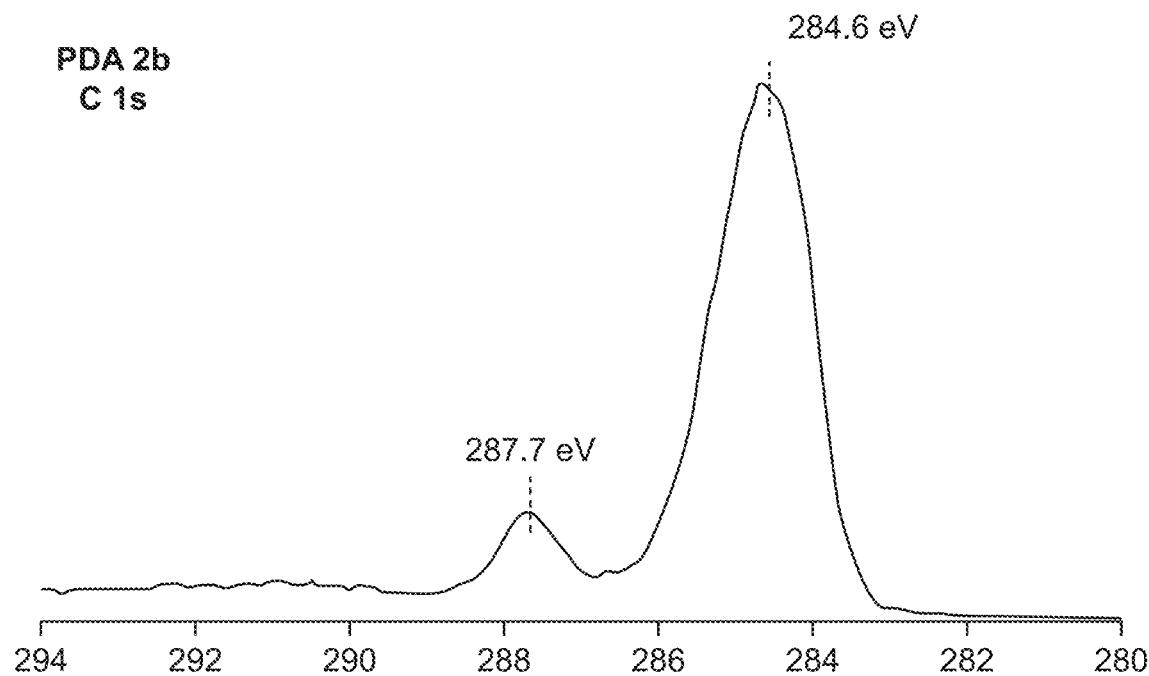
FIG. 36. XPS spectra showing the conversion of PDA 2b to [8]$_4$GNR.
Figure 36:
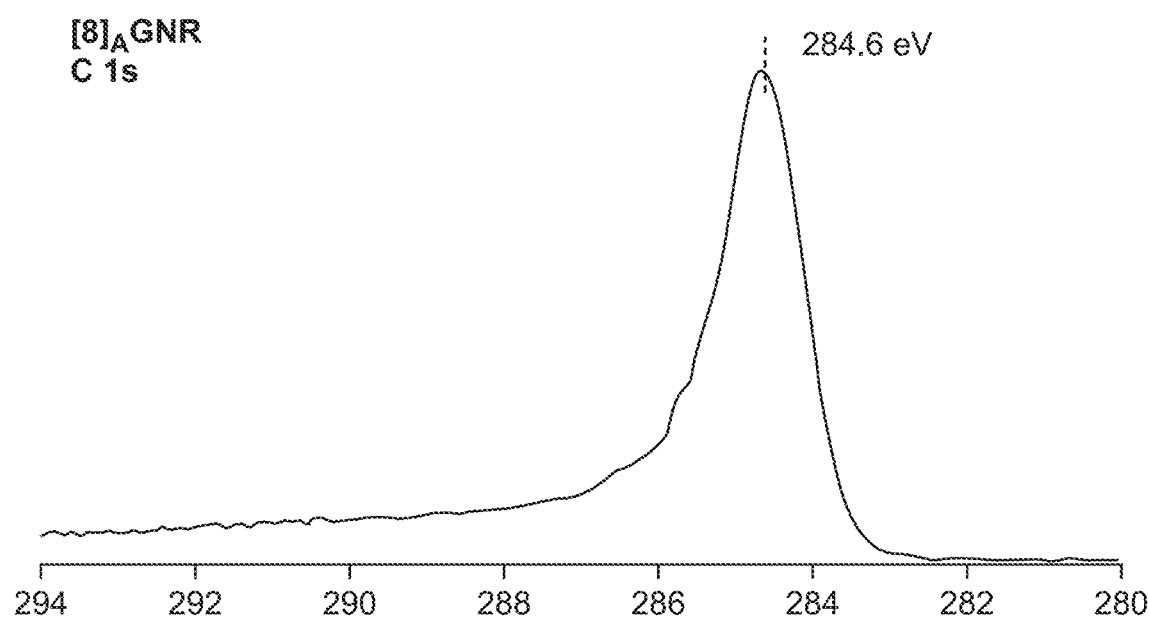
Figure 37:
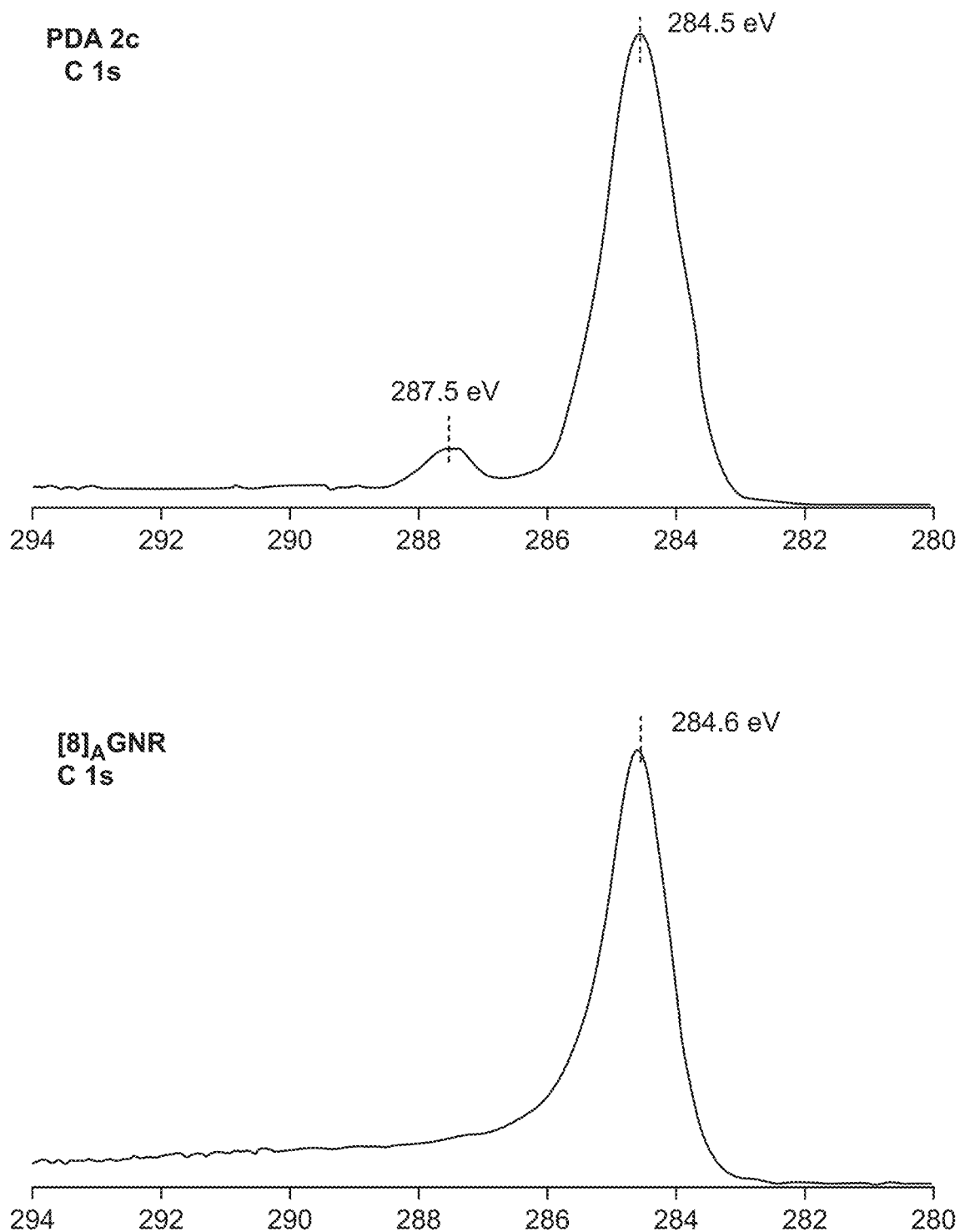
FIG. 37. XPS spectra showing the conversion of PDA 2c to [8]$_4$GNR.
Figure 38:
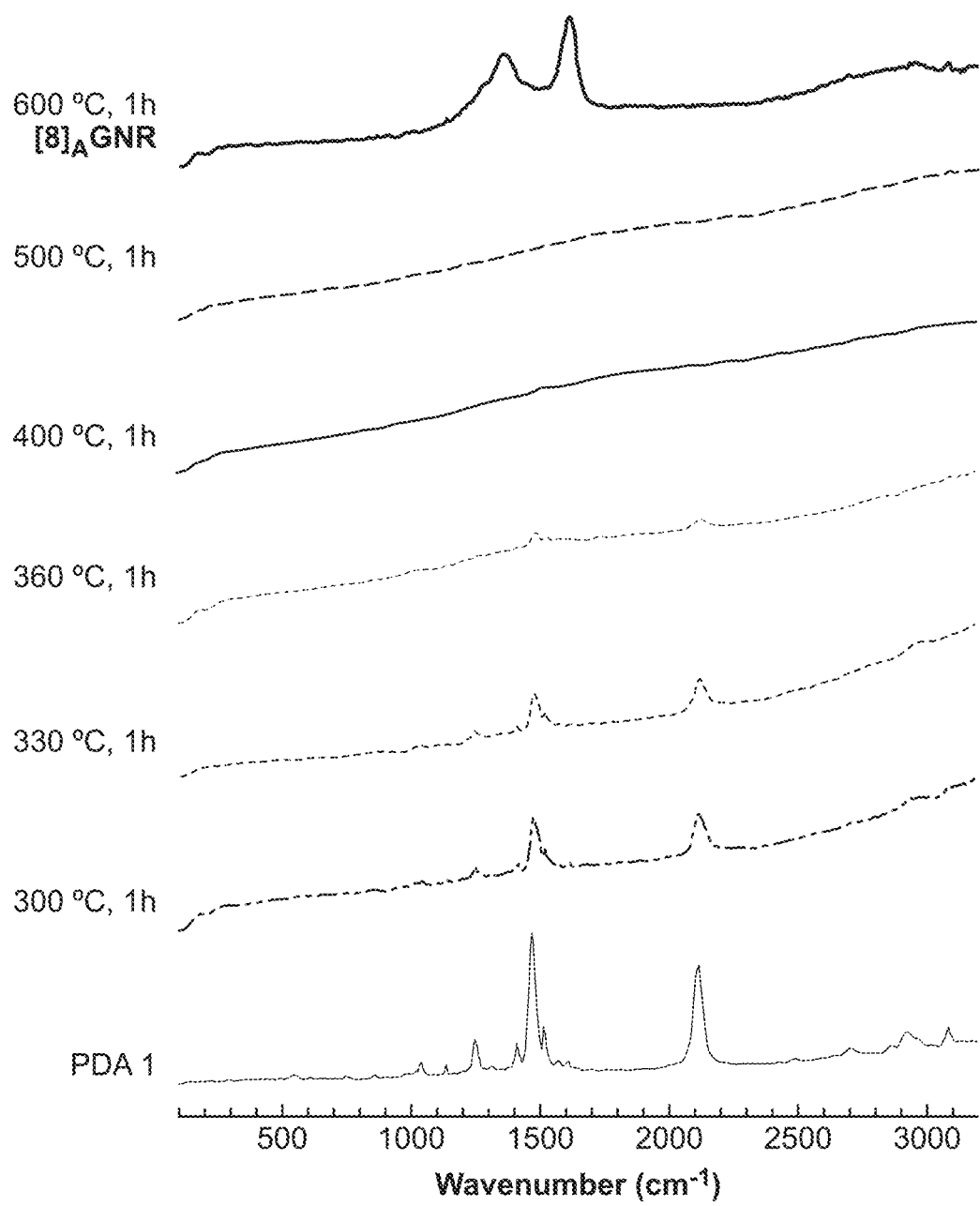
FIG. 38. Raman spectra (about 514 nm excitation wavelength) showing the conversion of PDA 1 to [8]$_4$GNR.
Figure 39:
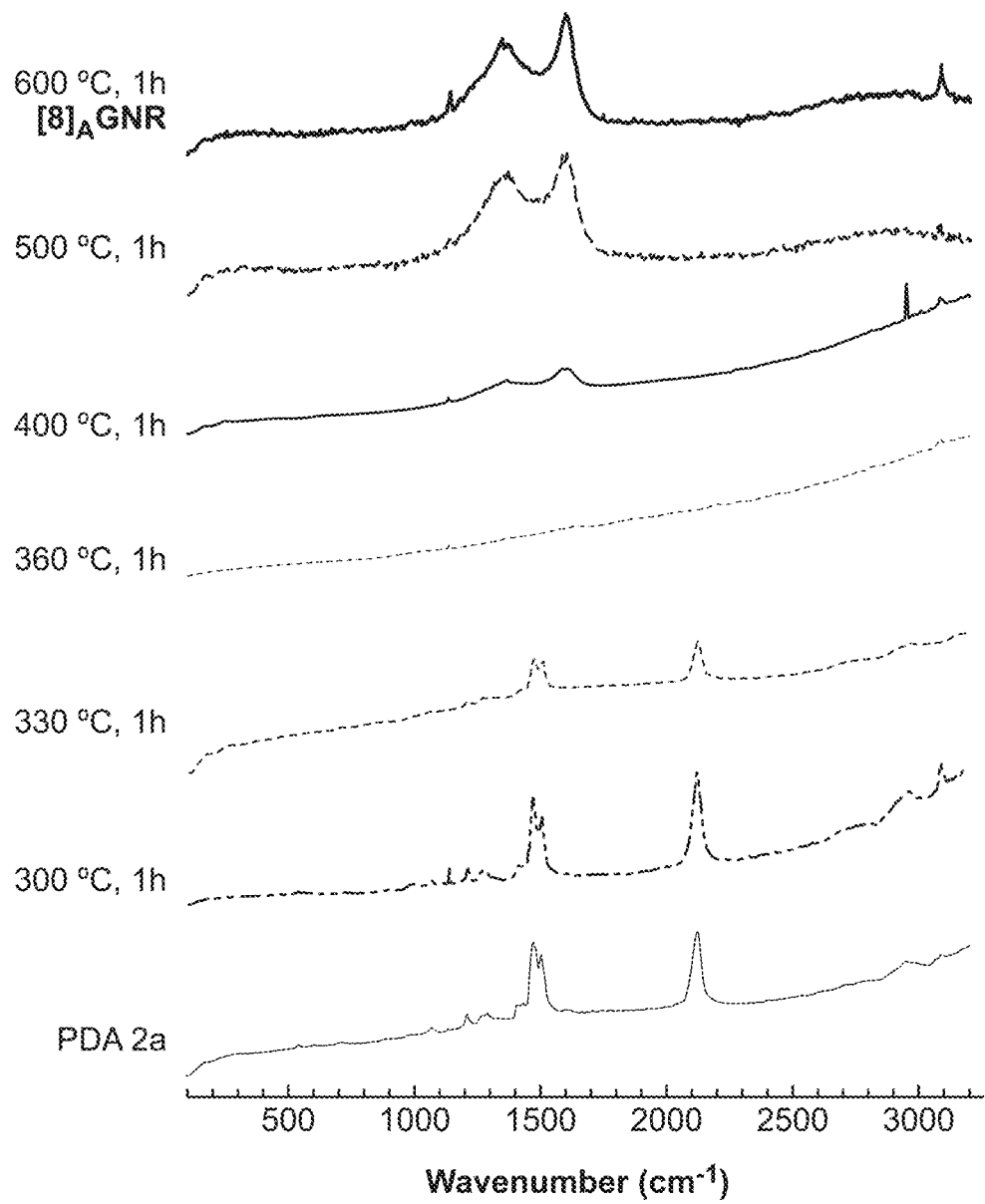
FIG. 39. Raman spectra (about 514 nm excitation wavelength) showing the conversion of PDA 2a to [8]$_4$GNR.
Figure 40:
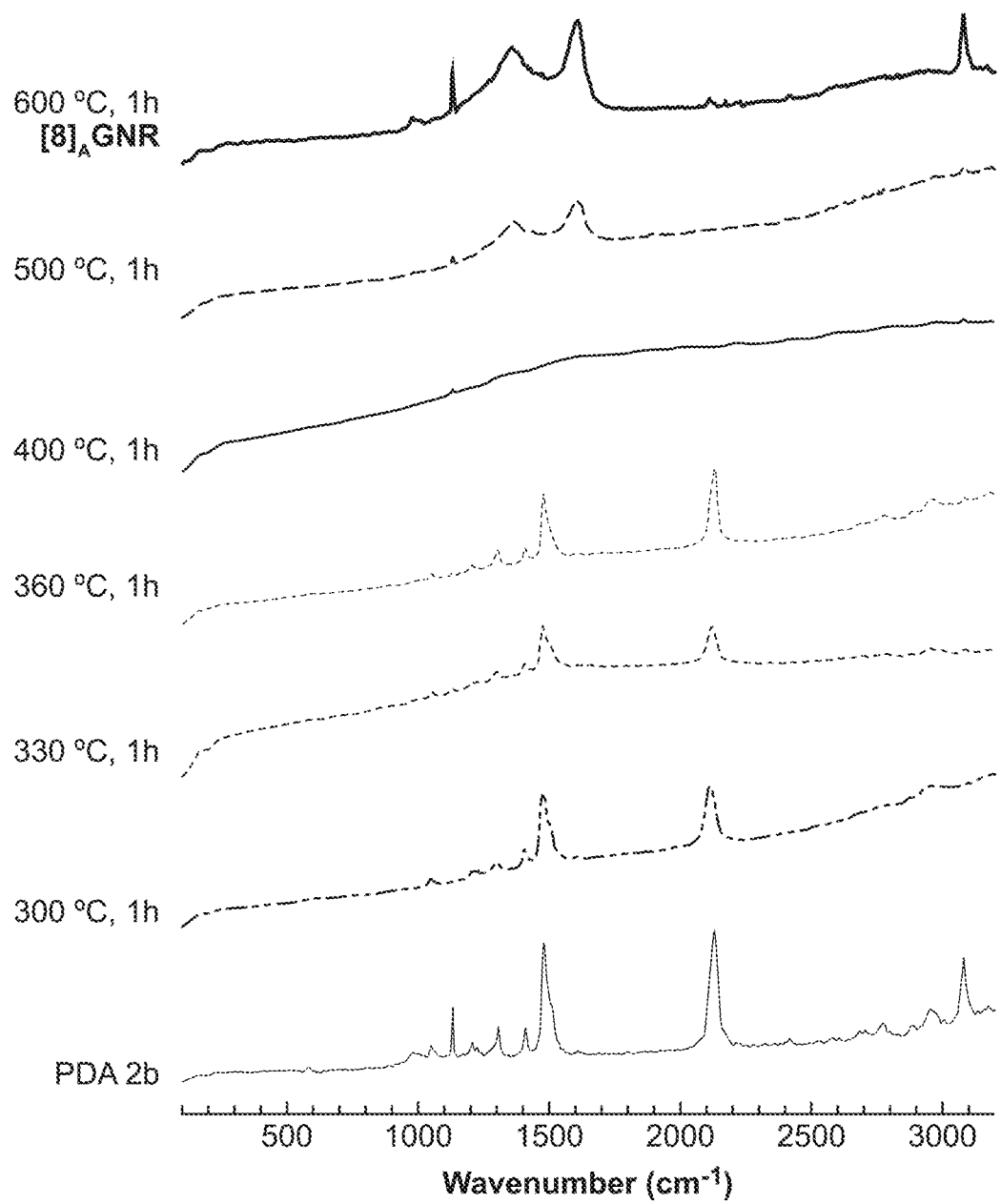
FIG. 40. Raman spectra (about 514 nm excitation wavelength) showing the conversion of PDA 2b to [8]$_4$GNR.
Figure 41:
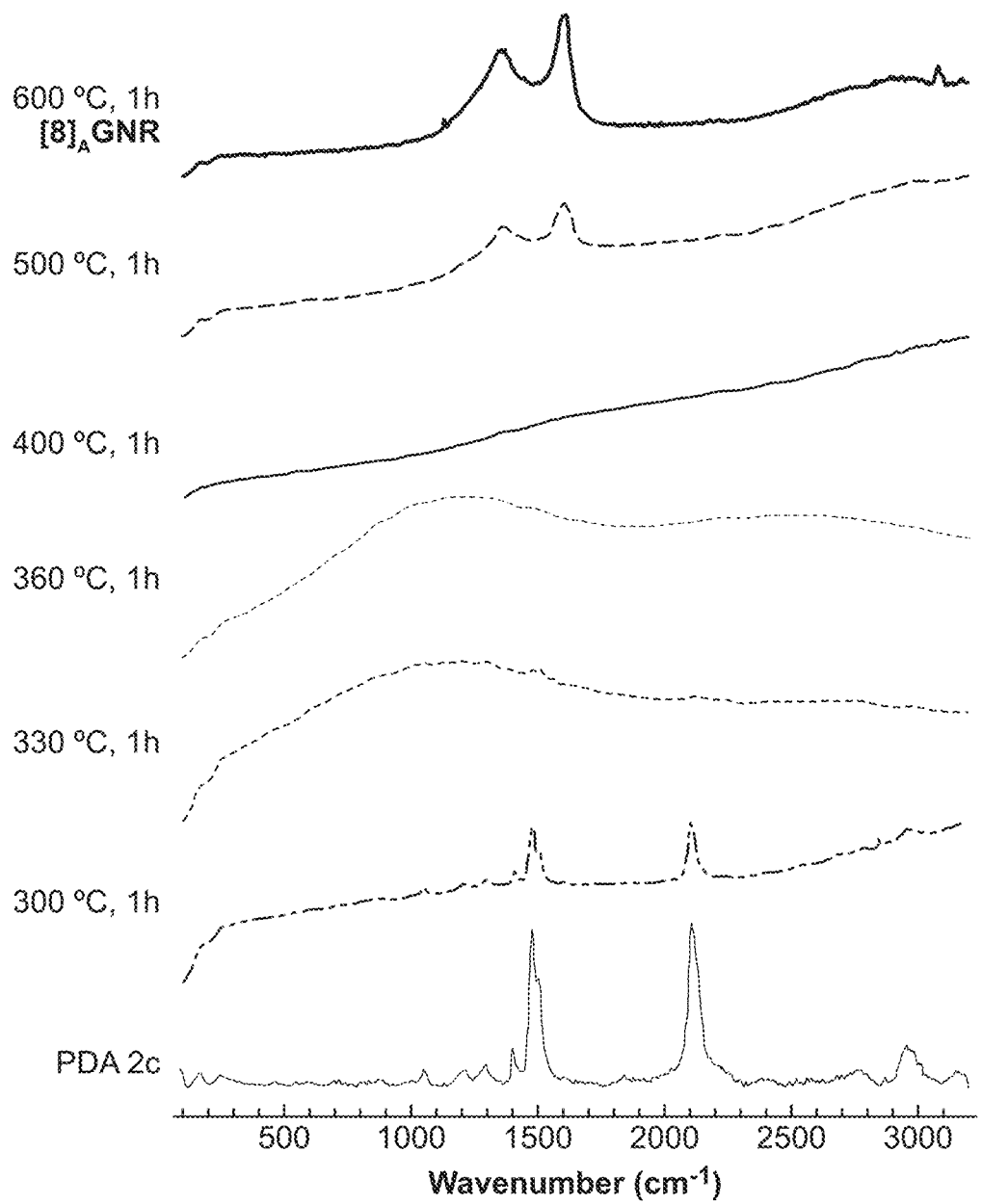
FIG. 41. Raman spectra (about 514 nm excitation wavelength) showing the conversion of PDA 2c to [8]$_4$GNR.

Diyne 3:
Polymerization yield: about 960 mg of PDA 1 was recovered from about 14.0 g of crystals (about 7%)
Solvent: Boiling $CHCl_3$ is a solvent used for dissolution of the monomer
Recrystallization: Boiling ethanol and hot filtration
Diyne 4a:
Polymerization yield: about 185 mg of PDA 2a was recovered from about 1.70 g of crystals (about 11%)
Solvent: Boiling THF is a solvent used for dissolution of the monomer followed by additional boiling of the crude PDA in DMF, filtering, and washing with diethyl ether
Recrystallization: Boiling acetone and hot filtration
Diyne 4b:
Polymerization yield: about 363 mg of PDA 2b was recovered from about 1.56 g of crystals (about 23%)
Solvent: Boiling about 1:1 solution of THF/acetone is used for dissolution of the monomer followed by additional boiling of the crude PDA 2b in DMF, filtering, and washing with diethyl ether
Recrystallization: Boiling THF and hot filtration
Diyne 4c:
Polymerization yield: about 540 mg of PDA 2c was recovered from about 3.6 g of crystals (about 15%)
Solvent: Boiling THF is a solvent used for dissolution of the monomer
Recrystallization: Boiling isopropanol and hot filtration General procedure for the graphitization experiments: For the conversion of the PDA polymers 1 and 2a-c to $[8]_4$GNR, a programmable tube furnace (MTI OTF-1200X-S-NT) was used. A quartz tube with internal diameter of about 2 inches was used, and the PDA to be heated was placed in an alumina boat inside the quartz tube in the middle of the hot zone. End caps were clamped onto the tube to provide a positive flow of Argon. The program used for the heating experiments is as follows: heat over about 40 min to the target temperature, hold at target temperature for about 1 hr, then cool to room temp over about 40 min. Due to the thermal mass of the tube, cooling of the system from higher temperatures (>about 400° C.) could take a longer time, but the system rapidly cooled from the higher temperatures (>about 400° C.} to below about 250° C. at the end of the about 40 min cooling period. After the system had cooled to about 25° C., the material was removed from the alumina boat and immediately weighed to quantify mass loss and yield, as reported in Table 2 in FIG. 25.

The yields for the graphitization process were determined by measuring the amount of material recovered after thermal aromatization of the respective PDAs (Table 2). The expected theoretical mass recovery after complete graphitization of the PDAs 1, and 2a-2c was 68%, 62%, 53%, and 43% respectively. After heating of PDAs 1, and 2a-2c to about 600° C. for about 1 hr under argon, the experimental mass recovery matched the theoretical mass recovery in all cases. This implies that the yield for the overall PDA to GNR conversion process is quantitative for all cases presented here.

Figures 48A, 48B, 49:
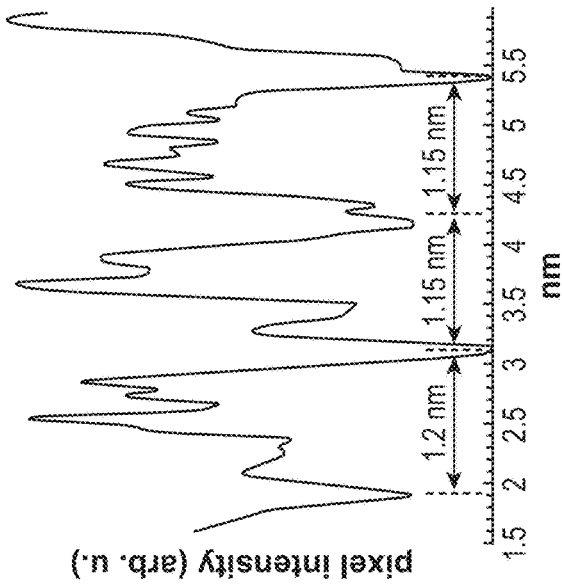
FIG. 49. Table 3—Number of scans collected for all spectra described in FIG. 22.
Figure 50:
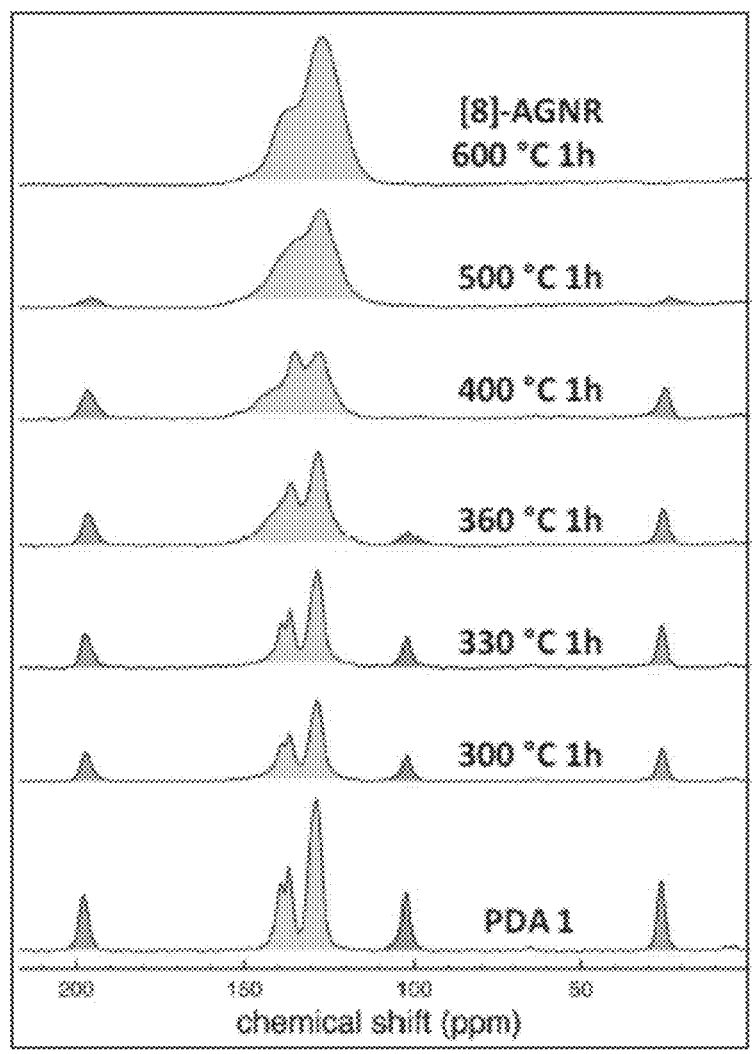
FIG. 50. Stacked CP/MAS $^{13}$C NMR spectra of the conversion of PDA 1 to [8]$_4$GNR with constant number of scans (2048) and no peak height normalization. No significant loss of signal was noted at these temperatures within this system.
Figure 51:
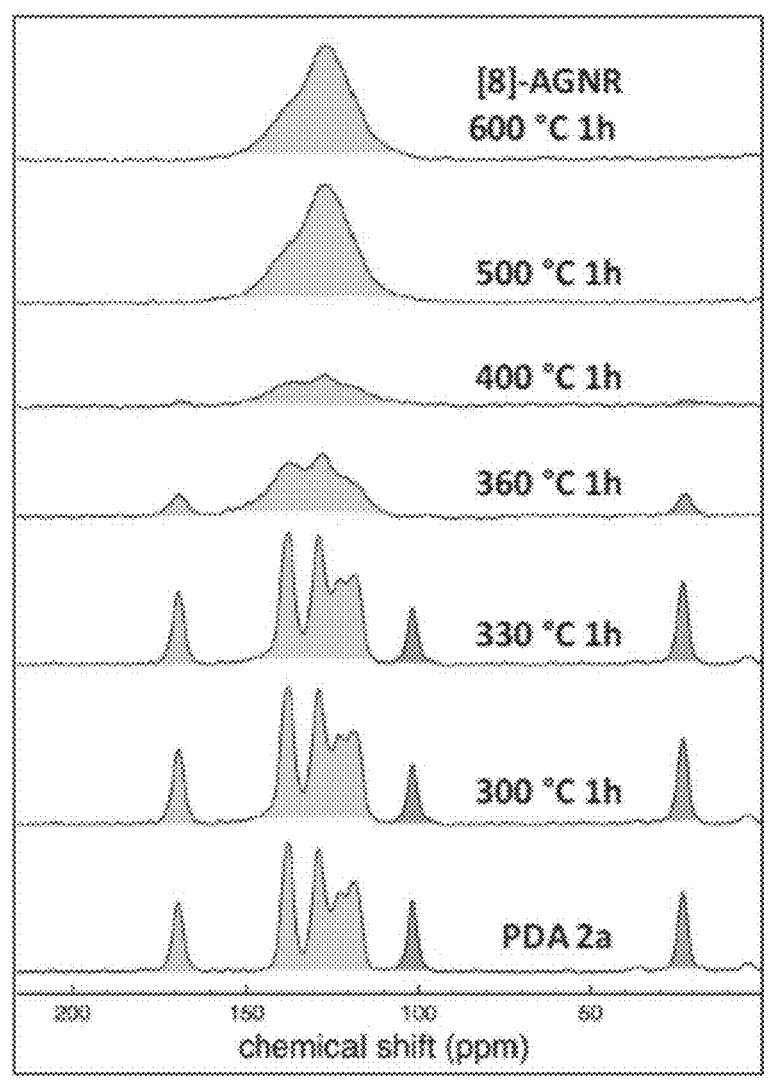
FIG. 51. Stacked CP/MAS $^{13}$C NMR spectra of the conversion of PDA 2a to [8]$_4$GNR with constant number of scans (2048) and no peak height normalization. Note the large reduction and recovery of signal for samples heated at about 360, about 400, and about 500° C.
Figure 52:
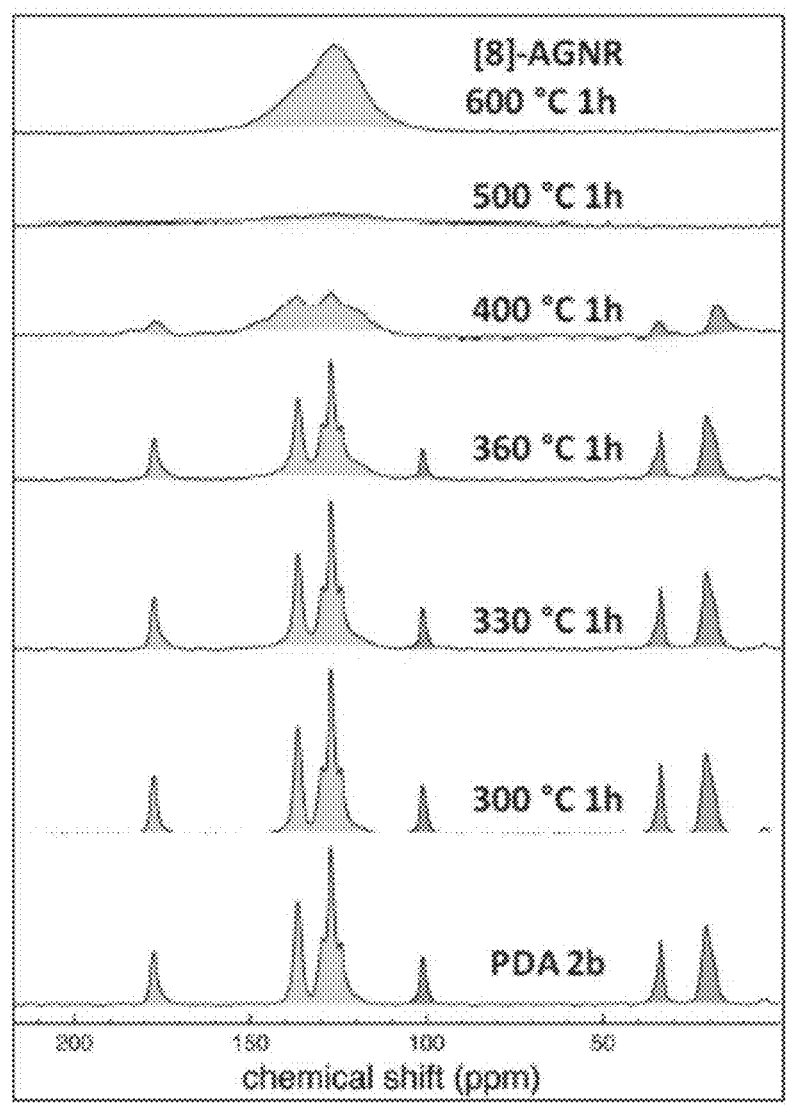
FIG. 52. Stacked CP/MAS $^{13}$C NMR spectra of the conversion of PDA 2b to [8]$_4$GNR with constant number of scans (2048) and no peak height normalization. Note the dramatic loss and recovery of signal for samples heated at about 400 and about 500° C.
Figure 53:
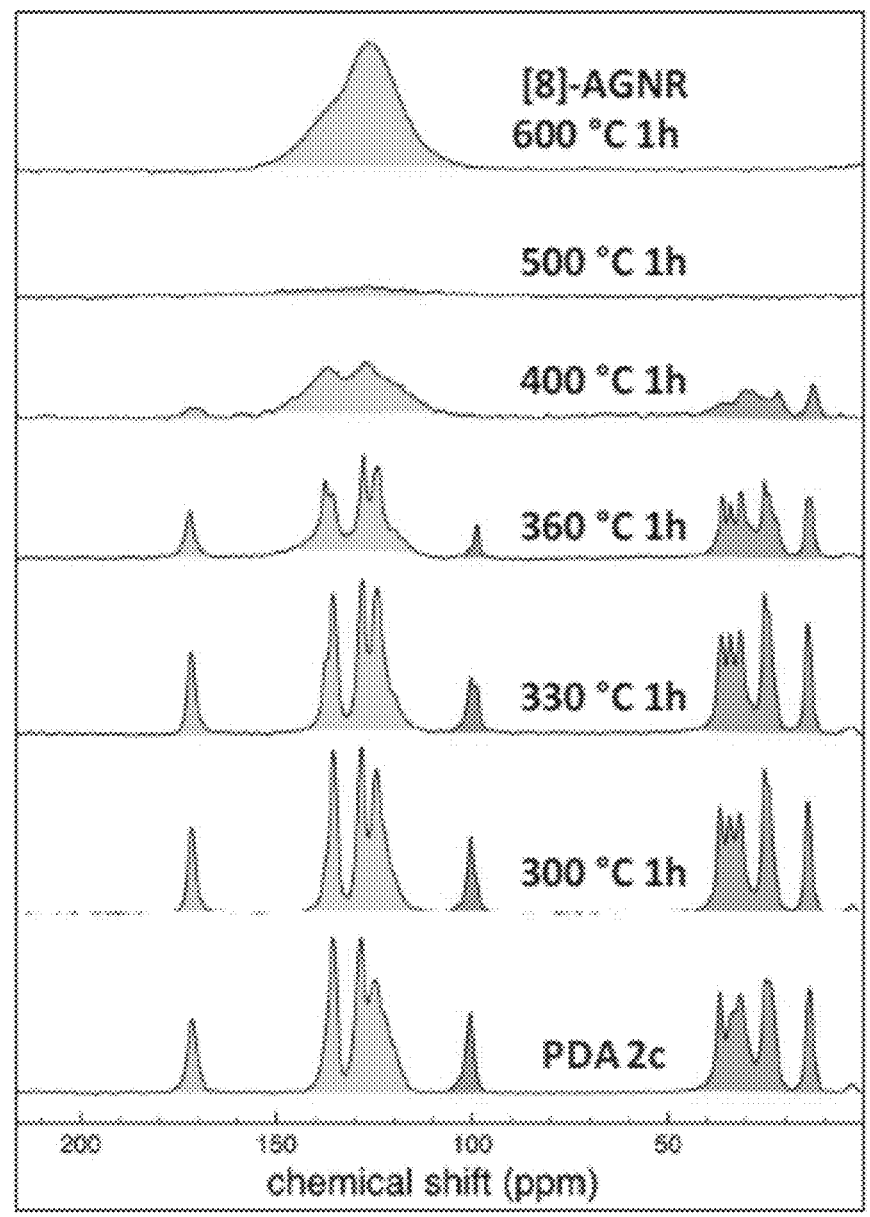
FIG. 53. Stacked CP/MAS $^{13}$C NMR spectra of the conversion of PDA 2c to [8]$_4$GNR with constant number of scans (2048) and no peak height normalization. Note the dramatic loss and recovery of signal for samples heated at about 400 and about 500° C.

Spectroscopic details of the CP/MAS $^{13}$C NMR experiments: CP/MAS $^{13}$C NMR experiments were performed on a Bruker DSX300 operating at about 300 MHz and at about 298 K. An about 4 mm zirconia rotor with a Kel-F cap was used spinning at about 10 KHz in all experiments. An about 5 ms cross-polarization contact time was utilized in all experiments. To ensure that a good signal-to-noise ratio was achieved for all spectra, the number of scans collected was increased as appropriate. FIG. 49 includes a Table 3 listing the specific number of scans collected for all spectra described in FIG. 22. An about 50 Hz line broadening was applied to all spectra except for the spectra of PDAs 2b and 2c after heating to about 500° C. where an about 100 Hz line broadening was used.

Interestingly, amide-containing PDAs 2a-2c underwent a dramatic loss of CP/MAS signal upon conversion to the annulated intermediate polymers (heating to either about 400 or about 500° C.) en-route to $[8]_4$GNR. The CP/MAS signal returned upon final aromatization to $[8]_4$GNR. This behavior was not noted in para-acetophenone PDA 1. To showcase this phenomenon, a series of spectra were acquired where the number of scans was held constant at 2048 and peak heights were not normalized. These four series of spectra are shown in FIGS. 50-53.

Details of computational investigations: Geometries were fully optimized at the B3LYP/6-31G(d) level of theory in the gas phase. Optimized geometries were verified by frequency computations as minima (no imaginary frequencies) or transition structures (one imaginary frequency). Frequency analysis was performed at 623.15 K, and frequency values discussed in this example were scaled using a factor 0.98. Free energy corrections were calculated using Truhlar's quasiharmonic approximation, which sets all the real vibrational frequencies that are lower than 100 cm$^{-1}$ to 100 cm$^{-1}$ to correct entropies for the breakdown of the harmonic oscillator approximation. Subsequent single-point energy calculations on the optimized structures were performed using the M06-2X/6-311+G(d,p) level of theory. The thermal corrections calculated from the scaled vibrational frequencies at the B3LYP/6-31G(d) level on the optimized geometries were then added to the M06-2X/6-311+G(d,p) electronic energies to obtain the Gibbs free energies. Quantum chemical computations were performed using Gaussian 09. Graphics on optimized structures were generated with CYLview.

Conformational searches were carried out with Macro-Model from Schrodinger using OPLS_2005 and an energy window of 10.0 kcal mol$^{-1}$. A redundant conformer elimination was performed using an energy window of 10.0 kcal mol$^{-1}$ and a maximum atom deviation cutoff of 0.5 A. The lowest energy conformers were optimized with B3LYP/6-31G(d) to locate the global minimum for each reaction.

Model systems: The cycloisomerization of PDA model compounds 5 and 6 is proposed to proceed through a 6π electrocyclization pathway, the favored pathway of dienynes for reaction temperatures under about 550° C. The mechanistic pathway of the thermal cyclization of hexa-1,3-dien-5-yne 8a is set forth in Scheme 51. The initial 6π electrocyclization forms isobenzene intermediate 8a-cycl, which subsequently undergoes two consecutive [1,2]-H shifts and rearomatizes to the final product benzene. The first [1,2]-H shift (8a-H-shift) from the allenic intermediate is the rate-determining step, with an enthalpic barrier of about 38.4 kcal mol$^{-1}$ relative to the starting dieneyne (computed using BCCD(T)/cc-pVCZ//BLYP/6-31G(d)). The results are tabulated in Table 4.

Scheme S1. Mechanistic pathway of hexa-1,3-dien-5-yne (8a).

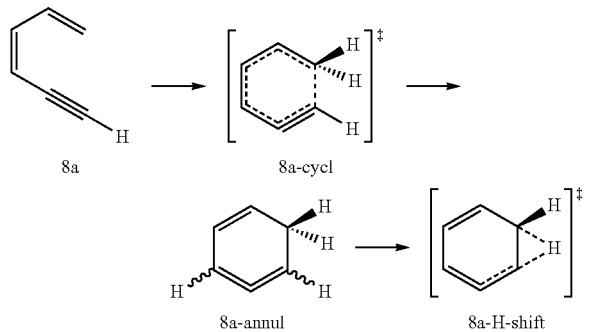

A set of four test structures 8a-11a is explored, the former two in order to validate the method (Schemes S1 and S2), and the latter two to probe the effect of π-extension of 8a on reaction barriers (Schemes S3 and S4). Computation is performed of the reaction barriers to 8a-cycl and 8a-H-shift, which are 40.2 and 44.0 kcal mol-1, respectively (Table 4). For the benzannulated system 9a (Scheme S2), the barriers for 9a-cycl and 9a-H-shift increase to 46.6 and 51.1 kcal mol-1, respectively, due to the breaking of aromaticity for cyclization to occur.

Scheme S2. Mechanistic pathway of 1-ethynyl-2-vinylbenzene (9a).

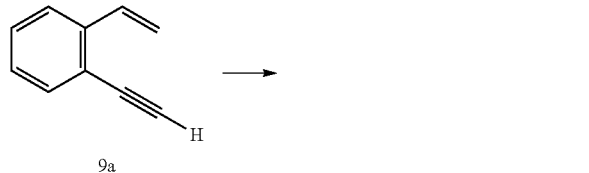

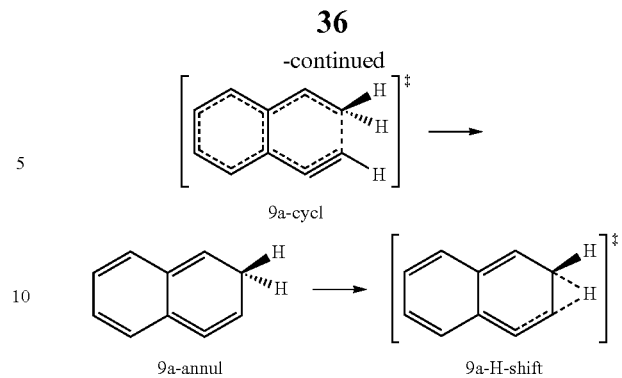

Next, the effect of extending the π-system is explored, as is the case in the PDAs. Phenyl fusion at the 3,4-positions of (E)-hexa-3,5-dien-1-yn-3-ylbenzene (10a) does not affect the reaction barriers, which stay approximately the same as those for 8a (37.6 and 46.3 kcal mol-1 for 10a-cycl and 10a-H-shift, respectively). However, (Z)-but-1-en-3-yn-1-ylbenzene 11a (Scheme S4) has much high reaction barriers of 54.1 and 58.4 kcal mol-1 for 11a-cycl and 11a-H-shift, respectively. The increases in the energetic barriers of the rate-determining steps of 9a and 11a are due to interrupting the aromaticity of the benzene ring.

Scheme S3.
Mechanistic pathway of (E)-hexa-3,5-dien-1-yn-3-ylbenzene (10a).

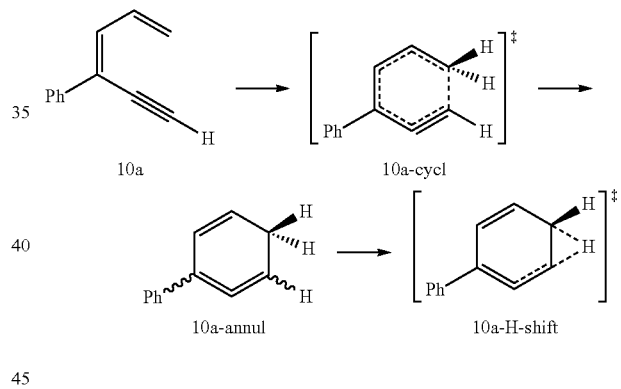

Scheme S4. Mechanistic pathway of cis-2-ethynyl-1-phenylethene (11a).

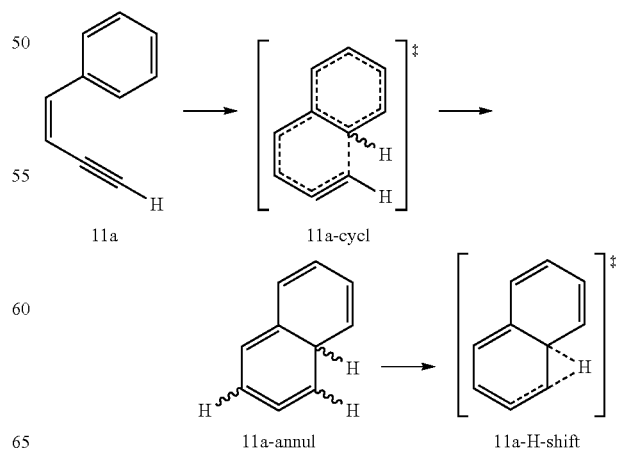

TABLE 4

Computed energetics of pathway intermediates in kcal mol$^{-1}$ relative to starting dieneynes 8a, 9a, 10a, and 11a.

| | | cycl | annul | H-shift |
|---|---|---|---|---|
| 8a | $\Delta H/\Delta H^{\neq a}$ | 31.7 | 7.9 | 39.4 |
| | $\Delta H/\Delta H^{\neq}$ | 34.5 | 11.8 | 36.7 |
| | $\Delta G/\Delta G^{\neq}$ | 40.2 | 17.5 | 44 |
| 9a | $\Delta H/\Delta H^{\neq a}$ | 36.4 | 25.5 | 46 |
| | $\Delta H \Delta H^{\neq}$ | 41.3 | 32.9 | 44.4 |
| | $\Delta G/\Delta G^{\neq}$ | 46.6 | 37.6 | 51.1 |
| 10a | $\Delta H \Delta H^{\neq}$ | 32.4 | 34 | 39.7 |
| | $\Delta G/\Delta G^{\neq}$ | 37.6 | 39.3 | 46.3 |
| 11a | $\Delta H \Delta H^{\neq}$ | 48.9 | 44.7 | 52.7 |
| | $\Delta G/\Delta G^{\neq}$ | 54.1 | 48.4 | 58.4 |

$^a$Computed elsewhere using BCCD(T)/cc-pVDZ//BLYP/6-31G(d).

trans-Enediyne 5:

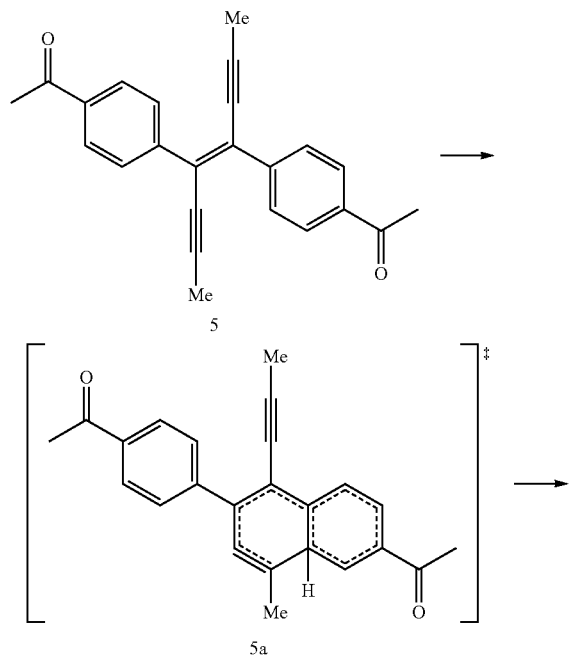

Scheme S5. Mechanistic pathway for the trans-enediyne 5 model system.

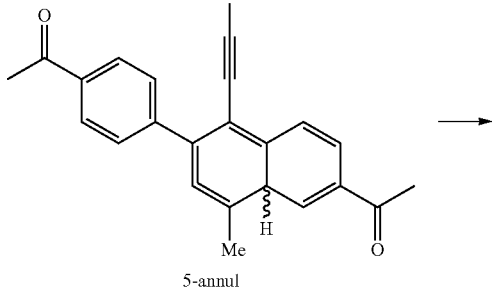

5-annul

TABLE 5

Computed energetics in kcal mol$^{-1}$ relative to trans-enediyne 5.

| Structure | $\Delta H/\Delta H^{\neq}$ | $\Delta G/\Delta G^{\neq}$ |
|---|---|---|
| 5a | 47.5 | 52.6 |
| 5-annul | 41.6 | 45.5 |
| 5b | 52.9 | 58.4 | trans-Enediyne 6:

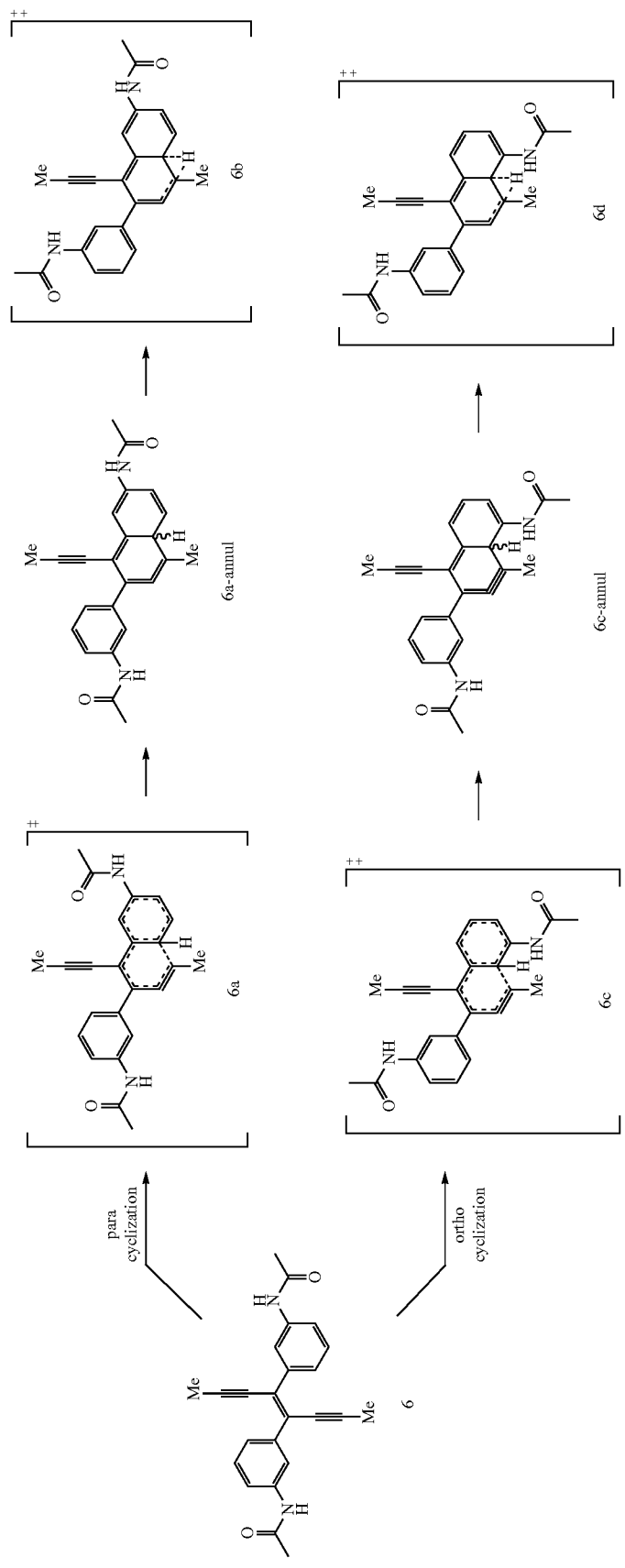

TABLE 6

Computed energetics in kcal mol$^{-1}$ relative to trans-enediyne 6.

| Structure | ΔH/ΔH" | ΔG/ΔG" |
|---|---|---|
| 6a | 48.2 | 52.5 |
| 6a-annul | 38.6 | 42.0 |
| 6b | 52.3 | 57.5 |
| 6c | 50.5 | 55.4 |
| 6c-annul | 37.8 | 41.5 |
| 6d | 58.8 | 64.3 |

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be "substantially" or "about" the same as a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A method of forming a graphene nanoribbon, the method comprising:
providing monomeric precursors each including an alkyne moiety and at least one aromatic moiety bonded to the alkyne moiety;
polymerizing the monomeric precursors to form a polymer; and
converting the polymer to a graphene nanoribbon;
wherein polymerizing the monomeric precursors includes applying electromagnetic radiation.

2. The method of claim 1, wherein the monomeric precursors are represented by a chemical formula:

$R_1$-A-$R_2$, wherein
A is an alkyne moiety,
$R_1$ and $R_2$ are the same or different, and are selected from aromatic moieties.

3. The method of claim 2, wherein $R_1$ and $R_2$ are the same, and each includes a substituent group.

4. The method of claim 3, wherein the substituent group is selected from carbonyl groups, aminocarbonyl groups, amide groups, carbamate groups, and urea groups.

5. The method of claim 2, wherein $R_1$ and $R_2$ are monocyclic.

6. The method of claim 1, wherein the monomeric precursors are diaryl-substituted polyynes.

7. The method of claim 1, wherein the polymer includes a backbone including repeating enyne units.

8. The method of claim 1, wherein the polymer is a polydiacetylene.

9. The method of claim 1, wherein converting the polymer to the graphene nanoribbon is performed in a solid state.

10. The method of claim 1, wherein converting the polymer to the graphene nanoribbon includes applying heat.

11. A method of forming a graphene nanoribbon, the method comprising:
providing a polymer including a backbone including repeating enyne units, and aromatic moieties as side groups bonded to the backbone; and
converting the polymer to a graphene nanoribbon.

12. The method of claim 11, wherein the graphene nanoribbon is an armchair nanoribbon including 3p, 3p+1, or 3p+2 carbon atoms within its width, where p is in an integer.

13. The method of claim 11, wherein the polymer is represented by a chemical formula:

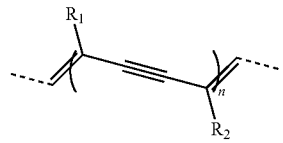

wherein $R_1$ and $R_2$ are the side groups of the polymer.

14. The method of claim 13, wherein $R_1$ and $R_2$ are the same, and each includes a substituent group.

15. The method of claim 14, wherein the substituent group is selected from carbonyl groups, aminocarbonyl groups, amide groups, carbamate groups, and urea groups.

16. The method of claim 13, wherein $R_1$ and $R_2$ are monocyclic.

17. A method of forming an electronic device, the method comprising:
- providing a polymer including a backbone including repeating enyne units, and aromatic moieties as side groups bonded to the backbone;
- disposing the polymer over a substrate; and
- converting the polymer to a graphene nanoribbon.

18. The method of claim 17, wherein the polymer is a polydiacetylene.

19. The method of claim 17, wherein converting the polymer to the graphene nanoribbon is performed in a solid state.

\* \* \* \* \*